(12) United States Patent  
Ohzuru et al.

(10) Patent No.: US 6,916,393 B2  
(45) Date of Patent: Jul. 12, 2005

(54) MULTI-LAYERED ENDLESS BELT, MEDIUM CONVEYING BELT MADE OF THE SAME, PRODUCTION METHOD THEREOF, AND FORMING APPARATUS THEREOF

(75) Inventors: Tomohiro Ohzuru, Otsu (JP); Hitoshi Nojiri, Otsu (JP); Yoshio Sakata, Yamato (JP); Koji Sezaki, Otsu (JP)

(73) Assignee: Kaneka Corporation, Osaka (JP)

( * ) Notice: Subject to any disclaimer, the term of this patent is extended or adjusted under 35 U.S.C. 154(b) by 201 days.

(21) Appl. No.: 09/991,066

(22) Filed: Nov. 9, 2001

(65) Prior Publication Data

US 2002/0104606 A1 Aug. 8, 2002

Related U.S. Application Data

(63) Continuation of application No. PCT/JP00/03085, filed on May 12, 2000.

(30) Foreign Application Priority Data

| May 12, 1999 | (JP) | ............................................. 11-131410 |
| May 12, 1999 | (JP) | ............................................. 11-131707 |
| Sep. 27, 1999 | (JP) | ............................................. 11-271821 |
| Nov. 5, 1999 | (JP) | ............................................. 11-315870 |
| Nov. 12, 1999 | (JP) | ............................................. 11-322786 |
| Jan. 17, 2000 | (JP) | ............................................. 2000-007787 |
| Feb. 16, 2000 | (JP) | ............................................. 2000-038778 |
| Feb. 16, 2000 | (JP) | ............................................. 2000-038779 |
| Feb. 16, 2000 | (JP) | ............................................. 2000-038780 |

(51) Int. Cl.$^7$ ............................ B32B 1/08; B29D 29/00  
(52) U.S. Cl. ........................ 156/137; 156/192; 493/270; 493/303  
(58) Field of Search .................................. 156/137, 150, 156/151, 184, 191, 192, 194, 277; 399/303, 313; 271/275, 193; 198/641, 472.1, 803.6; 493/269, 270, 303

(56) References Cited

U.S. PATENT DOCUMENTS

| 6,375,184 B1 * | 4/2002 | Hayashi ..................... 271/18.1 |
| 6,419,411 B1 * | 7/2002 | Tanno ......................... 400/635 |
| 6,652,938 B1 * | 11/2003 | Nishikawa et al. ........ 428/35.9 |

FOREIGN PATENT DOCUMENTS

| JP | 4-224909 | 8/1992 |
| JP | 4-269526 | 9/1992 |
| JP | 2000-181257 | 6/2000 |

* cited by examiner

Primary Examiner—John T. Haran  
(74) Attorney, Agent, or Firm—Brinks Hofer Gilson & Lione

(57) ABSTRACT

A multi-layered endless belt having an arbitrary layer thickness by the thickness of the film and the winding number, a medium conveying belt using the same, and a method and apparatus by which these can be stably produced without various residues in the production process and can be produced with a high general-purpose properties and at a low cost. There are provided a multi-layered endless belt made by winding and heat-welding a polymer material film and a production method thereof, and further a production method of medium conveying belts of various forms fundamentally having a construction in which an electrode pattern and a protective film are laminated thereon, and a novel production method and molding apparatus for molding the multi-layered endless belt by heat-pressing a wound tubular body.

30 Claims, 43 Drawing Sheets

80

Fig. 62
(a)
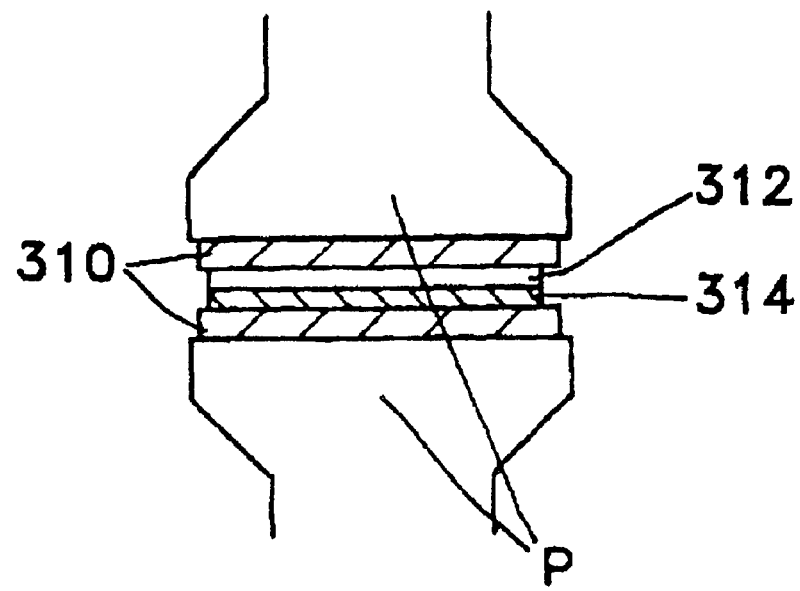
(b)
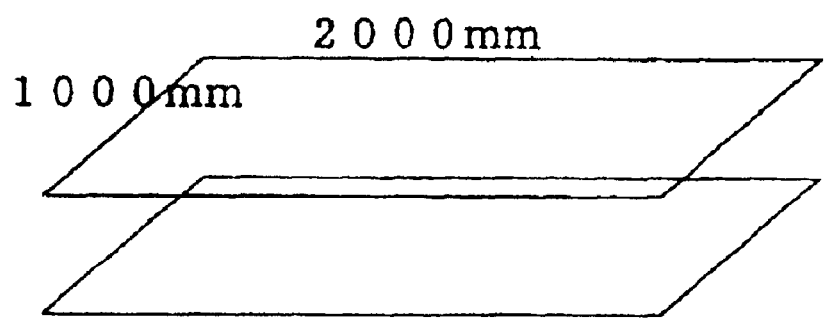
(c)
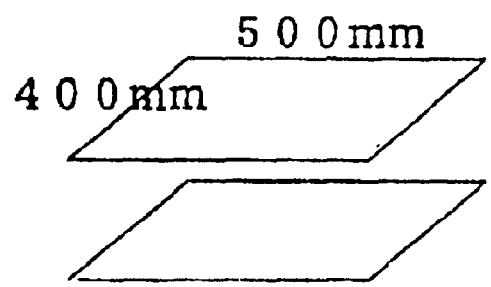

MULTI-LAYERED ENDLESS BELT, MEDIUM CONVEYING BELT MADE OF THE SAME, PRODUCTION METHOD THEREOF, AND FORMING APPARATUS THEREOF

This application is a continuation of PCT application No. PCT/JP00/03085, filed May 12, 2000, which is related to and claims priority from the following international applications: Japan application 11/131707, filed May 12, 1999; Japan application 11/131410, filed May 12, 1999; Japan application 11/271821, filed Sep. 27, 1999; Japan application 11/315870, filed Nov. 5, 1999; Japan application 11/322786, filed Nov. 12, 1999; Japan application 2000/7787, filed Jan. 17, 2000; Japan application 2000/38780, filed Feb. 16, 2000; Japan application 2000/38779, filed Feb. 16, 2000 and Japan application 2000/38778, filed Feb. 16, 2000.

FIELD OF THE ART

The present invention relates to an endless belt having a multi-layered structure, and more particularly to a multi-layered endless belt made of a film made of a polymer material, a medium conveying belt made of the same, a production method thereof, and a molding apparatus thereof.

BACKGROUND ART

Various methods are known by which a belt (including a tube, hereafter referred to as belt) is produced with a resin. For example, a resin solution having a heat-resistant resin or a resin source material dispersed or dissolved in a solvent is applied onto an outer surface of a cylindrical or tubular surface-treated mold or applied onto an inner surface of a tubular mold and, after thickness adjustment, evaporating the solvent by heating or evaporating the solvent by preheating, and then heat-curing it to produce a belt.

In evaporating the solvent by heating, the heating must be carried out moderately at a temperature lower than thereby raising a problem that repellency of the solution occurs and pinhole defects are liable to occur. For this reason, the yield of the products has not been high.

One method for fabricating an endless belt is a method by extrusion. By this production method, an endless belt is obtained by extruding a thermoplastic resin in a hollow state and cutting it to a suitable length. This method is a fairly effective method as a method for obtaining a long product having a wide belt width. However, by this method, it has been extremely difficult to mold a thin resin belt. Also, there is a limit to the dimension precision, so that at most about 5 to 10% of the thickness of the molded product is near the limit, and actually there has been a variation more than that. Moreover, it has a disadvantage that the apparatus will be considerably large and expensive in order to obtain a belt having a large diameter by this production method.

A still another method for obtaining an endless belt is a method by injection molding. This molding method involves molding by injecting a thermoplastic resin into a mold and is advantageous in that a product having a desired shape and size can be obtained. Further, this method is a useful method because a three-dimensional complex shape is also obtained. However, by this method, the mold will the boiling point of the solvent in order to suppress foaming from the inside of the resin, and it is not preferable to perform the heating at a temperature which is too high. Further, in order to prevent the solvent from remaining in the obtained belt, this drying step requires a period of time at least in minutes, specifically in five to ten minutes, and if it is possible in production, it is preferable to perform the drying step for a longer period of time in view of the characteristics of the product. Further, the heat-curing requires a considerable period of time depending on the type of the resin, and it requires at least four to five minutes or, if it is long, thirty to forty minutes, and an even longer period of time is required in order to raise the curing degree.

Due to such a low productivity, a large amount of expensive mold and a wide production space are needed in the case of manufacturing a large amount of products. Also, by this method, the fabricated resin belt may be brought into close contact with the mold as if being bonded thereto, making it difficult to peel the belt from the mold. In this case, the expensive mold must be protected at the cost of the product, thereby all the more aggravating the productivity. Further, in order to facilitate lubrication, the mold must be subjected to a lubrication treatment, be expensive and the apparatus itself will be large and expensive in order to mold a large-size one. Further, concerning the precision of the molded product, the dimension precision of the thickness has a limit of about 0.05 mm besides the size of the outer diameter, so that it cannot be said to be a good one. Further, it cannot be said to be a preferable method for molding a product having a small thickness.

On the other hand, as a method for obtaining a belt, there is a method in which a resin film is produced in advance and the ends of the film are bonded. In this method, a thermoplastic resin is used for bonding the seams, or the belt itself is formed of a thermoplastic resin and the seams are superposed one on the other and thermally welded; however, there has been a problem such as brittleness of the physical strength of the seams and the difficulty of forming it into a plane.

Furthermore, in an electronic photography apparatus such as a copier, a method is known in which paper is conveyed by mounting the paper on a resin belt such as PC or vinylidene fluoride, or in which the resin belt is electrically charged in advance to impart an electric charge to the surface thereof and the paper is conveyed by allowing the paper to be adsorbed by the electric charge. In the method of conveying the paper by mounting it on the resin belt, the paper and the belt often slip with each other and it is difficult to realize a stable transportation. On the other hand, the method of allowing the resin belt to be electrically charged for allowing the paper to be adsorbed has a problem such that the adsorption force of the paper is insufficient and it is not possible to fix the paper on the belt with good precision, and moreover the tip end of the paper floats up during the transportation. In particular, in order to achieve high speed of a printer, it has been necessary to allow a printing medium such as paper or OHP film to be adsorbed onto the belt with good precision, and to raise its adsorption power. Furthermore, it has been necessary to ensure a sufficient power of adsorbing the paper even if the environment of use changes, e.g., even under a high-temperature and high-humidity. For this reason, in order to achieve a high speed of a printer or the like, there is a medium conveying belt capable of strongly adsorbing a medium such as for printing adopts a method in which an electrode pattern is formed on a belt and applied a voltage thereof so that the paper is electrostatically adsorbed.

Conventional conveying belts have been extremely expensive because they are originally expensive and also a special apparatus or means is used in order to form an electrode by further processing them. Regarding the conventional conveying belts, a seamless belt (hereafter referred to as endless belt) is produced by a method such as described above, and the obtained endless belt is further processed to form an electrode pattern having electrical conductivity; however this leads to processing an expensive endless belt further with an expensive apparatus. For example, the electrode pattern having electrical conductivity is formed by performing printing, vacuum deposition, etching, plating, or the like; however, it is a considerably difficult work to perform such a processing on an endless belt. Though screen printing on a plane is easy, printing an electrically conductive paste on a tubular object by curved-surface printing requires a special apparatus, leading to poor yield and increased costs.

Further, in recent years, there is a tendency that electrophotographic devices, ink jet printers, or bubble jet printers are becoming smaller and less expensive. For this reason, the medium conveying belt used in these devices require compact designs. In particular, if an electrode is exposed for applying a voltage to the surface on which the medium is conveyed, it will be an obstacle in reducing the scale of the device. This is because it requires an area for exposing the electrode in addition to the area for the objects to be adsorbed, and moreover the presence of a power supplying brush restricts the freedom of the site for printing characters or transcribing images on the medium, thereby all the more increasing the size of the device. Therefore, a medium conveying belt has been demanded which has a construction such that an electrode protective layer is further provided on the electrode pattern. However, in addition to the difficulty in forming an electrode pattern after fabricating a tubular object in view of forming the electrode pattern on a curved surface, there is a problem of increase in costs because since the device must undergo a complicated process of attaching an electrode pattern on a curved surface after manufacturing a tubular object and thereafter forming an electrode protective layer.

Thus, as a result of repeated eager studies and development in order to obtain a manufacturing method by which an endless belt having an arbitrary size and thickness can be mass-produced stably and inexpensively and moreover the characteristics of the belt can be suitably adjusted, the inventors of the present invention have arrived at a concept of the multi-layered endless belt of the present invention and its manufacturing method, and further arrived at a concept of various medium-conveying belts using the same, their manufacturing methods, and apparatus for forming the same.

DISCLOSURE OF THE INVENTION

A object of the multi-layered endless belt of the present invention lies in having a structure of being constructed with a nonthermoplastic polyimide resin layer and an adhesive layer formed from at least one selected from the group consisting of epoxy resin, silicone resin, vinyl ester resin, phenolic resin, unsaturated polyester resin, bismaleimide resin, urethane resin, melamine resin, and urea resin, and being wound to construct a laminate body.

Further, another object of the multi-layered endless belt of the present invention is a multi-layered endless belt constructed with a nonthermoplastic polyimide resin layer and a thermoplastic resin layer made of a thermoplastic polyimide resin or at least one resin selected from the group consisting of polyether sulfone, polyethylene terephthalate, polyethylene naphthalate, polyether ether ketone, polyphenylene sulfide, polyetherimide, polysulfone, polyamideimide, polyetheramide, and polyarylate, wherein the nonthermoplastic polyimide resin layer and the thermoplastic resin layer are wound and alternately formed.

A object of the production method of the multi-layered endless belt according to the present invention lies in including a laminate film forming step for forming a laminate film by disposing an adhesive layer formed from at least one selected from the group consisting of epoxy resin, silicone resin, vinyl ester resin, phenolic resin, unsaturated polyester resin, bismaleimide resin, urethane resin, melamine resin, and urea resin, on an entire surface or a specific portion of one surface or both surfaces of a non-thermoplastic polyimide film; a winding step for winding the laminate film at least two times around an axial core; and a heat-bonding step for heat-bonding the laminate film wound around the axial core with a heat source disposed in the inside and/or on the outside of the axial core.

Another object of the production method of the multi-layered endless belt of the present invention lies in including a laminate film forming step for forming a laminate film by disposing a thermoplastic resin layer made of a thermoplastic polyimide resin or at least one resin selected from the group consisting of polyether sulfone, polyethylene terephthalate, polyethylene naphthalate, polyether ether ketone, polyphenylene sulfide, polyetherimide, polysulfone, polyamideimide, polyetheramide, and polyarylate, on an entire surface or a specific portion of one surface of a nonthermoplastic polyimide film; a winding step for winding the laminate film around an axial core for two or more winds; and a heat-welding step for heat-welding with a heat source disposed in the inside and/or on the outside of the axial core.

Still another object of the production method of the multi-layered endless belt of the present invention lies in including a laminate film forming step for forming a laminate film by disposing a thermoplastic resin layer made of a thermoplastic polyimide resin or at least one resin selected from the group consisting of polyether sulfone, polyethylene terephthalate, polyethylene naphthalate, polyether ether ketone, polyphenylene sulfide, polyetherimide, polysulfone, polyamideimide, polyetheramide, and polyarylate, on an entire surface or a specific portion of both surfaces of a nonthermoplastic polyimide film; a winding step for winding the laminate film around an axial core for two or more winds; and a heat-welding step for heat-welding with a heat source disposed in the inside and/or on the outside of the axial core.

Still another object of the production method of the multi-layered endless belt of the present invention lies in including a film producing step for producing a film made of a nonthermoplastic polyimide resin and a thermoplastic resin film made of a thermoplastic polyimide resin or at least one resin selected from the group consisting of polyether sulfone, polyethylene terephthalate, polyethylene naphthalate, polyether ether ketone, polyphenylene sulfide, polyetherimide, polysulfone, polyamideimide, polyetheramide, and polyarylate; a delivering step for delivering the nonthermoplastic polyimide resin film and the thermoplastic resin film; a winding step for laminating and winding the nonthermoplastic polyimide resin film and the thermoplastic resin film simultaneously for two or more winds around an axial core; and a heat-welding step for heat-welding with a heat source disposed in the inside and/or on the outside of the axial core.

A object of the production method of the medium conveying belt of the present invention is a production method of a medium conveying belt having an electrically conductive electrode pattern on an outer circumferential surface of a multi-layered endless belt and further having an electrode protective layer on an outer circumferential surface of the electrode pattern, the production method including:

a step of preparing a material film as described in any of the above or a thermoplastic resin film;

a step of preparing a film with an electrode pattern by forming an electrode pattern for one circumferential length of a tubular object at one end on one surface of a monolayer film of the material film or thermoplastic resin;

a winding step of winding the film with the electrode pattern at least two times around an axial core so that the electrode pattern forms the outermost circumferential surface, and further winding a resin film for forming the electrode protective layer at least two times on a surface of the electrode pattern; and a heat-welding step of heat-welding the film with the electrode pattern and the resin film for the electrode protective layer which are wound around the axial core.

Further, another object of the production method of the medium conveying belt of the present invention is a production method of a medium conveying belt having an electrically conductive electrode pattern on an outer circumferential surface and an inner circumferential surface of a multi-layered endless belt and further having an electrode protective layer on an outer circumferential surface of the electrode pattern, the production method including:

a step of preparing a material film as described in any of the above or a thermoplastic resin film;

a step of preparing a film with an electrode pattern by forming an electrode pattern for one circumferential length of a tubular object each at one end on one surface and at the other end on the opposite surface of the material film or thermoplastic resin film;

a winding step of winding the film with the electrode pattern at least two times around an axial core so that one electrode pattern forms the outermost circumferential surface and the other electrode pattern forms the innermost circumferential surface, and further winding a resin film for forming the electrode protective layer at least two times on a surface of the electrode pattern; and a heat-welding step of heat-welding the film with the electrode pattern and the resin film for the electrode protective layer which are wound around the axial core.

Alternatively, still another object of the production method of the medium conveying belt of the present invention is a production method of a medium conveying belt having an electrically conductive electrode pattern on an outer circumferential surface of a multi-layered endless belt and further having an electrode protective layer on an outer circumferential surface of the electrode pattern, the production method including:

a step of preparing a material film as described in any of the above or a thermoplastic resin film;

a step of preparing a film with an electrode pattern by forming an electrode pattern for one circumferential length of a tubular object on a part of one surface of a laminate film or the thermoplastic resin film;

a winding step of winding the film with the electrode pattern at least two times around an axial core; and a heat-welding step of heat-welding the film with the electrode pattern wound around the axial core.

Still another object of the production method of the medium conveying belt of the present invention is a production method of a medium conveying belt having an electrically conductive electrode pattern on an outer circumferential surface and an inner circumferential surface of a multi-layered endless belt and further having an electrode protective layer on an outer circumferential surface of the electrode pattern, the production method including:

a step of preparing a material film as described in any of the above or a thermoplastic resin film;

a step of preparing a film with an electrode pattern by forming an electrode pattern for one circumferential length of a tubular object on a part of one surface of a laminate film or the thermoplastic resin film and forming an electrode pattern for one circumferential length of a tubular object at one end of the opposite surface;

a winding step of winding the film with the electrode pattern at least two times around an axial core so that the electrode pattern at one end of the opposite surface forms the innermost circumferential surface; and a heat-welding step of heat-welding the film with the electrode pattern and the resin film for the electrode protective layer which are wound around the axial core.

Further, still another object of the production method of the medium conveying belt of the present invention is a production method of a medium conveying belt of a structure having an electrically conductive electrode pattern on an outer circumferential surface of a multi-layered endless belt and further having an electrode protective layer on an outer circumferential surface of the electrode pattern, the production method including:

a step of preparing a material film as described in any of the above or a thermoplastic resin film;

a step of drilling a hole through a monolayer film of the material film or the thermoplastic resin film so that the electrode pattern of the electrode protective layer will be exposed to the inside of the medium conveying belt after winding and heating, or preparing a film narrower than the electrode protective film in a direction perpendicular to the circumferential direction;

a winding step of winding the film with the electrode pattern at least two times around an axial core, and further winding a resin film for forming the electrode protective layer, which has the electrode pattern formed thereon, at least two times; and a heat-welding step of heat-welding the film and the resin film for the electrode protective layer with the electrode pattern, which are wound around the axial core, whereby an electric power can be supplied from the inside of the belt in applying a voltage to the electrode pattern between the two layers.

Still another object of the production method of the medium conveying belt of the present invention is a production method of a medium conveying belt of a structure having an electrically conductive electrode pattern on an outer circumferential surface of a multi-layered endless belt and further having an electrode protective layer on an outer circumferential surface of the electrode pattern, the production method including:

a step of preparing a material film as described in any of the above or a thermoplastic resin film;

a step of forming a film with an electrode pattern by forming an electrode pattern for one circumferential length of a tubular object at an end on one surface of the material film or the thermoplastic resin film;

a winding step of winding the film with the electrode pattern at least two times around an axial core so that the electrode pattern at one end of the opposite surface forms the innermost circumferential surface, and further winding a resin film for forming the electrode protective layer, which has the electrode pattern formed thereon, at least two times; and a heat-welding step of heat-welding the film and the resin film for the electrode protective layer narrower than the film in a direction perpendicular to the circumferential direction, which are wound around the axial core; and a post-processing step of bending the end together with the electrode pattern to the inside of the medium conveying belt for contact-bonding by heating, after molding the belt, whereby an electric power can be supplied from the inside of the belt in applying a voltage to the electrode pattern between the two layers.

A object of the endless belt molding apparatus of the present invention lies in being constructed at least with a removable axial core and a heat-pressing apparatus having a shielding member mounted thereon, wherein there are two spaces that are partitioned by the shielding member between the axial core and the heat-pressing apparatus and the axial core has an outer circumferential surface for winding a film, and in including a heat-processing mechanism and a pressure-processing mechanism via the shielding member for the film.

Another object of the endless belt molding apparatus of the present invention is an apparatus having a hollow or solid axial core, a multiple cylindrical mold made of an outer tube surrounding the axial core, and an elastic body that partitions a space between the axial core and the outer tube as a fundamental construction, wherein the spaces on the axial core side and on the outer tube side with the elastic body lying therebetween (hereafter referred to as space a and space b) are independently capable of being subjected to pressure reduction and/or pressurization.

A object of the endless belt molding method of the present invention is a molding method of an endless belt using the aforesaid endless belt molding apparatus, including:
(1) a step of winding a film on an outer circumference of the axial core for one or more layers;
(2) a step of installing the axial core having the film wound thereon in the inside of the aforesaid heat-pressing apparatus;
(3) a step of reducing the pressure of space c and space d to sufficiently remove air between the wound films;
(4) a step of applying a pressure to space e, pressurizing the whole films via the shielding member, and heating the whole wound films while maintaining a pressure;
(5) a step of cooling while maintaining the aforesaid pressure; and
(6) a step of peeling off the molded endless belt from the aforesaid axial core by pressurizing the space c to obtain an integrated endless belt.

BRIEF DESCRIPTION OF THE DRAWINGS

FIG. 52(a) is a cross-sectional explanatory view showing an Example of an expandable and contractible axial core (expanded and contracted by letting a small sectioned part in and out) of an endless belt molding apparatus according to the present invention;

FIG. 52(b) is a cross-sectional explanatory view showing another Example of an expandable and contractible axial core (expanded and contracted by an elastic body expanded and contracted by pressure) of an endless belt molding apparatus according to the present invention;

FIG. 52(c) is a cross-sectional explanatory view showing still another Example of an expandable and contractible axial core (expanded and contracted by letting a small sectioned part in and out) of an endless belt molding apparatus according to the present invention;

FIG. 52(d) is a cross-sectional explanatory view showing still another Example of an expandable and contractible axial core (expanded and contracted by letting a small sectioned part in and out) of an endless belt molding apparatus according to the present invention;

FIG. 52(e) is a cross-sectional explanatory view showing still another Example of an expandable and contractible axial core (expanded and contracted by torsion of a sectioned part) of an endless belt molding apparatus according to the present invention;

FIG. 62(a) is an explanatory view of a flat plate press for performing a preliminary test on a source material film used in an endless belt production method according to the present invention;

FIG. 62(b) is an explanatory view of a press surface of a flat plate press for 500 t or performing a preliminary test on a source material film used in an endless belt production method according to the present invention;

FIG. 62(c) is an explanatory view of a press surface of a flat plate press for 40 t for performing a preliminary test on a source material film used in an endless belt production method according to the present invention;

BEST MODES FOR CARRYING OUT THE INVENTION

Figure 1:
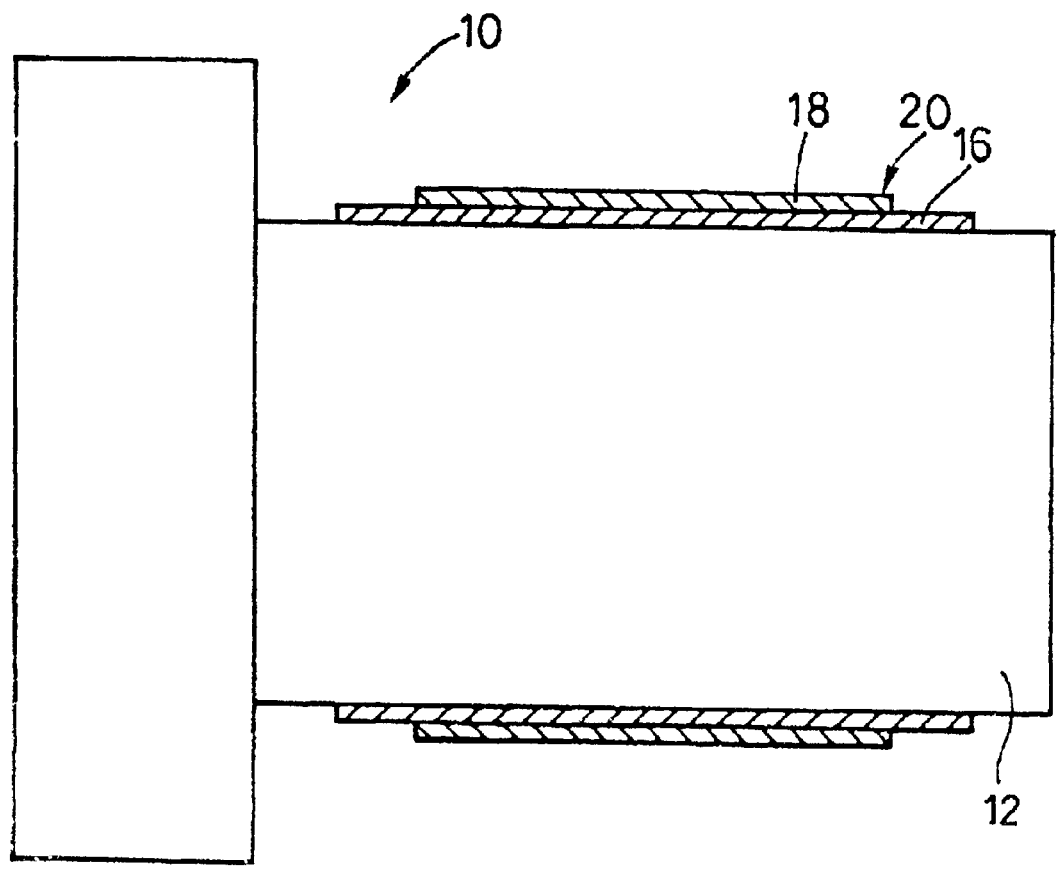
FIG. 1 shows one embodiment of a production method of a multi-layered endless belt according to the present invention and is an enlarged cross-sectional explanatory view of a film winding means.

Next, embodiments of the multi-layered endless belt according to the present invention, the medium conveying belt made of the same, the production method thereof, and the forming apparatus thereof will be explained.

The multi-layered endless belt of the present invention is characterized in that, fundamentally, a polymer film is used as a source material film and a tubular object constructed by winding the same is heat-welded to form the belt.

The polymer material for forming the above-mentioned tubular object is not particularly limited, but may be, for example, an engineering plastic. Specifically, it is preferable to use one kind or a combination of two or more kinds selected from the group consisting of polyamide 6, polyamide 66, polyamide 46, polyamide MXD6, polycarbonate, polyacetal, polyphenylene ether, PET (polyethylene terephthalate), PBT (polybutylene terephthalate), PEN (polyethylene naphthalate), polyarylate, liquid crystal polyester, polyphenylene sulfide, polysulfone, polyether sulfone, polyether ether ketone, polyetherimide, polyamideimide, aramid, nonthermoplastic polyimide, thermoplastic polyimide, fluororesin, ethylene vinyl alcohol copolymer, polymethylpentene, phenolic resin, unsaturated polyester resin, epoxy resin, silicone, and diallyl phthalate resin; however, it is not limited to these.

The polymer material is welded and/or cured by heating it as a tubular object made of a film-shaped polymer material, and may be a monolayer film or a laminated film having a multi-layered construction. One of following combination is preferably used; thermoplastic resin alone, nonthermoplastic resin—adhesive, thermoplastic resin—thermoplastic resin, nonthermoplastic resin—thermoplastic resin, thermoplastic resin—adhesive, thermoplastic resin—nonthermoplastic resin—thermoplastic resin, adhesive—nonthermoplastic resin—thermoplastic resin, adhesive—nonthermoplastic resin—adhesive, thermoplastic resin—thermoplastic resin—thermoplastic resin, adhesive—thermoplastic resin—thermoplastic resin, and adhesive—thermoplastic resin—adhesive. Paticularly, from viewpoint of strength of the film, it is preferable to use a nonthermoplastic polyimide resin as a nonthermoplastic resin. In the case of a multi-layered construction, for example, a laminate film may be mentioned such as a thermoplastic resin film obtained by using a high-Tg high-elasticity thermoplastic resin in the inside and using a low-Tg thermoplastic resin on both sides thereof, or a laminate film obtained by forming an adhesive layer or a thermoplastic resin layer on one surface or on both surfaces of a nonthermoplastic resin film.

Since in most cases thermoplastic resin has low elasticity and low tension-resistance as compared with nonthermoplastic resin, it is preferable to use a laminate film obtained by forming a thermoplastic resin layer on one surface or on both surfaces of a nonthermoplastic resin film if stiffness or high strength is required in the multi-layered endless belt to be formed. On the other hand, if surface flatness of the multi-layered endless belt to be formed is severely required, it is preferable to use a thermoplastic resin film alone or a laminate film in which a thermoplastic resin layer is formed on both surfaces of a nonthermoplastic resin.

One embodiment of the multi-layered endless belt of the present invention can be produced by winding a laminate film having an adhesive layer disposed on the entire surface or on a specific portion of one surface or both surfaces of a nonthermoplastic polyimide layer.

The nonthermoplastic polyimide film used in the multi-layered endless belt of the present invention is not particularly limited, and may also be any of the nonthermoplastic polyimide films prepared from a diamine component and an acid dianhydride component and known to those skilled in the art.

The nonthermoplastic polyimide film can be produced by allowing diamine and acid dianhydride as source materials in an organic solvent and subjecting the generated polyamic acid solution or polyimide solution to the casting method, the extrusion-calendering method, the roll-calendering method, the application and drying method onto a carrier film, or the like method. Further, the multi-layered film obtained from the nonthermoplastic polyimide film can be further subjected to an arbitrary processing of the surface state such as being flat or embossed (unevenness) by a post-process using a press-heating roll, sand-blasting, or the like.

Further, in the present invention, the aforesaid nonthermoplastic polyimide film can be used as it is, but it is preferable to produce the multi-layered endless belt after one or more surface treatments selected from the group consisting of the ozone processing, coupling agent processing, blast processing, and etching processing is carried out on the entire surface or a specific portion of one surface or both surfaces thereof.

The adhesive layer used one embodiment of the multi-layered endless belt of the present invention is not limited, but it is preferably an adhesive layer formed from at least one resin selected from the group consisting of epoxy resin, silicone resin, vinyl ester resin, phenolic resin, unsaturated polyester resin, bismaleimide resin, urethane resin, melamine resin, and urea resin. More preferably, the glass transition temperature Tg of the adhesive layer is preferably at least 120° C.

Another embodiment of the multi-layered endless belt according to the present invention is constructed with the above-mentioned nonthermoplastic polyimide resin layer and a thermoplastic resin layer, and is wound to have a laminate structure.

The material of the thermoplastic resin layer used for the production of the different embodiment of the multi-layered endless belt of the present invention is not limited, but it is preferably at least one kind of heat-resistant resin selected from the group consisting of thermoplastic polyimide resin, polyether sulfone, polyethylene terephthalate, polyethylene naphthalate, polyether ether ketone, polyphenylene sulfide, polyetherimide, polysulfone, polyamideimide, polyetheramide, polyarylate, polycarbonate, polyvinyl fluoride resin, fluororesin, polyamide resin, silicone resin, and others. Further, those having characteristics such that the glass transition temperature Tg is at least 120° C. are more preferable.

The laminate film having the above-mentioned construction used for the production of the multi-layered endless belt according to the present invention may be made by the method of applying and drying an adhesive solution or a thermoplastic resin solution on one surface or both surfaces or a specific portion of a nonthermoplastic resin film already made into a film as a continuous body, the method of laminating an adhesive film or a thermoplastic resin film on one surface or both surfaces of a nonthermoplastic resin already made into a film in the same manner, the method of extruding and molding a nonthermoplastic resin precursor containing a cured portion and a non-cured portion and a resin for an adhesive or a thermoplastic resin in multiple layers and thereafter performing a post-curing process, or the like method; however, it is not limited to these. Here, the specific portion may be a plurality of sites. In the case where a surface treatment is performed on the nonthermoplastic polyimide film, it is preferable if the adhesive layer or the thermoplastic resin layer are disposed on the surface subjected to the surface treatment, because then a good close contact is obtained between the nonthermoplastic polyimide film and the adhesive layer or the thermoplastic resin layer. Further, the close contact at the time of winding can be improved by performing a surface treatment on the side of the nonthermoplastic polyimide film where the adhesive layer or the thermoplastic resin layer is not disposed, after forming the laminate film.

The total thickness of the laminate film used in the aforesaid multi-layered endless belt according to the present invention is not particularly limited, but it is preferably small and is preferably at most 0.05 mm. This is because, by using a film having a small thickness and suitably setting the number of winding, a belt having a further arbitrary thickness from a thin resin tubular body to a thick resin tubular body can be produced, and moreover the thickness of the film can be made almost constant, so that the thickness of the obtained belt can be made almost constant. If a thin material is used, it is preferable because the thickness (layer thickness) of the multi-layered endless belt to be produced can be arbitrarily adjusted by the winding number, and moreover, the step difference at the starting end and the finishing end of winding of the multi-layered endless belt can be made small. Further, the nonthermoplastic polyimide film and the thermoplastic resin layer preferably have a thickness as uniform as possible.

The thickness of the nonthermoplastic polyimide films used in the multi-layered endless belt of the present invention is not particularly limited, but preferably they all have a thickness as small as possible. In other words, usually, the nonthermoplastic polyimide film preferably has a thickness of about 7.5 $\mu$m to 150 $\mu$m, more preferably 7.5 $\mu$m to 50 $\mu$m.

In the multi-layered endless belt made of the nonthermoplastic polyimide layer and the adhesive layer, the thickness of the adhesive layer is not particularly limited, but usually it is preferably smaller than the thickness of the nonthermoplastic polyimide film. Specifically, the adhesive layer preferably is at least 3 $\mu$m and at most 20 $\mu$m. If a thin laminate film is used, the thickness of the multi-layered endless belt to be produced, i.e. the layer thickness, can be arbitrarily adjusted by the winding number in the winding step of the laminate film, and moreover there will be a small step difference at the starting end and the finishing end of the winding of the multi-layered endless belt. On the other hand, if the thickness of the adhesive layer is smaller than 3 $\mu$m, a sufficient adhesive power will not appear. Further, the nonthermoplastic polyimide film or the adhesive layer each preferably has a thickness as uniform as possible.

In the multi-layered endless belt made of the nonthermoplastic polyimide resin layer and the thermoplastic resin layer, the thickness of the thermoplastic resin layer is preferably larger than that of the nonthermoplastic polyimide layer. This is because, in flattening the winding finishing end and the winding starting end, in filling the welded/exuded step portion with the thermoplastic resin, complete filling and embedding cannot be performed if the thickness of the thermoplastic resin layer is smaller than that of the nonthermoplastic polyimide film.

Figure 2:
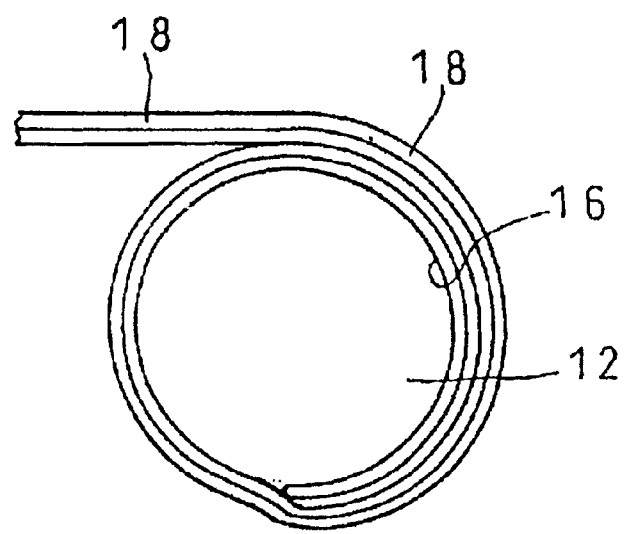
FIG. 2 is a front explanatory view of an essential part of a wound laminate film for explaining the production method of a multi-layered endless belt.

The multi-layered endless belt according to the present invention is produced by winding the aforesaid laminate film around an axial core of a film winding means or by delivering the nonthermoplastic polyimide film and the thermoplastic resin film and simultaneously winding them around the axial core. Hereafter, the production method of the multi-layered endless belt of the present invention will be explained with reference to one example. FIG. 1 is an enlarged cross-sectional explanatory view of a film winding means of the multi-layered endless belt of the present invention, and FIG. 2 is an explanatory front view of an essential part in which a tube and a laminate film are wound around an axial core. Referring to FIG. 1, in the film winding means 10, a thin tube 16 having an adhesion preventive layer 14 made of fluororesin or the like disposed on the surface thereof may be attached to an axial core 12 in an attachable and detachable state to produce the axial core. To the axial core 12, a thin tube 16 having a release layer 14 made of fluororesin or the like disposed on the surface thereof can be suitably attached in an attachable and detachable state. This tube 16 has a thickness of at most 0.5 mm, preferably at most 0.2 mm.

For example, as shown in FIG. 2, after a laminate film 18 is wound on the attachable and detachable tube 16 while giving a tensile force, the adhesive layer or the thermoplastic resin layer in the laminate film is heat-welded to form the multi-layered endless belt 20. Thereafter, the multi-layered endless belt 20 and the attachable and detachable tube 16 are separated so that the multi-layered endless belt 20 can be taken out alone.

Figure 3:
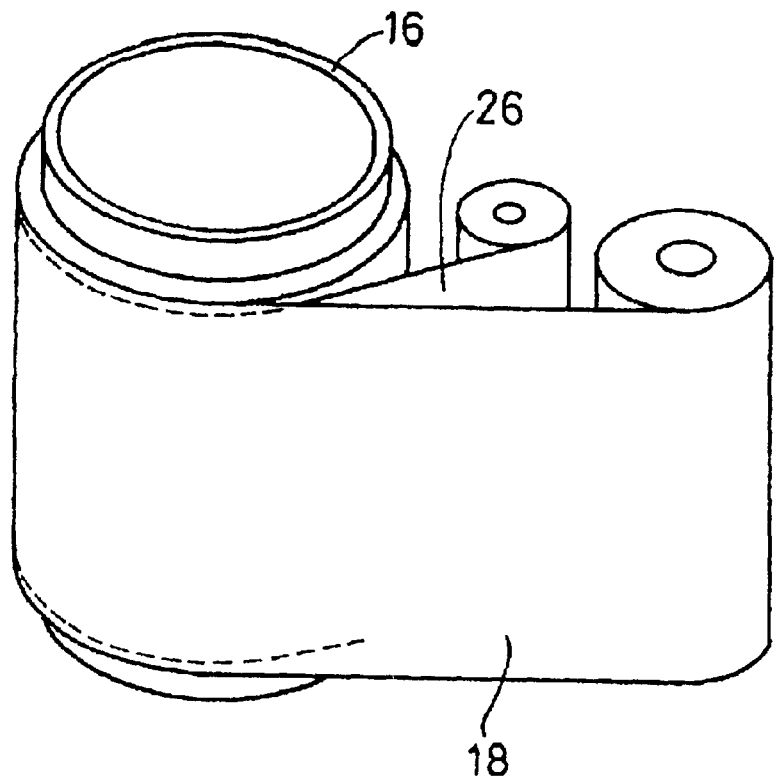
FIG. 3 is a perspective view showing another embodiment of a production method of a multi-layered endless belt according to the present invention.

Alternatively, the multi-layered endless belt of the present invention can be produced by simultaneously winding a nonthermoplastic polyimide film and an adhesive layer or a thermoplastic resin film around an axial core of a film winding means to produce a multi-layered endless belt. In this case, referring to FIG. 3, the nonthermoplastic polyimide film 18 and the thermoplastic resin film 26 which are separately delivered are laminated on the axial core 12 and are simultaneously wound to form the multi-layered endless belt. In this case, if a thin tube having an adhesion preventive layer made of fluororesin or the like disposed on the surface thereof is attached to the axial core 12 of the film winding means 10 to produce the axial core, the nonthermoplastic polyimide film and the thermoplastic resin film are simultaneously wound on the attachable and detachable tube while giving a tensile force, and then the thermoplastic resin portion is heat-welded to form the multi-layered endless belt according to the present invention. Thereafter, the multi-layered endless belt 20 and the attachable and detachable tube 16 are separated so that the multi-layered endless belt 20 can be taken out alone.

After the adhesive layer or the thermoplastic resin layer are heat-welded to integrate the laminated films with each other to form the multi-layered endless belt 20, it is taken out from the axial core 12 together with the tube 16, and thereafter the multi-layered endless belt 20 is separated from the tube 16 to obtain the multi-layered endless belt 20 as a single body. The obtained multi-layered endless belt 20 is used as a belt for conveying paper or the like, by retaining its original size or after being cut into a suitable width.

By the production method of the multi-layered endless belt according to this embodiment, the laminate film 18 is wound and the adhesive layer in the film is heat-welded, so that the layer thickness of the multi-layered endless belt 20 can be arbitrarily adjusted by the thickness of the laminate film 18 and the number of winding. Further, with respect to the size of the multi-layered endless belt 20, those having a large diameter to those having a small diameter and long ones to short ones can be easily fabricated by the size of the laminate film 18 and the size of the tube 16 around which it is wound, so that endless belts can be easily fabricated and moreover the thickness in the circumferential direction and the width direction can be made uniform.

As shown above, an embodiment of the production method of the multi-layered endless belt according to the present invention has been explained; however the present invention is in no way limited to the above-described modes.

For example, it is also preferable to wind the laminate film 18 around the tube 16 after the laminate film is electrostatically charged before winding the laminate film 18 around the attachable and detachable tube 16. By doing so, the films wound around the tube 16 are brought into close contact with each other by static electricity, so that uniform winding can be made without entangling air.

Figure 4:
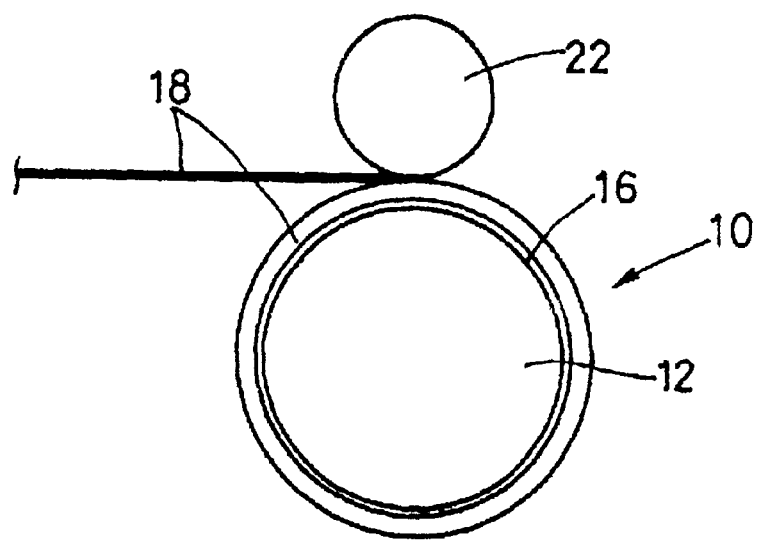
FIG. 4 is a front view of an essential part showing still another embodiment of a production method of a multi-layered endless belt according to the present invention.

Further, referring to FIG. 4, it is possible to make a construction in which, simultaneously with winding a film on the surface of the tube 16 disposed on the axial core 12 of the film winding means 10, the winding portion of the film is pressed by the roller 22 disposed almost in parallel with the axial core 12 for winding while removing air entangled between the films. In this embodiment, the multi-layered endless belt 20 may be formed by heat-welding the laminate film 18 after winding the laminate film 18; however, it is possible to make a construction in which a heater or the like is incorporated in one or both of the axial core 12 of the film winding means 10 and the roller 22 to heat-weld the laminate film 18 simultaneously with winding the laminate film 18 around the tube 16.

Figure 5:
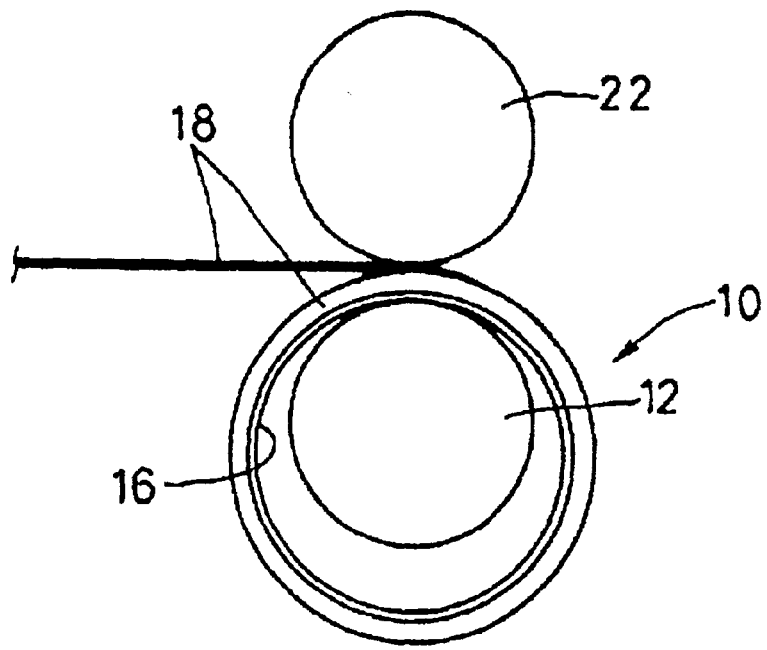
FIG. 5 is a front view of an essential part showing still another embodiment of a production method of a multi-layered endless belt according to the present invention.

Further, referring to FIG. 5, in the case of a form in which the film is sandwiched between the axial core 12 of the film winding means 10 and the roller 22 disposed almost in parallel with the axial core 12 for winding the film around the tube 16, the outer diameter of the axial core 12 may be sufficiently smaller than the inner diameter of the tube 16. In this embodiment, it is preferable to make a construction in which a heater or the like is incorporated in one or both of the axial core 12 of the film winding means 10 and the roller 22 to heat-weld the film simultaneously with winding the film around the tube 16. According to this mode, even if the diameter of the multi-layered endless belt 20 to be formed changes in various ways, it is sufficient to prepare only the tube 16 in accordance with its diameter, thereby providing an advantage of low cost needed for equipment.

In addition to the above-mentioned mode, in the production method of the endless belt according to the present invention, in winding the thermoplastic resin film 18 around the endless tube 16 fitted onto the axial core 12 of the film winding means 10, it is also preferable to simultaneously wind a sheet-like substance made of a different material having the same size as or a smaller size than the material film 18. The sheet-like substance made of the different material may be, for example, a glass-knitted sheet, metal foil, paper, nonwoven cloth, or the like, and one or more kinds selected from these are used.

The sheet-like substance 26 is selected in accordance with the use of the endless belt to be produced and, for example, a glass-knitted sheet is used for improving the mechanical characteristics such as a tensile strength. Further, a metal foil is used for improving the thermal conductivity and, in particular, an endless belt having a small thermal expansion and shrinkage and being excellent in thermal dimension stability is obtained by using a Fe—Ni alloy as the metal foil. Thus, improvements in the characteristics can be attained by interposing various materials between the layers of the material film, which are impossible by resin alone or mixture with resin. Also, various materials can be mixed in a ratio that is impossible by mixture of resins, and further improvement of a plurality of characteristics can be made by selection of the materials.

Figure 6:
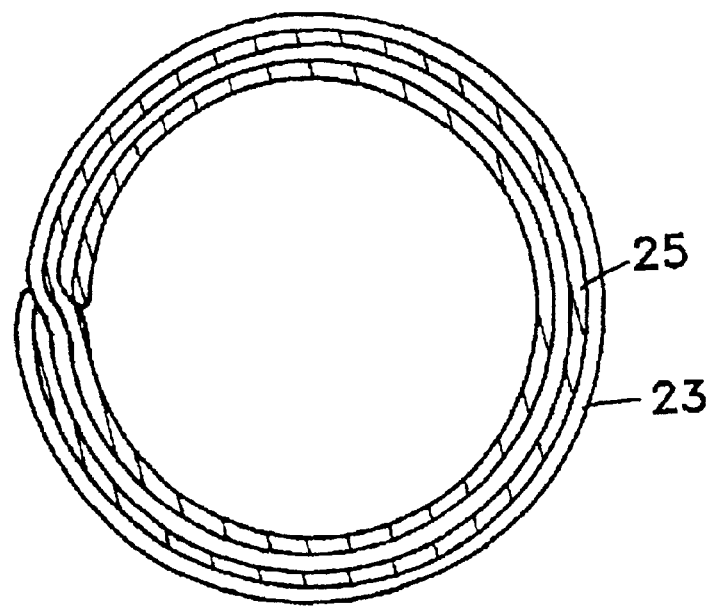
FIG. 6 is a cross-sectional model view of one example of a multi-layered endless belt according to the present invention.

The multi-layered endless belt of the present invention thus obtained has a cross section having a structure obtained by winding a laminate film and has a hollow central portion whether the belt is formed from a laminate film having a two-layer structure in which an adhesive layer or a thermoplastic resin layer 25 is disposed on the entire surface or at a specific portion of one surface of a nonthermoplastic polyimide film 23 or the belt is formed from a laminate film having a three-layer structure in which an adhesive layer or a thermoplastic resin layer 25 is disposed on the entire surface or at a specific portion of both surfaces of a non-thermoplastic polyimide film 23. One example of the cross section of the fundamental multi-layered endless belt of the present invention is shown in FIG. 6.

In such a multi-layered endless belt, the starting end and/or finishing end of winding can be formed to be smooth. By thus forming it to be smooth, the step difference at the end will be eliminated, which is convenient in using the multi-layered endless belt. The end is made smooth by adjusting the adhesive layer.

Here, in the present invention, the "smooth winding starting end" refers to the state in which the adhesive layer or the thermoplastic resin is melted and exuded to elute from the end by the temperature of thermal press-bonding at the overlapping portion of the laminate film wound for one round on the winding starting end in the winding process, to flatten the thickness of the laminate film and the winding starting end of the innermost layer which is the first round is made flat to eliminate the step difference portion of the end. Further, the "smooth winding finishing end" refers to the state in which the adhesive layer or the thermoplastic resin is melted and exuded to elute from the end by the heating of thermal press-bonding at the portion where the winding finishing end overlaps with the laminate film in the winding process of the laminate film, to flatten the thickness of the laminate film and the winding finishing end of the outermost layer which is the last layer is made flat to eliminate the step difference portion of the end.

Figure 7:
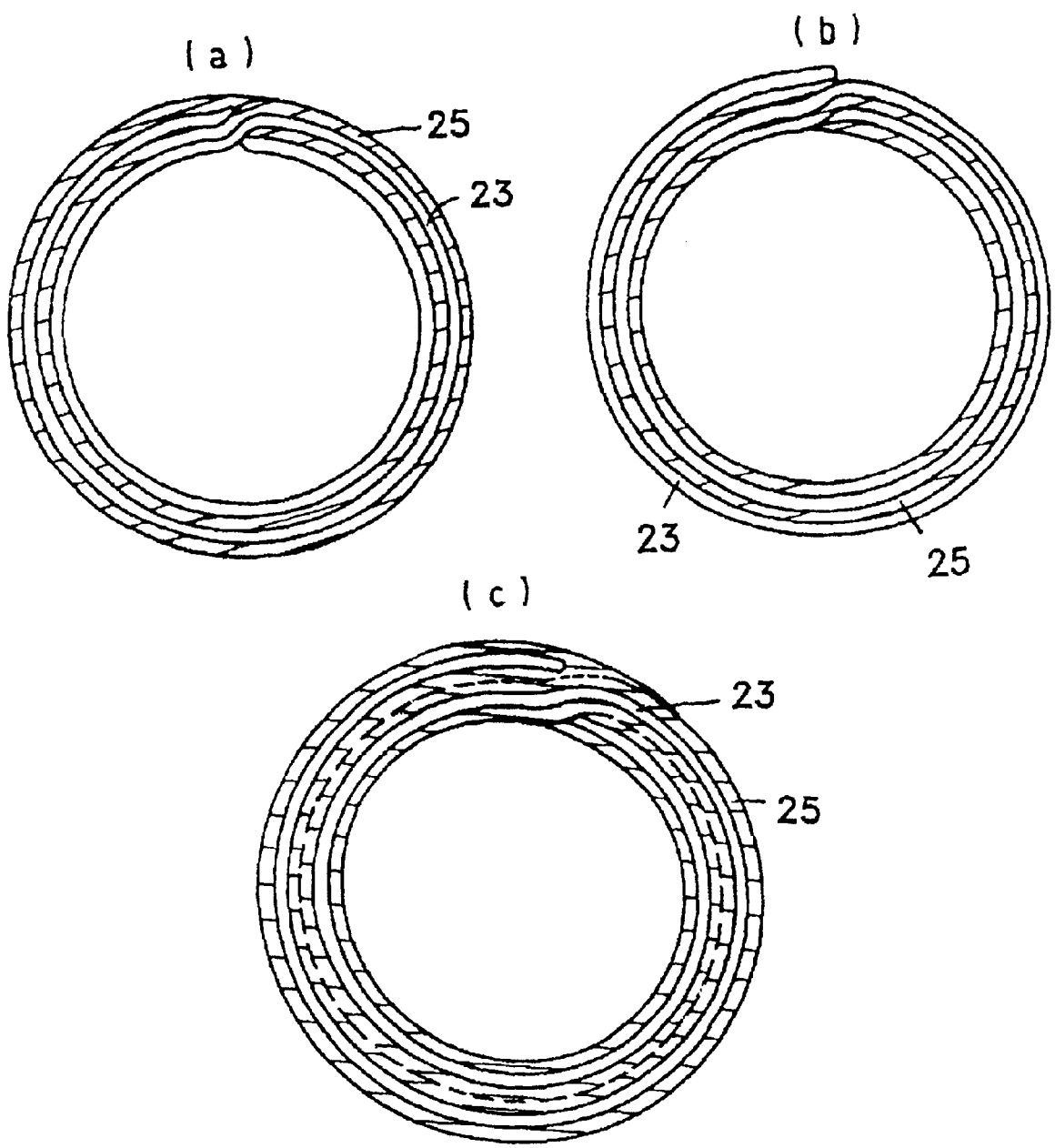
FIG. 7 is a cross-sectional model view of another example of a multi-layered endless belt according to the present invention.

For example, in the case where a laminate film 18 having an adhesive layer or a thermoplastic resin layer 25 on the entire surface or at a specific portion of one surface of a nonthermoplastic polyimide film 23 is wound around an axial core so that the nonthermoplastic polyimide film 23 comes near to the axial core side, the outermost layer having the winding finishing end made smooth with the adhesive layer or the thermoplastic resin layer can be formed, as shown in FIG. 7(a) illustrating one example. Conversely, in the case where the laminate film 18 is wound around the axial core so that the adhesive layer or the thermoplastic resin layer 25 comes near to the axial core side, the innermost layer having the winding starting end made smooth with the adhesive layer or the thermoplastic resin layer 25 can be formed, as shown in FIG. 7(b) illustrating one example. Further, the outermost layer and the innermost layer having a smooth winding starting/finishing end can be formed by winding a laminate film 18 having an adhesive layer or a thermoplastic resin layer 25 on the entire surface or at a specific portion of both surfaces of a nonthermoplastic polyimide film 23 around an axial core, as shown in FIG. 7(c) illustrating one example.

Figure 8:
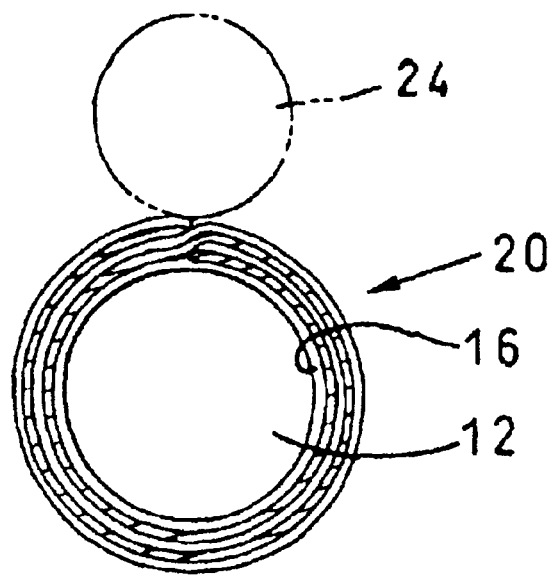
FIG. 8 is a front explanatory view of an essential part showing still another embodiment of a production method of a multi-layered endless belt according to the present invention.

As a specific means for forming the innermost layer having a smooth winding starting end or the outermost layer having a smooth winding finishing end, the heat-bonded multi-layered endless belt 20 is constructed to be pressed onto an adjacently disposed rotatable cylinder 24 or a tube while being held on the axial core 12 of the film winding means 10 and rotated, and one or both of the step differences formed at the winding starting end and the winding finishing end of the multi-layered endless belt are flattened, as shown in FIG. 8.

More preferably, in this processing of the end, it is preferable to make a construction in which a heat source is provided in the rotatable tube 24 disposed adjacent to the film winding means 10, and the surface temperature of the tube 24 is set at a temperature higher than the glass transition temperature Tg of the adhesive layer or the thermoplastic layer, more preferably higher by 30° C. than the glass transition temperature Tg of the adhesive layer or the thermoplastic layer, or at a temperature higher by 10° C. than the temperature needed for thermal cure, and the tube 24 is pressed onto the multi-layered endless belt 20 held by the axial core 12 of the film winding means 10 while being rotated. According to this embodiment, the end can be forced out to almost completely eliminate the step difference. Here, the surface provided in the tube 24 need not necessarily be a mirror surface, and may be for example a surface subjected to an almost uniform embossing treatment or the like. In this embodiment, a process of slip prevention or the like can be performed on the surface of the multi-layered endless belt 20.

Here, the film winding means 10 is for winding the laminate film 18, and incorporates therein a driving device capable of rotating the axial core 12 and capable of controlling the speed. Further, to the axial core 12 of the film winding means 10, a function of heating the laminate film wound around the tube 16 attached thereto is imparted. For example, the axial core 12 of the film winding means 10 can be constructed with a self-heat-generating heater and the thermoplastic resin film 18 can be constructed to be heat-welded by the heat generation of the axial core 12.

Figure 9:
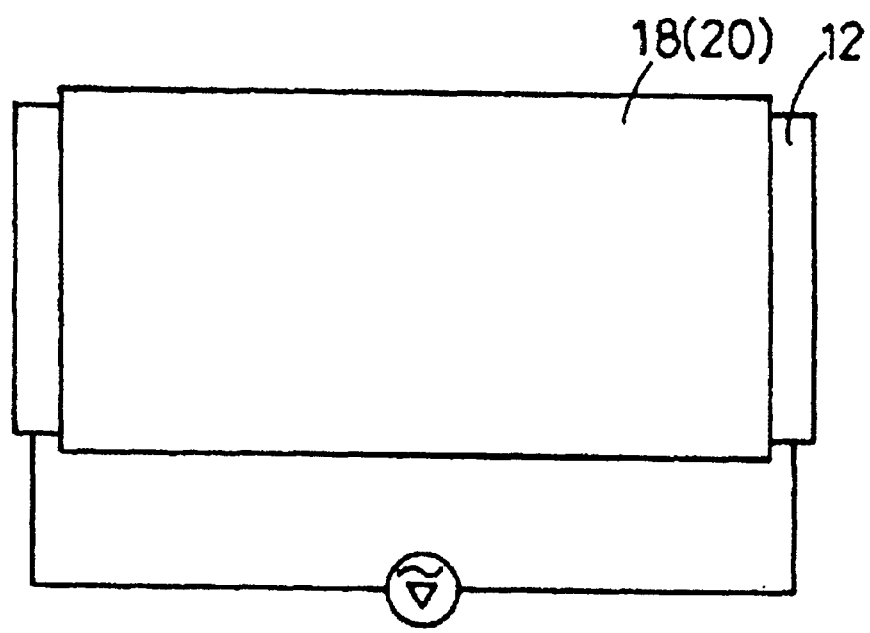
FIG. 9 is a side explanatory view showing still another embodiment of a production method of a multi-layered endless belt according to the present invention.

As the self-heat-generating heater, for example, at least the outer surface of the axial core 12 can be constructed with an electric resistor, or an electric resistor is formed on the surface of an insulator by plating, vapor deposition, or application to construct the heater that generates heat by energization, as shown in FIG. 9.

Figure 10:
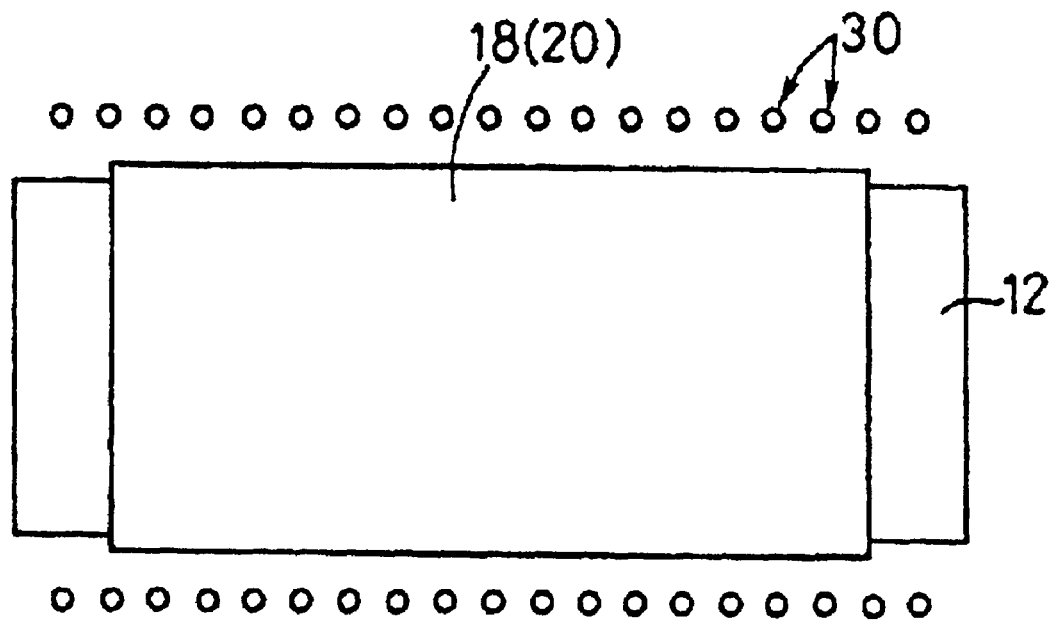
FIG. 10 is a side explanatory view showing still another embodiment of a production method of a multi-layered endless belt according to the present invention.

Further, the axial core of the film winding means 10 can be constructed with a hollow body having a heat source in the inside, and the laminate film 18 can be constructed to be heat-welded by the heat generation of the heat source. For example, referring to FIG. 10, various heaters can be disposed in the inside of the axial core 12 made of a hollow body, for example, by using a light-emitting heat generator 32 such as a halogen lamp as the heat source.

Figure 11:
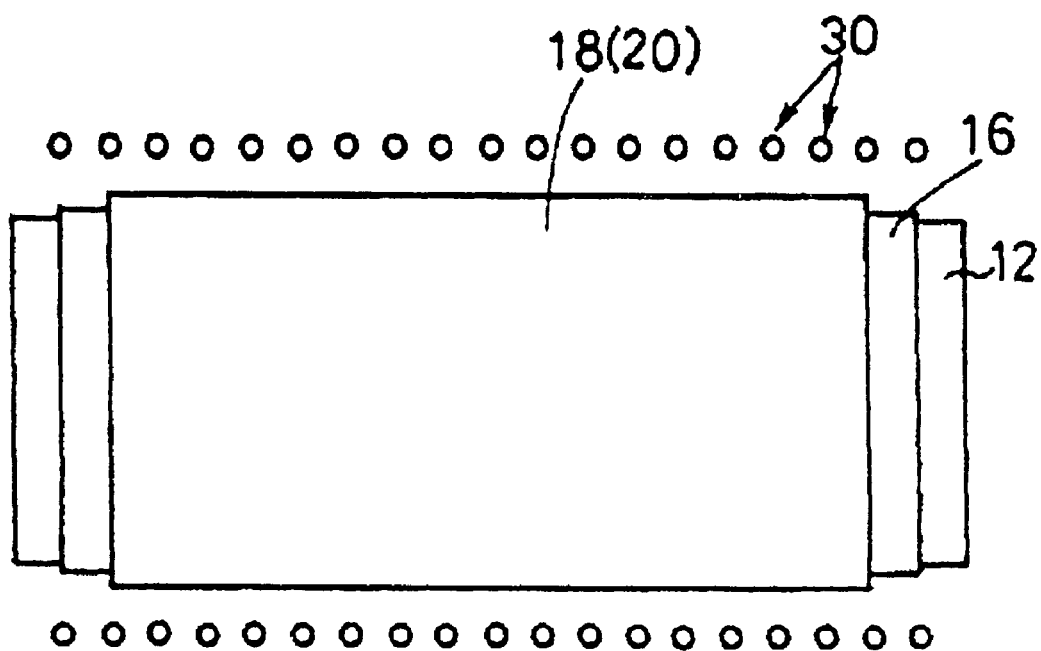
FIG. 11 is a side explanatory view showing still another embodiment of a production method of a multi-layered endless belt according to the present invention.

Furthermore, referring to FIG. 11, the attachable and detachable tube 16 can be constructed with a material made of a conductor selected from iron, stainless steel, aluminum, copper, or an alloy thereof, and the axial core 12 of the film winding means 10 can be constructed with any of the insulating materials including ceramics such as alumina and zirconia, glass having a heat resistance, and various minerals such as marble, and the laminate film 18 can be constructed to be heat-bonded by passing an electric current through a coil 30 for induction heating which is disposed around the axial core 12 of the film winding means 10 and generating heat in the attachable and detachable tube 16 by induction. In other words, the tube 16 is directly subjected to heat generation by electromagnetic induction.

Figure 12:
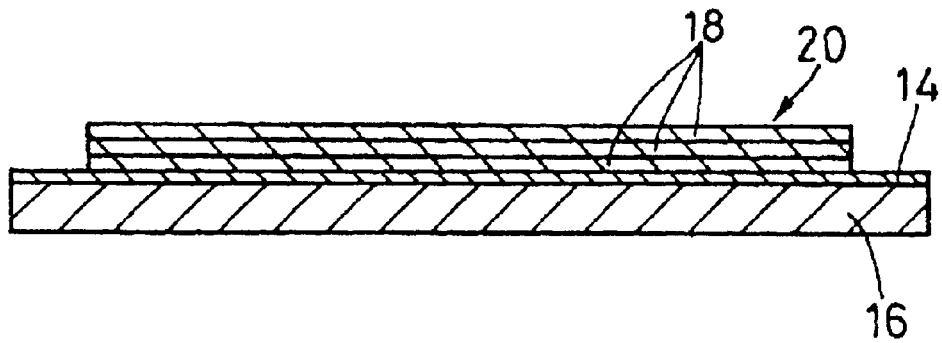
FIG. 12 is a front explanatory view of an essential part for explaining a production method of a multi-layered endless belt shown in FIG. 1.

On the other hand, it is required that the tube 16 has a heat resistance to a temperature above the heating temperature, and has a strength such that the tube 16 is not deformed even if the laminate film 18 is wound thereon, except for the above-mentioned special mode of use. Further, if the adhesive layer is heated via the tube 16 by heat from the axial core 12, the tube 16 preferably has a material quality excellent in thermal conductivity. A release layer 14 made of fluororesin or the like is disposed on the surface of the tube 16, as shown in FIG. 12, and it is constructed in such a manner that the multi-layered endless belt 20 formed by heat-bonding the adhesive layer thereon can be easily dismounted from the tube 16.

In the above-described construction, the tube 16 is attached to the axial core 12 of the film winding means 10 in a state of being attachable and detachable; the tube 16 is rotated together with the axial core 12; and the laminate film 18 is wound on the surface of the tube 16 for at least two winds while being given a constant tensile force. In winding, the laminate film 18 may be wound so that the nonthermoplastic polyimide film comes to the axial core side. Conversely, however, it is possible to wind it so that the adhesive layer comes to the axial core side. The tensile force imparted at this time may be sufficiently such that it can allow the laminate film to be in close contact and wound.

In winding the laminate film around the tube 16, it is preferable to wind it under a reduced pressure atmosphere of at most 1330 Pa, particularly under a reduced pressure atmosphere of at most 133 Pa, because then air will not be entangled between the films. The laminate film 18 may be heat-bonded simultaneously with winding the laminate film 18 around the tube 16; however, it is convenient if the laminate film 18 is heat-bonded after the laminate film 18 is wound until the laminate film 18 has a required layer thickness, because then the layer thickness can be easily controlled and the shape of the obtained multi-layered endless belt can be easily controlled.

As the heating temperature of the axial core main body, it is preferable that the surface temperature of the axial core 12 of the film winding means 10 is higher by 30° C., preferably by 50° C., than the glass transition temperature Tg of the material of the adhesive layer. Alternatively, it is preferably a temperature higher by 10° C. than the temperature needed in heat-curing the adhesive layer or the thermoplastic resin layer. In order to heat-bond the adhesive layer or the thermoplastic resin layer, it is necessary that at least the temperature of the axial core 12 is set at a temperature higher by 30° C., more preferably by 50° C., than the glass transition temperature Tg of the adhesive or the thermoplastic resin, in order to improve the productivity.

If the multi-layered endless belt obtained by the aforesaid various methods is used as a conveying belt for electrostatically adsorbing and conveying paper, OHP film, or the like, various electrically conductive patterns are provided on the outer circumference of the multi-layered endless belt by a method such as printing, vapor deposition, etching, or plating.

The layer thickness of the multi-layered endless belt of the present invention obtained in the above-described manner can be arbitrarily adjusted by the thickness of the film and the number of winding, and further the thicknesses in the circumferential direction and in the width direction can be made constant. Further, this production method has high general-purpose properties and can lower the production costs.

Next, the medium conveying belt according to the present invention will be explained hereafter.

The medium conveying belt according to the present invention is made of a base layer for obtaining a physical strength of the medium conveying belt on which an electrode pattern is formed for applying a voltage to generate an electrostatic adsorption power, and a protective layer for protecting it and facilitating the adsorption of a held body such as paper or OHP. Both of these layers are formed by welding and/or curing the polymer film by heating after winding the polymer film around a supporting body, and it has a construction such that an electrically conductive electrode pattern is disposed on the outer circumferential surface of the multi-layered endless belt or the thermoplastic resin film obtained in the above-mentioned manner, and it further has an electrode protective layer on the outer circumferential surface of this electrode pattern.

A method of producing the medium conveying belt of the present invention is such that first a resin tubular body to become a base is constructed. As the resin tubular body, a material film constituting the aforesaid multi-layered endless belt can be used. For example, it is constructed by winding a laminate film having an adhesive layer or a thermoplastic resin layer laminated on a nonthermoplastic resin layer, or by winding a thermoplastic resin film. If it is sufficient that the tubular body 12 functions only as a supporting body of the electrode pattern 14, the tubular body may have any characteristics as long as it has a predetermined mechanical strength. Representatively, the tubular body 12 of the present invention is made of a polymer material having a tensile elasticity of at least 1.96 GPa and/or a glass transition temperature of at least 150° C. The tensile elasticity at this time is measured by a method according to ASTM D882, and the glass transition temperature is measured by a method according to JIS K 7121.

Here, the thermoplastic resin used in the medium conveying belt according to the present invention is not particularly limited as long as it is a thermoplastic resin used in the aforesaid multi-layered endless belt; however, a thermosetting resin such as epoxy resin, phenolic resin, or cyanate ester resin can be used by mixing it with such a thermoplastic resin as long as it does not deteriorate the flexibility. Among these, a thermoplastic polyimide being excellent in electrical insulation, slidability, long-term heat resistance reliability, stiffness at an ordinary temperature, and others is especially preferable.

As the thermoplastic polyimide resin, those having a glass transition temperature Tg of at least 150° C., more preferably at least 230° C., can be preferably used. The medium conveying belt 10 is a belt used for conveying paper, OHP film, or the like in an electrophotographic device such as a copier, a laser beam printer, or a facsimile, or a belt for conveying and drying paper, OHP film, or the like of an ink jet printer device or a bubble jet printer device. Therefore, if the thermoplastic polyimide resin constituting the medium conveying belt has a glass transition temperature Tg of at least 150° C., more preferably at least 230° C., in the use condition of the belt, the thermoplastic polyimide resin used below the glass transition temperature Tg functions as a heat-resistant resin. Unlike a conventional nonthermoplastic (thermosetting) polyimide film, the thermoplastic polyimide film has a melting fluidity at a predetermined high temperature region while having a heat resistance, and is excellent in processability. Further, the adhesion at the seam portion in the heat-resistant resin belt of the present invention is excellent as compared with the nonthermoplastic polyimide film. As an example, the thermoplastic polyimide used in the medium conveying belt of the present invention is preferably one containing, as a major component, a structure such that the chemical structural formula is represented by the general formula

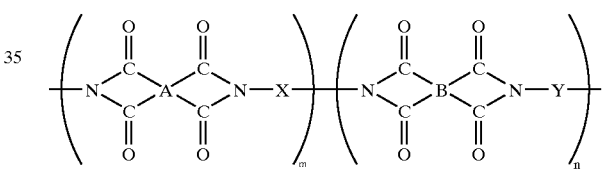

(in the formula, m, n are each equal to the molar ratio of each repetition unit in the polymer chain; m is within the range from about 0.1 to about 0.9; n is within the range from about 0.9 to about 0.1. However, the ratio of m and n is about 0.01 to about 9.0. A, B are each a tetravalent organic group; and X, Y each represent a bivalent organic group).

Further, as acid dianhydride, A in the general formula (1), which is a monomer that imparts thermoplasticity, is preferably at least one kind selected from the group of tetravalent organic groups represented by the general formula (2):

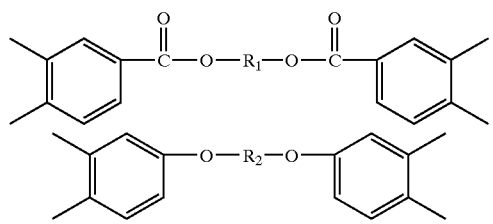

(in the formula, $R_1$ and $R_2$ each represent a bivalent organic group).

Further, B in the aforesaid general formula (1) is preferably at least one kind selected from the group of tetravalent organic groups represented by:

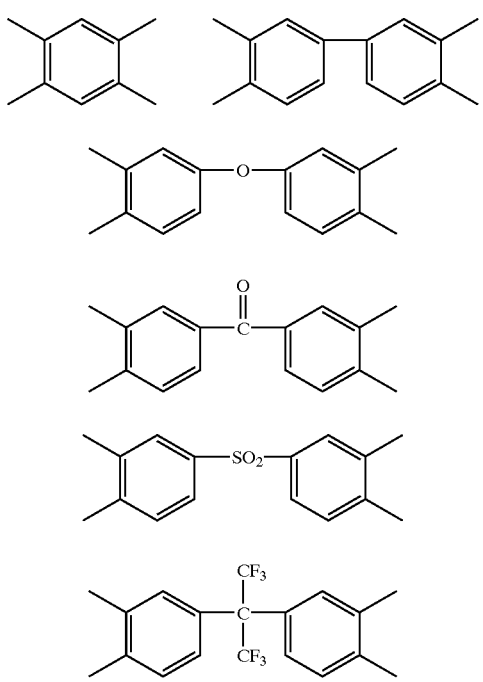

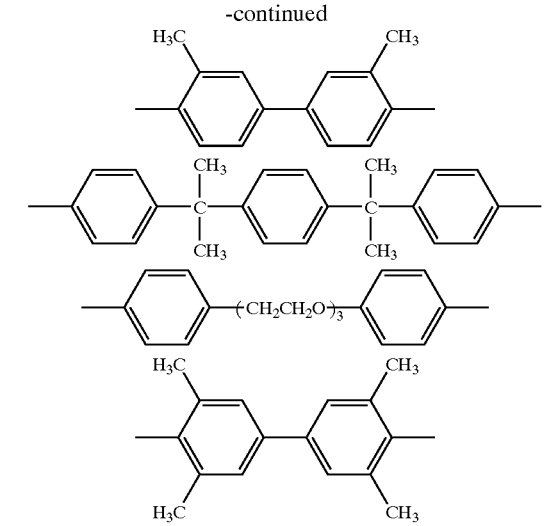

Further, as diamine, X, Y in the aforesaid general formula (1) each are preferably at least one kind selected from the group of bivalent organic groups represented by the general formula (3):

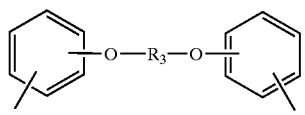

(in the formula, $R_3$ represents a bivalent organic group), which is a monomer that imparts thermoplasticity, and the chemical formula 5:

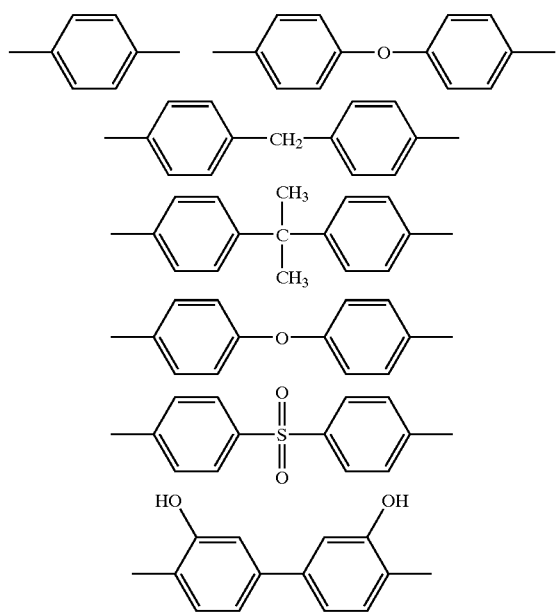

Here, the production method of the thermoplastic polyimide is exemplified as follows.

First, acid dianhydride composed of acid dianhydride (preferably 10 to 90 mol %) having an ester group in the molecule chain shown in the aforesaid general formula (2) and aromatic acid dianhydride (preferably pyromellitic dianhydride) containing a tetravalent organic group shown in the aforesaid chemical formula 3 is allowed to react with diamine containing a bivalent organic group of the aforesaid general formula (3) and the chemical formula 5 in an organic solvent to obtain a polyamide acid solution which is a precursor solution of polyimide. Then, it is dried by heating and converted into imide to obtain polyimide. However, this embodiment is exemplary and it is not limited to this alone.

Further, in a film made of a thermoplastic resin alone, it is possible to add an inorganic or organic filler, or a fibrous substance to the resin in order to compensate for the insufficiency of elastic modulus.

Further, as the nonthermoplastic resin constituting the laminate film, any resin known to those skilled in the art can be used; however, polyimide being excellent in electrical insulation, slidability, long-term heat resistance reliability, stiffness at ordinary temperature, and others is especially preferable. The nonthermoplastic polyimide films contain all of the resins represented as thermosetting polyimide resins or reaction-curing type polyimide resins or the like. Further, as the nonthermoplastic polyimide film, it is possible to use, for example, a film made of nonthermoplastic polyimide resin alone; however, it is possible to use a film made of a mixture of nonthermoplastic polyimide film and an additive. In order to mix the additive with the nonthermoplastic polyimide film, the additive is mixed with its precursor.

As the nonthermoplastic polyimide film, it is possible to use, for example, a film made of a resin having a structural formula represented by the general formula (4):

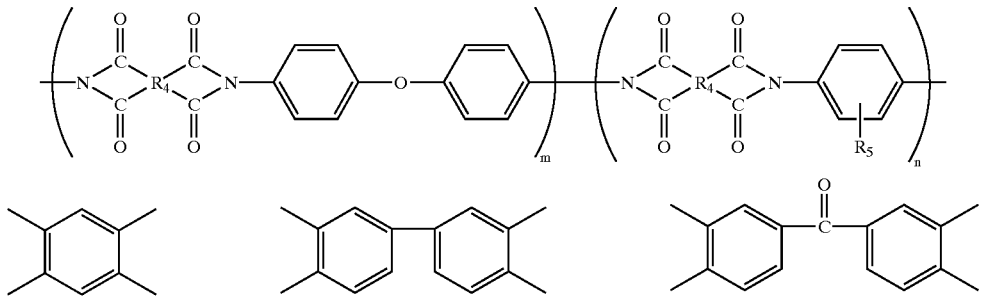

(wherein $R_4$ is a tetravalent organic group; $R_5$ is a hydrogen atom or a monovalent substituent; m, n are integers; and m/n assumes a value from 0.1 to 100); however, it is not limited to this alone.

Generally, in the medium conveying belt, it is necessary that the stiffness and the surface flatness are both above a constant level. Therefore, in this case, laminate films in which the thickness ratio of the nonthermoplastic resin and the thermoplastic resin is changed in various ways can be constructed to provide a suitable balance among the properties.

The thickness of one thermoplastic resin film or one laminate film is from 5 μm to 100 μm, preferably from 10 μm to 50 μm, further preferably from 10 μm to 30 μm. If the thickness is smaller than this, the winding work in winding the film around the axial core will be difficult, whereas if the thickness is larger than this, the step difference at the starting point and the finishing point of winding will be large.

If the laminate film is used, its thickness construction is determined by the balance of properties required in the medium conveying belt to be obtained; however, as an example, a laminate film can be used in which an adhesive layer or a thermoplastic resin layer of 3 μm to 50 μm, preferably 3 μm to 25 μm is formed on one surface or both surfaces of a nonthermoplastic resin film of 5 μm to 25 μm, preferably 7 μm to 15 μm. If the thickness of the nonthermoplastic resin film is smaller than this, it will be difficult to form the thermoplastic resin layer in view of work. On the other hand, if the thickness of the adhesive layer or the nonthermoplastic resin film is larger than this, the step difference at the starting point and the finishing point of winding will be large. If the thickness of the thermoplastic resin layer is smaller than this, it is not possible to obtain sufficient integration of the resins, and also the step difference at the starting point and the finishing point of winding will be large. If the thickness of the thermoplastic resin layer is larger than this, the stiffness of the whole belt body will be low, and the effect obtained by lamination with the nonthermoplastic resin will be less likely to appear.

Further, the properties such as the electric resistance and the dielectric constant of the thermoplastic resin film and the laminate film and/or the electrode protective layer (or the dielectric layer) of the medium conveying belt of the present invention can be adjusted to suitable values by adding a filler such as carbon, metal, metal oxide, or a mineral. Paper, OHP film, and others can be adsorbed more strongly and conveyed and, by suitably selecting the filler, it is possible to exhibit the effect that the adsorptive power and the conveying power, which changes with temperature in a single body of resin, will be stable without variation by the temperature change. An additive with the maximum dimension of at most 30 μm is used. The reason why it is limited to the additive of this size is that, if it has a larger size than this, it will not be preferable for the surface property and others when the additive is mixed with a thin resin layer. Further, if the additive is mixed at a ratio exceeding 30 wt % with respect to the resin, it is not preferable because the surface property of the resin coating layer will be deteriorated and moreover the strength will decrease.

A filler is preferably mixed with the thermoplastic resin film or the laminate film for preventing the blocking, in view of the workability of winding the film. If the filler is large, it will be a foreign substance, so that it is preferable to fill it with a filler having the maximum particle size of at most 5 μm. Here, the reason why the maximum dimension of the filler that can be added to the thermoplastic film or the laminate film is limited to at most 5 μm is that, if the additive has a size larger than this, it is not preferable from the viewpoint of surface property or the like in the case of a film in which the source material film is thin, and also, if the additive is mixed at a ratio exceeding 30 wt % with respect to the resin, it is not preferable because the surface property of the resin coating layer will decrease and moreover there will appear an adverse effect that the strength will decrease. The kind, quantity, and size of the additive are set to be the optimum from the required properties of the endless belt.

As the resin to be used in the resin film for forming the electrode protective layer, thermoplastic resin, nonthermoplastic resin, rubber, and thermoplastic elastomer may be mentioned. These include resins known as thermosetting resin, reaction-curing resin, or ionomer. More specifically, isobutylene maleic anhydride copolymer, AAS (acrylonitrile—acryl—styrene copolymer), AES (acrylonitrile—ethylene—styrene copolymer), AS (acrylonitrile—styrene copolymer), AB (acrylonitrile—butadiene copolymer), ABS (acrylonitrile—butadiene—styrene copolymer), ACS (acrylonitrile—chlorinated polyethylene—styrene copolymer), MBS (methyl methacrylate—butadiene—styrene copolymer), ethylene—vinyl chloride copolymer, EVA (ethylene—vinyl acetate copolymer), EVA-based (ethylene—vinyl chloride copolymer-based), EVOH (ethylene vinyl alcohol copolymer), polyvinyl acetate, chlorinated polyvinyl chloride, chlorinated polyethylene, chlorinated polypropylene, carboxyvinyl polymer, ketone resin, norbornene resin, vinyl propionate, PE (polyethylene), PP (polypropylene), TPX, polybutadiene, PS (polystyrene), styrene maleic anhydride copolymer, methacryl, EMAA (ethylene methacrylic acid), PMMA (polymethyl methacrylate), PVC (polyvinyl chloride), chlorinated polyether, polyvinylidene chloride, PVA (polyvinyl alcohol), polyvinyl ether, polyvinyl butyral, polyvinyl formal, cellulose-based resin, nylon 6, nylon 6 copolymer, nylon 66, nylon 610, nylon 612, nylon 11, nylon 12, copolymerized nylon, nylon MXD, nylon 46, methoxymethylated nylon, aramid, PET (polyethylene terephthalate), PBT (polybutylene terephthalate), PC (polycarbonate), POM (polyacetal), polyethylene oxide, PPE (polyphenylene ether), denatured PPE (polyphenylene ether), PEEK (polyether ether ketone), PES (polyether sulfone), PSO (polysulfone), polyamine sulfone, PPS (polyphenylene sulfide), PAR (polyarylate), polyparavinylphenol, polyparamethylenestyrene, polyallylamine, aromatic polyester, liquid crystalline polymer, PTFE (polytetrafluoroethylene), ETFE (tetrafluoroethylene—ethylene), FEP (tetrafluoroethylene—hexafluoropropylene), EPE (tetrafluoroethylene—hexafluoropropylene—perfluoroalkyl vinyl ether), PFA (tetrafluoroethylene—perfluoroalkyl vinyl ether), PCTFE (polychlorotrifluoroethylene), ECTFE (ethylene—chlorotrifluoroethylene), PVDF (polyvinylidene fluoride-based), PVF (polyvinyl fluoride), PU (polyurethane), phenolic resin, urea resin, melamine-based resin, guanamine resin, vinyl ester resin, unsaturated polyester, oligoester acrylate, diallyl phthalate resin, DKF resin, xylene resin, epoxyresin, furan resin, PI (polyimide-based), PEI (polyetherimide), PAI (polyamideimide), acrylsilicone, silicone, poly(p-hydroxybenzoic acid), maleic acid resin, NR (natural rubber), IR (isoprene rubber), SBR (styrene butadiene rubber), BR (butadiene rubber), CR (chloroprene rubber), IIR (isobutylene isoprene rubber), NBR (nitrile butadiene rubber), EPM (ethylene propylene rubber), EPDM (ethylene propylene diene rubber), CPE (chlorinated polyethylene rubber), CSM (chlorosulfonated polyethylene rubber), ACM (acryl rubber), ethylene acryl rubber, U (urethane rubber), silicone rubber, fluororubber, ethylene tetrafluoride propylene rubber, CHR (epichlorohydrin rubber), polysulfide rubber, hydrogenated nitrile rubber, polyether-based special rubber, liquid rubber, norbornene rubber, TPO (olefinic thermoplastic elastomer), TPU (urethane-based thermoplastic elastomer), PVC (vinyl chloride-based thermoplastic elastomer), TPS (styrenic thermoplastic elastomer), TREE (polyester-based thermoplastic elastomer), PA-based (polyamide elastomer), PB-based (butadiene elastomer), soft fluororesin, fluorine-based elastomer, elastic epoxy resin, and others, and combinations of two or more kinds of resins selected from these may be mentioned.

Among these, if the medium conveying belt of the present invention is exposed to high temperature, thermoplastic resin, rubber, and thermoplastic elastomer having a melting temperature of at least 150° C. are preferable. Further, it is possible to prepare a resin film for an electrode protective layer by superposing a plurality of resins.

Further, among these, the water absorptivity of the resin that forms the resin film is preferably low for preventing leakage currents under a high-temperature and high-humidity environment, maintaining a high adsorbing power under the high-temperature and high-humidity environment, and preventing the insulation breakdown when the paper absorbs ink. In particular, if an adsorptive power under a use environment of 30° C. and 80% RH is needed, it is preferable to use a resin having a water absorptivity of at most 1%, more preferably at most 0.5%.

Here, the water absorptivity is a value measured based on JIS K 7209. More specifically, it is calculated from the equation:

$$\text{water absorptivity (\%)} = (W2-W1) \div W1 \times 100$$

where W1 is the weight of a test piece film when it is dried for 24±1 hours in a thermostatic tank kept at 50° C.±2° C. and left to cool in a desiccator, and W2 is the weight after it is immersed in distilled water for 24 hours and then the water drops on the surface are wiped out. Hereafter, when the water absorptivity is mentioned in this specification, this measurement and calculation method are used. If a resin having a water absorptivity of at most 1% is used in the electrode protective layer, it is preferable because then the adsorptive power and the insulation breakdown resistance under a high-temperature and high-humidity environment are imparted to the medium conveying belt.

Further, if one wishes to impart an ink resistance property to the belt surface, the electrode protective layer is preferably an ink resistant resin alone or a composite resin obtained by mixing an electrically conductive additive and/or a high dielectric constant additive with an ink resistant resin. Here, the ink resistant resin is not limited, but may be, for example, at least one or more kinds of resins selected from the group consisting of fluororesin, olefinic resin, styrenic resin, acrylic resin, silicone resin, polyacetal resin, and aromatic resin, or a mixed resin containing at least 30 vol % of these resins.

If heat resistance is needed, it is preferable to use a polyimide resin or a fluororesin, and in particular, it is preferable to use a thermoplastic polyimide resin having a glass transition temperature of at least 150° C. If alkali resistance is needed on the belt surface, it is preferable to use a polyether ether ketone resin, a polyvinyl fluoride resin, or a fluororesin.

In order to simultaneously ensure the adsorptive power and the alkali resistance of the medium, the resin film preferably contains a vinylidene fluoride resin having a structure of —$CF_2$—$CF_2$—. In the present invention, a vinylidene fluoride resin having the aforesaid structure is a copolymer which consists of a vinylidene fluoride monomer and another monomer and contains at least 10 mol %, more preferably at least 20 mol %, of the vinylidene fluoride monomer. More preferably, the resin is a polymer alloy containing at least 30 vol % of the vinylidene fluoride resin. Here as an example of a vinylidene fluoride resin, polyvinylidene fluoride resin, vinylidene fluoride—hexafluoropropylene rubber, vinylidene fluoride—hexafluoropropylene—tetrafluoroethylene rubber, vinylidene fluoride—pentafluoropropylene rubber, vinylidene fluoride—pentafluoropropylene—tetrafluoroethylene rubber, vinylidene fluoride—perfluoromethyl vinyl ether—tetrafluoroethylene rubber, vinylidene fluoride—chlorotrifluoroethylene rubber, thermoplastic fluororubber (Daiel T-530, Daiel T-630 manufactured by Daikin Chemical Co., Ltd. and others), soft fluororesin (Cefral Soft G150F100N, Cefral Soft G150F200 manufactured by Central Chemical Co., Ltd. and others) may be mentioned, and at least one or more kinds of resins selected from these are used in accordance with the purpose. A urethane resin, a vinyl chloride resin, a polyethylene resin, and others are exemplified as the other resin that is combined for forming a polymer alloy with a vinylidene fluoride resin; however, any resin known to those skilled in the art can be used, and it is not particularly limited.

The specific volume resistance of the electrode protective layer is from $10^9$ to $10^{15}$ Ωcm, preferably from $10^{10}$ to $10^{14}$ Ωcm, and the dielectric constant is at least 3.0 and at most 30.0, preferably at least 5.0 and at most 30.0. If the specific volume resistance is below $10^9$ Ωcm, the insulation between adjacent electrodes will be insufficient, and the leakage current will flow. On the other hand, if the specific volume resistance exceeds $10^{15}$ Ωcm, electric charge is more unlikely to be induced on the surface of the electrode protective layer, and the adsorptive power will decrease. Further, even after the voltage applied to the electrode is removed, there will be a residual electric charge for a long period of time, and the paper will remain adsorbed, so that it is not preferable. On the other hand, if the dielectric constant is below 3.0, the electric charge on the belt surface will be insufficient at the time of voltage application, and the power of adsorbing paper will be insufficient, so that it is not preferable.

In order to make an adjustment so that the electrode protective layer may have a predetermined specific volume resistance and a predetermined dielectric constant as described above, it is preferable to suitably mix powder of electrically conductive material and/or a high dielectric material or metal ions exhibiting the ion conductivity, with the resin constituting the electrode protective layer.

Here, carbon powder, graphite, metal powder, metal oxide powder, metal oxide subjected to electrical conduction treatment, an antistatic agent, and others may be mentioned as the electrically conductive powder used for adjusting the specific volume resistance of the electrode protective layer, and at least one or more kinds of electrically conductive powder selected from these are used in accordance with the purpose. The amount of addition of the powder of electrically conductive material is suitably set by the specific volume resistance of the intended electrode protective layer. However, typically with respect to the total volume that forms the electrode protective layer, 2 to 50 vol % are preferable, and 3 to 30 vol % are more preferable. The size of the article of electrically conductive material is suitably selected in accordance with the purpose; however, those typically having an average particle size of at most 50 $\mu$m are preferable, and those having an average particle size of at most 10 $\mu$m are more preferable, and those having an average particle size of at most 1 $\mu$m are still more preferable.

Further, powder of inorganic material having a dielectric constant of at least 50 is used as the high dielectric constant powder used for adjusting the dielectric constant of the electrode protective layer and, for example, titanium oxide, barium titanate, potassium titanate, lead titanate, lead niobate, titanate zirconate, powder of material having magnetism such as ferrite, and others may be mentioned. More preferably, an inorganic material having a dielectric constant of at least 100 is preferably used and, for example, barium titanate, titanate zirconate, titanium oxide, and magnetic powder may be mentioned. The shape of the particle of high dielectric material is not particularly limited; however, it is for example spherical, flake-shaped, whisker-shaped, or the like, and at least one or more kinds of high dielectric constant powder selected from these are used in accordance with the purpose. Also, the size of the particle of the high dielectric material is not particularly limited, but if the powder is spherical, those typically having an average particle size of at most 50 $\mu$m are preferable, and those having an average particle size of at most 10 $\mu$m are more preferable, and those having an average particle size of at most 1 $\mu$m are still more preferable. If the powder is whisker-shaped, those having a length of at most 50 $\mu$m and a diameter from 0.5 to 20 $\mu$m can be used. Further, the addition amount of the powder of high dielectric material is suitably set by the dielectric constant of the intended electrode protective layer, but typically 5 to 50 vol % are preferable, and 10 to 30 vol % are more preferable.

The ion conductive metal salt to be added for adjusting the specific volume resistance of the electrode protective layer may be, for example, LiF, LiCl, LiBr.nH$_2$O, LiSCN, NaCl, NaBr, NaI, NaSCN, KCl, KBr, KI, KSCN, or the like.

Two or more kinds of different films can be constructed into a plurality of layers as the electrode protective layer. For example, by using a resin having a high hardness only in the outermost layer among the plurality of layers, the surface property can be changed alone while maintaining desired characteristics such as elastic modulus.

On the other hand, the thickness of the electrode protective layer in the present invention can be arbitrarily set in accordance with the thickness of the electrode protective resin film and its winding number. The winding number is preferably at least two. The thickness of the electrode protective layer obtained in this manner is preferably at least 50 $\mu$m and at most 200 $\mu$m. If the thickness of the electrode protective layer is less than 50 $\mu$m, there will be insufficient breakdown voltage of the electrode protective layer. On the other hand, if the thickness of the electrode protective layer is more than 200 $\mu$m, it is not possible to obtain a sufficient adsorptive power to the medium.

Figure 13:
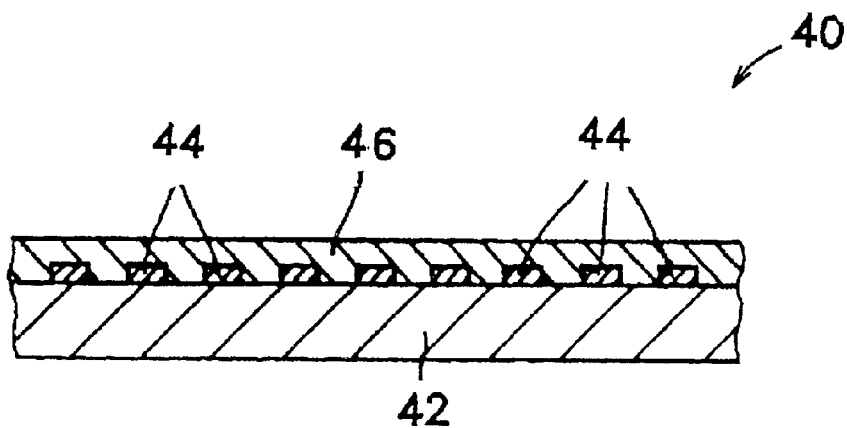
FIG. 13 is an enlarged cross-sectional explanatory view of an essential part showing an embodiment of a medium conveying belt which is an application example of a multi-layered endless belt according to the present invention.
Figure 14:
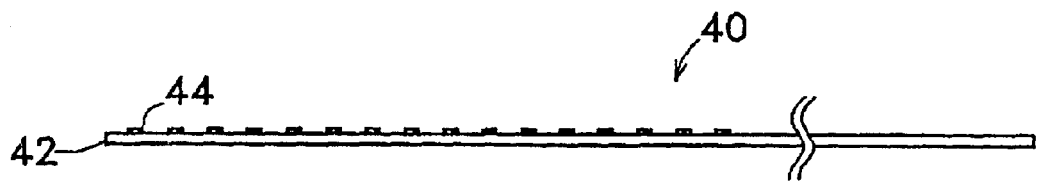
FIG. 14 is a side view of a film with an electrode pattern which is used in a medium conveying belt according to the present invention.

Next, one example of the production method of the medium conveying belt 40 of the present invention will be explained in more detail on the basis of the drawings. In the medium conveying belt such as shown in FIG. 13 according to the present invention, first an electrically conductive electrode pattern 44 can be formed on one surface of one end of the outer surface of a polymer material 42 serving a base made of a laminate film having a thermoplastic resin layer disposed on one surface or both surfaces of a nonthermoplastic resin film prepared by the extrusion method, the casting method, or the like, or a thermoplastic resin film, as shown in FIG. 14.

The size of the electrode pattern 44 is provided to extend the whole length in the width direction of the film 42 except for the end where the voltage is applied. In the length direction of the film 42, it is disposed to have one circumferential length of the outer circumference when the film 42 is wound around the axial core. The thickness of the electrode pattern 44 is from 2 to 30 $\mu$m, preferably from 5 to 20 $\mu$m, when one takes into account the unevenness of the surface brought about by the electrode pattern 14. Further, the line width and pitch of the electrode pattern 14 are arbitrary, and can be set in various ways.

Figure 15:
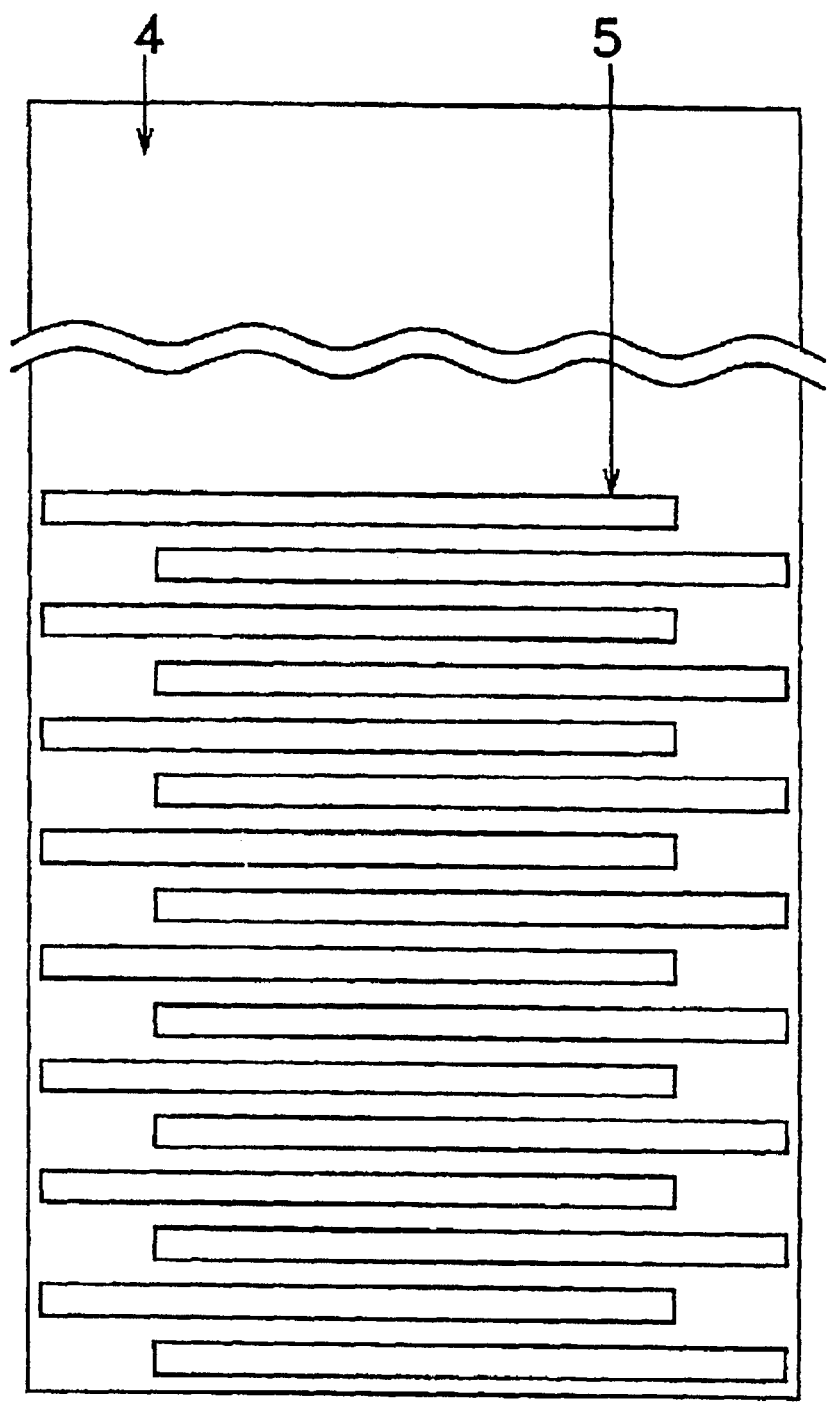
FIG. 15 is an explanatory view showing a processed state of a film with an electrode pattern of a medium conveying belt according to the present invention.

Referring to FIG. 15, the predetermined electrode pattern 44 is constructed so that its ends alternately extend out and the voltage can be applied. The method of forming the electrode pattern 44 on the film is not particularly limited. For example, if an electrically conductive metal is used as a material for the electrode pattern 44, it is constructed by the method in which the pattern is formed by nonelectrolytic plating on a thermoplastic resin film or a laminate film 42; by the method in which the film 42 is subjected to electrolytic plating and then the pattern is formed by etching the plated metal except for the needed portion; by the method in which an electrically conductive paste made of silver, copper, aluminum, carbon, or the like is screen-printed on the surface of a film; by the method in which the surface of a film is coated with a metal foil or a metal thin film such as aluminum or copper and then the pattern is formed by etching; by the method in which a metal such as aluminum is vapor-deposited via a mask having a predetermined pattern formed thereon to form it into the predetermined pattern; or the like method. The electrode pattern 44 is not limited to the illustrated shape, so that for example it can be formed in a comb-teeth shape and a pattern can be made in which the comb-teeth pattern is fitted into the another pattern with a space. However, other electrode patterns can be formed.

Figure 16:
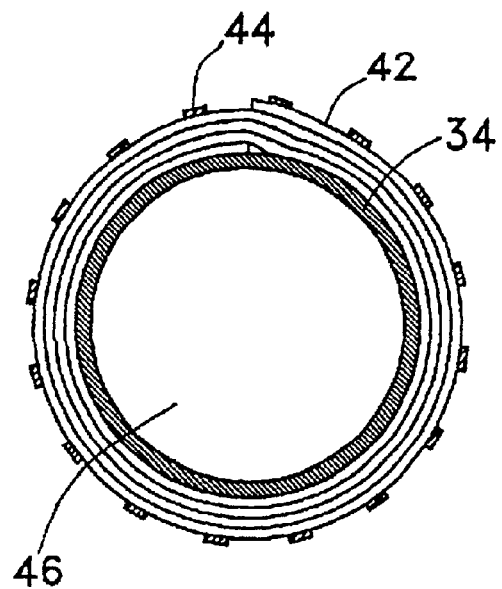
FIG. 16 is a cross-sectional side view of a film with an electrode pattern of FIG. 14 which is in a state of being wound around an axial core.

The film 45 with an electrode pattern obtained as described above is wound to form a tubular object by a film winding means so that the electrode pattern 44 comes to the outermost circumference, as shown in FIG. 16. Specifically, it is wound around an axial core 46 at least two times to form the tubular object 40. In doing this, it is preferable to set the film length so that the winding starting point and the winding finishing point come to approximately the same position on the axial core 46.

Figure 17:
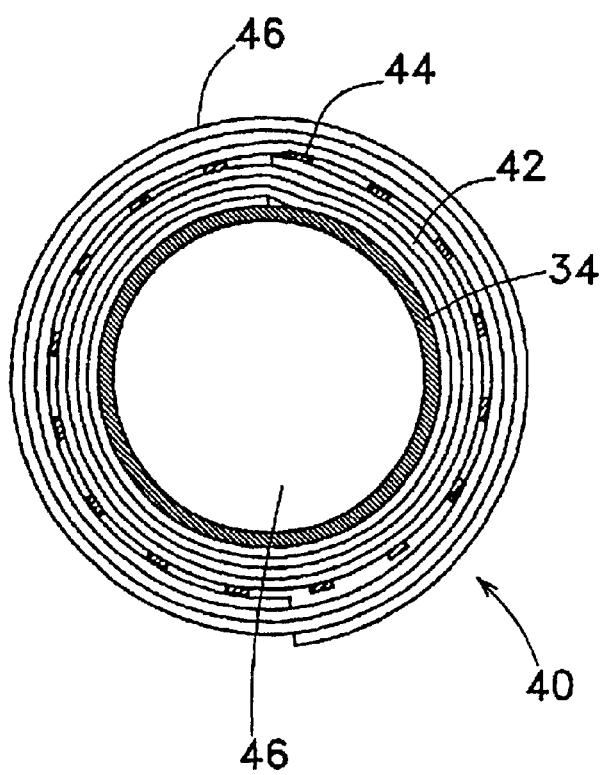
FIG. 17 is a cross-sectional side view after an electrode protective layer is further wound on an outer circumference of a film with an electrode pattern of FIG. 16.

Further, referring to FIG. 17, an electrode protective layer 48 is formed on the outer circumferential surface of the tubular object 40 on which the electrode pattern 44 has been formed, whereby the electrode pattern 14 is protected against external force. The electrode protective layer can be formed by making a source resin of the electrode protective layer into a film in advance and mounting the film on the medium conveying belt winding means, followed by winding and laminating it on the film 45 having the electrode pattern formed thereon. Alternatively, it can be formed by making the film having the electrode pattern formed thereon into a tubular object by a film winding means and subsequently winding and laminating a source film of the electrode protective layer thereon.

Here, a mold lubricant, an adhesive, or a surface treatment agent besides this can be used as a material of the endless belt and the protective layer. An electrically conductive electrode pattern is formed by screen printing or the like on this material before heating. Since the electrode pattern is formed on a film serving as the material, it can be easily handled with and the productivity is high. Also, the life of the apparatus is longer than the life of the belt, and a design of a more economical apparatus can be made by using an exchangeable component as the belt. For this reason, to set the electric power supplying part on one side to cantilever a roll to facilitate the exchange of the belt and the like are conditions by which it can be easily accepted by a user, and for that purpose, disposing the electric power supplying part only on one side as well as other measures can be selected.

Regarding the method of forming the electrode protective layer 16, a film having an electrode protective layer formed thereon in advance is wound around an axial core of a film winding means to form a tubular object and then a resin film 56 serving as an electrode protective layer 48 is wound thereon for at least two times. In order to prevent the shift or wrinkle of the wound film 45 with the electrode pattern before starting to wind the resin film 56 serving as number 48, it is possible to perform a provisional fixation. The provisional fixation can be performed by welding the thermoplastic resin by applying a hot temperature trowel on a portion of the wound film 45 with the electrode pattern, applying a high-temperature hot air, applying a hot roll, or the like method. Alternatively, the provisional fixation can be made by fixing the wound finishing end with a tape or the like.

Figure 18:
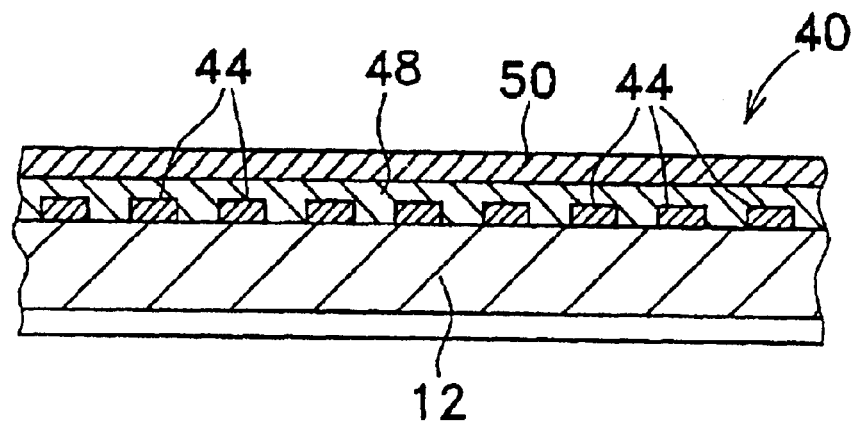
FIG. 18 is an enlarged cross-sectional explanatory view of an essential part showing another embodiment of a medium conveying belt according to the present invention.

The structure of the medium conveying belt according to the present invention may be, besides the one shown in FIG. 13, for example, such that a top coat layer 50 for protecting the electrode protective layer 48 is further formed on the film 44 having the electrode pattern laminated on the outer circumferential surface and the electrode protective layer 48, as shown in FIG. 18. As the top coat layer 50, for example, an alkali-resistant fluororesin can be used, but it is not limited thereto. The top coat layer 50 can be formed on the inner circumferential surface of the tubular object as well as on the outer circumferential surface of the electrode protective layer 48. By applying the same material quality as the top coat layer 48 to the inner circumferential surface of the tubular object, a resin layer having almost the same thickness can be formed to obtain a medium conveying belt having little warp.

Figure 19:
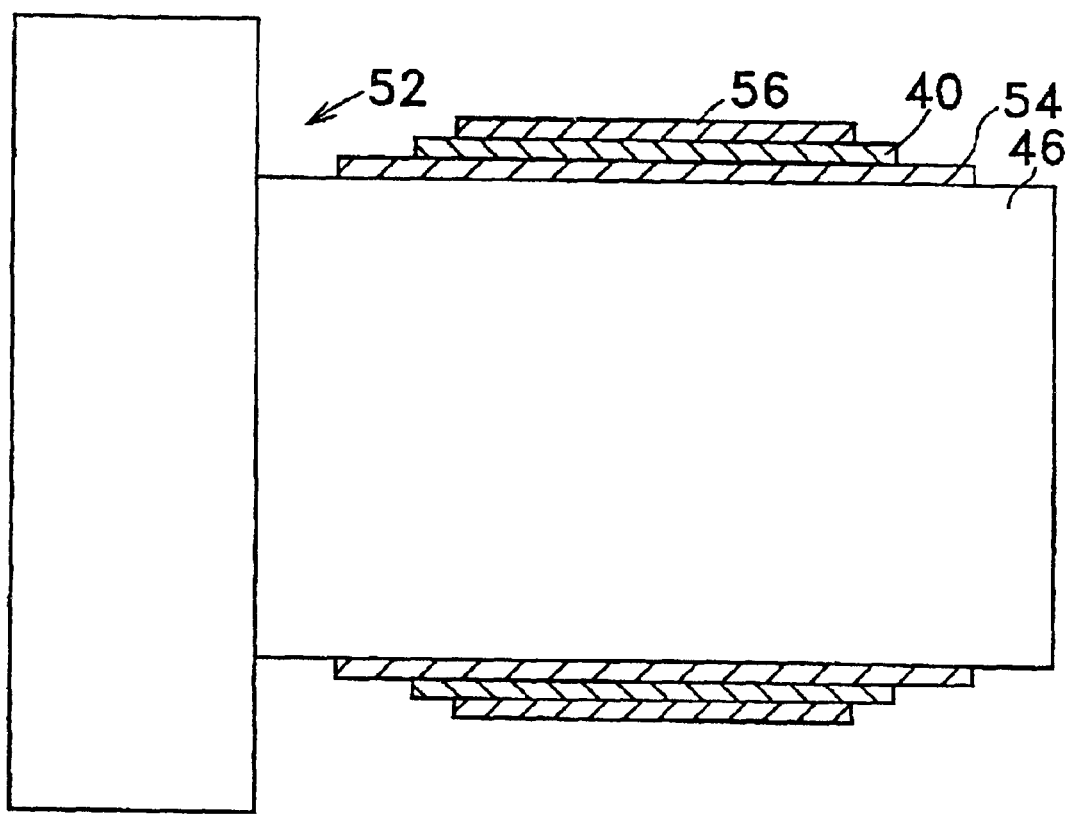
FIG. 19 is an enlarged cross-sectional explanatory view showing one embodiment of a production method of a medium conveying belt according to the present invention.
Figure 20:
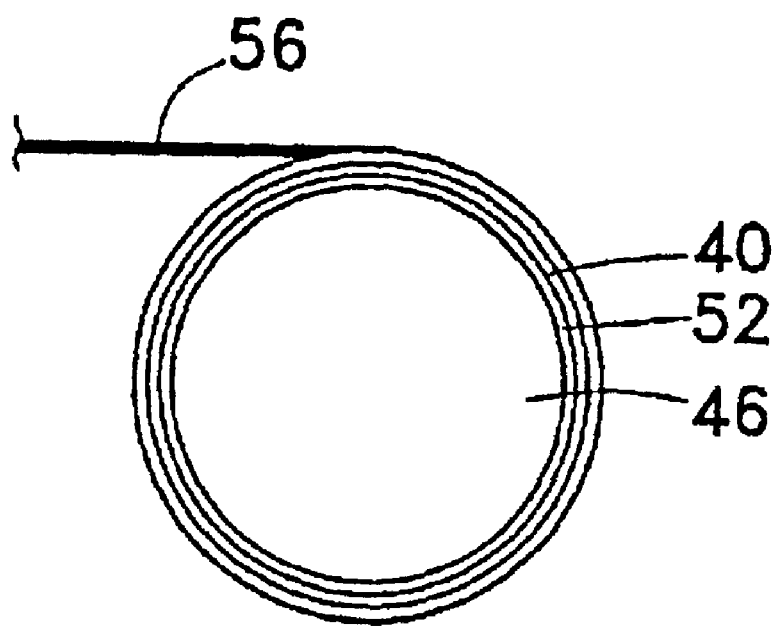
FIG. 20 is an enlarged cross-sectional explanatory view showing one embodiment of a production method of a medium conveying belt of the present invention.

Referring to FIG. 19, the tube 54 is attached in an attachable and detachable state to the axial core 46 of the film winding means 52; the tubular object 40 having an electrode pattern formed thereon is attached to the tube 54; the tube 54 and the tubular object 40 are rotated together with the axial core 46; and the resin film 56 for forming the electrode protective layer (hereafter referred to as the electrode protective resin film 56) is wound on the surface of the tubular object 40. As to the material quality of the axial core and the material quality of the tube 54, the aforesaid materials can be selected. A release layer made of fluororesin or the like can be disposed on the surface of the tube. Referring to FIG. 20, the electrode protective film 56 is wound while receiving a constant tensile force. It is sufficient that the tensile force imparted to the electrode protective layer resin film 56 is of a degree such that the film can be wound in close contact. In winding the electrode protective resin film around the tubular object 40, it is preferable to wind it under a reduced pressure atmosphere of at most 133 Pa, particularly under a vacuum of at most 0.1 Pa, because then air will not be entangled between the films. The electrode protective resin film 56 may be heat-welded in advance simultaneously with winding it around the tubular object 40 having an electrode pattern formed thereon; however, it is convenient if it is heat-welded after the electrode protective resin film is wound until it reaches a necessary layer thickness, in view of the management of the layer thickness and the management of the shape of the molded product.

The heating temperature is at least the melting point of the electrode protective resin film and at most the melting point +50° C., preferably at least the melting point +20° C. and at most the melting point +30° C.

Here, the axial core 46 for winding the film 45 with the electrode pattern or the protective film 56 is basically similar to the axial core used in the production method of the multi-layered endless belt, and an axial core 46 may be constructed in which an attachable and detachable tube 54 is attached to the axial core 46. The surface processing of the tube 54 and the axial core 46, the mode of imparting a heating function and others are the same as those of the production method of the multi-layered endless belt.

Alternatively, the axial core 46 may be a single body without having an outer tube such as the attachable and detachable tube 54. In this case, the axial core 46 may be constructed with a material made of a conductor, or an electrical resistor may be formed on the surface of an insulator by plating, vapor deposition, application, or the like to construct a heater that generates heat by energization.

Typically, if the linear expansion coefficient of each resin constituting the medium conveying belt 40 is too large as compared with the linear expansion coefficient of the axial core 46 or the attachable and detachable tube 54, it will be difficult to dismount the belt from the axial core 46 or the attachable and detachable tube 54. This is because the belt after cooling will strongly shrinks to tighten the axial core. However, in most cases, the linear expansion coefficient of resin is larger than metal. Therefore, it is preferable that the linear expansion coefficient of the resin for forming the belt is made as small as possible or the linear expansion coefficient of the axial core 46 or the attachable and detachable tube is made as large as possible. In the case where metal is used for the axial core 46 or the attachable and detachable tube 54, a metal such as aluminum having a comparatively large linear expansion coefficient is preferable.

Further, it is possible to use a resinous axial core 46 such as a highly heat-resistant fluororesin. Also, if the linear expansion coefficient of the resin material for forming the belt is large, an additive for reducing the linear expansion coefficient may be added to the resin material as long as it does not deteriorate the toughness or the insulation characteristics of the material. For example, a clay substance, a mica substance, glass short fiber, and various whiskers may be mentioned.

Figure 21:
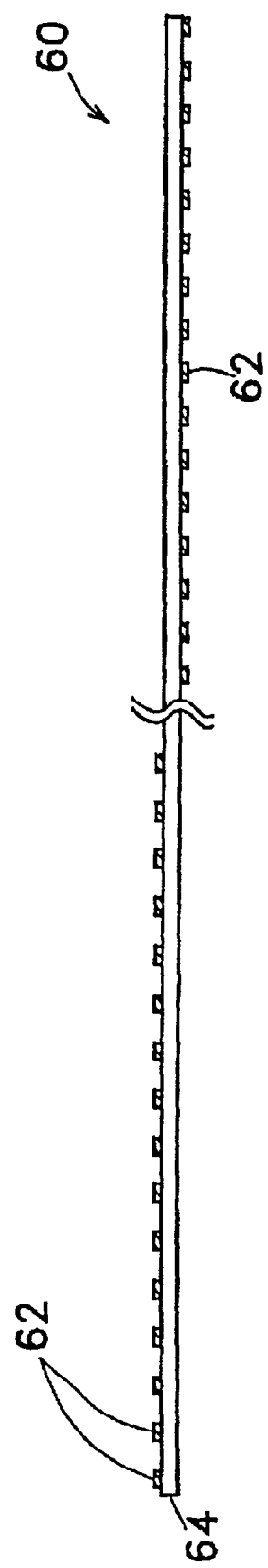
FIG. 21 is a side view showing another mode of a film with an electrode pattern.

As another mode of the production method of the medium conveying belt of the present invention, for example, an electrode pattern 62 may be formed for one circumferential length of a tubular object at one end on one surface and at the other end on the opposite surface of a laminate film or a thermoplastic resin film 64, as shown in FIG. 21, to prepare a film 60 with an electrode pattern.

The position of the electrode can be calculated from the thickness of the film and the outer diameter of the axial core. Further, if the front surface pattern and the rear surface pattern are to be connected, a through-hole can be formed to establish an electrical conduction with the use of a metal paste or solder. Furthermore, an electrically conductive thread-like object or film-like object can be connected to penetrate through the belt or to go around an end of the belt to establish the electrical conduction.

Figure 22:
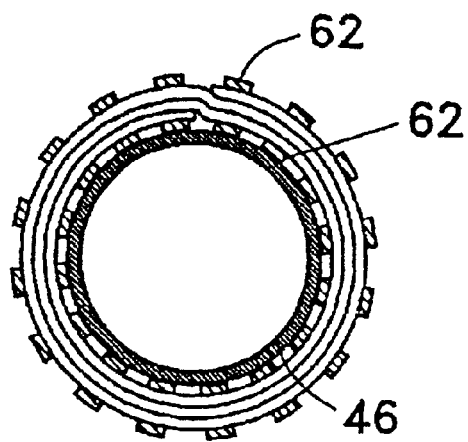
FIG. 22 is a cross-sectional conceptual view of a film with an electrode pattern of FIG. 21 in a state of being wound around an axial core.

In this case, the film 60 with an electrode pattern is wound around the axial core 48 at least two times so that one electrode pattern 62 forms the outermost circumferential surface and the other electrode pattern 62 forms the innermost circumferential surface, as shown in FIG. 22. The subsequent steps are the same as in the case where the electrode pattern is formed only on one side. By allowing electric power supply from the electrode pattern on the inner side of the tubular object, the electric power supply mechanism can be disposed on the inner side of the medium conveying belt, thereby contributing to the scale reduction of the equipment.

Besides the modes shown in the drawings, for example, a film with an electrode pattern can be prepared by forming the electrode pattern for one circumferential length of a tubular object, for example, on a portion around the center on one surface of a laminate film or a thermoplastic resin film. In this case, the film with the electrode pattern serves both as a tubular object of the base of the medium conveying belt and as the electrode protective layer. In other words, the outer circumferential surface of the electrode pattern can be further covered with a remaining film portion by winding the film with the electrode pattern around the axial core so that the surface without the electrode pattern comes to the inside. According to this mode, it is not necessary to further prepare a film for the electrode protective layer, and it can be subjected to the next heat-welding step as it is.

A film with an electrode pattern can be formed by forming an electrode pattern for one circumferential length of a tubular object each on a portion around the center on one surface and at an end on the opposite surface of a laminate film or a thermoplastic resin film. In this case, the film with an electrode pattern is wound around the axial core so that the electrode pattern disposed at the end comes to the inside. The electrode pattern disposed at a portion around the center on the one surface is wound to face the side opposite to the axial core and the outer circumferential surface of the electrode pattern can be covered with the remaining film portion. This case is the same as the case in which the electrode pattern is formed only on one side.

Figure 23:
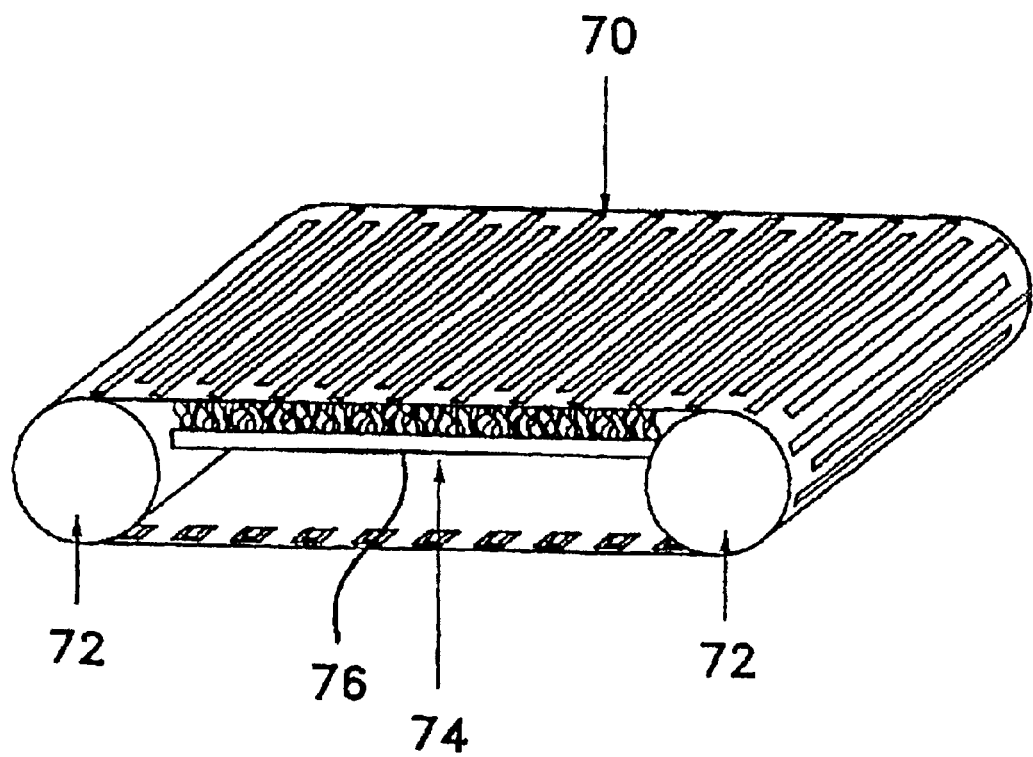
FIG. 23 is an explanatory view showing a state of use of another embodiment of a medium conveying belt of the present invention.

Further, another mode of the medium conveying belt of the present invention is fundamentally a medium conveying belt 70 having an endless belt, an electrically conductive electrode pattern, and a protective layer successively formed thereon, and is characterized in that the electric power is supplied from the inside on the side opposite to the protective layer of the medium conveying belt, as shown in FIG. 23, in applying a voltage to the electrode pattern.

An example of this medium conveying belt is formed by processing the endless belt or the thermoplastic resin film obtained above, and is produced by processing it into a belt form after an electrically conductive electrode pattern is formed on the film, further drilling a hole through the endless belt before heating or after heating, or allowing it to have a length different from that of the protective layer in a direction perpendicular to the circumferential direction of the belt, or further processing an end of the endless belt so that the electric power can be supplied from the opposite surface of the protective layer. In the Figure, 72 is a conveying roller, 74 is a electric power supplying brush, and 76 is a wiring for connecting a power source to the electric power supplying brush.

In the medium conveying belt 70 of this embodiment, the method for producing a material film of the endless belt and the method of forming an electrode pattern on the material film, the method of forming the medium conveying belt on which a protective layer integrated with them is formed, and the selection of the materials for the endless belt, the electrically conductive electrode pattern, and the protective layer are the same as in the above-described mode.

An embodiment of the medium conveying belt 70 in which the electric power is supplied from the opposite surface of the protective layer surface and the production method thereof will be explained in detail on the basis of the drawings.

Figure 24:
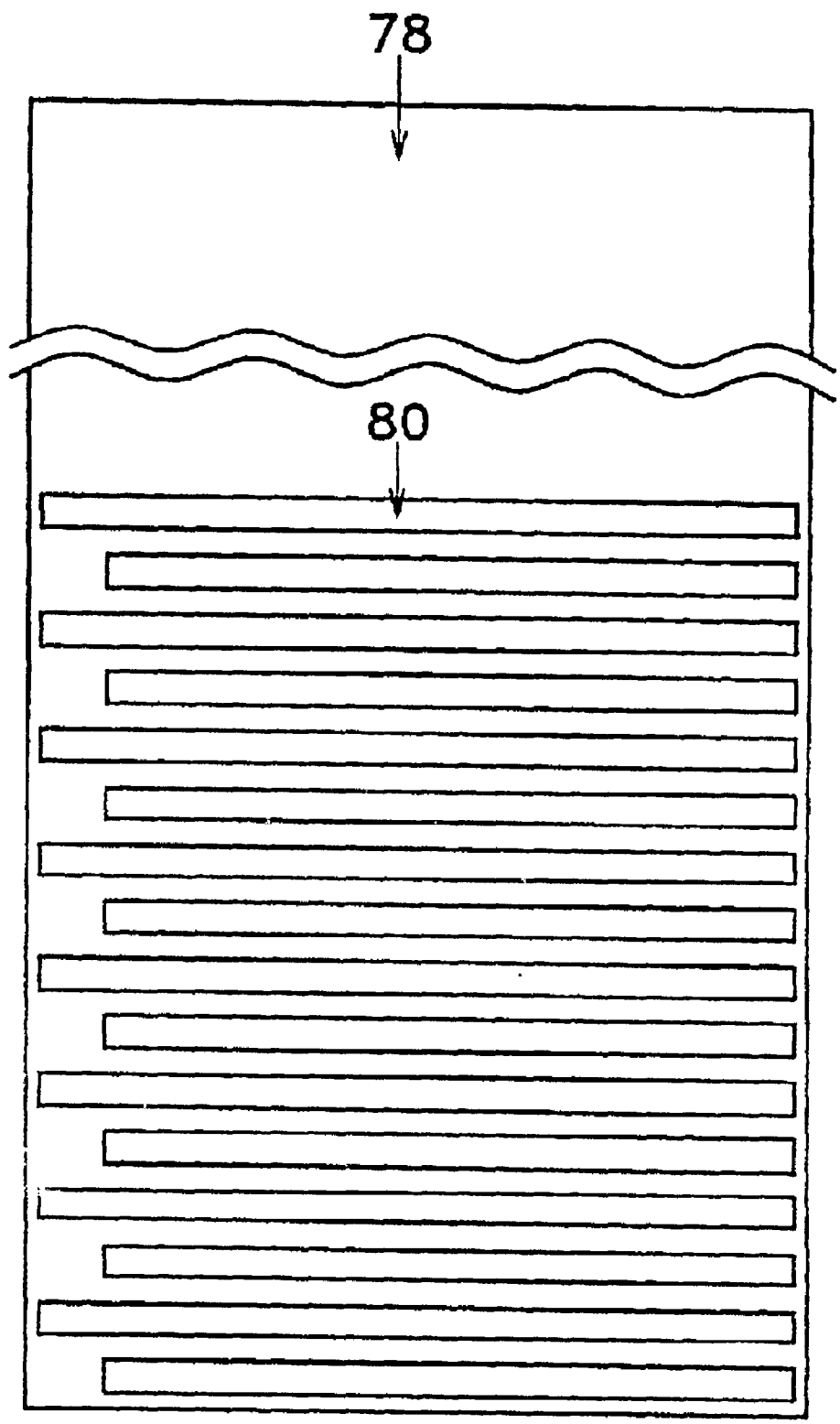
FIG. 24 is an explanatory view showing another processed state of a film with an electrode pattern of a medium conveying belt according to the present invention.
Figure 25:
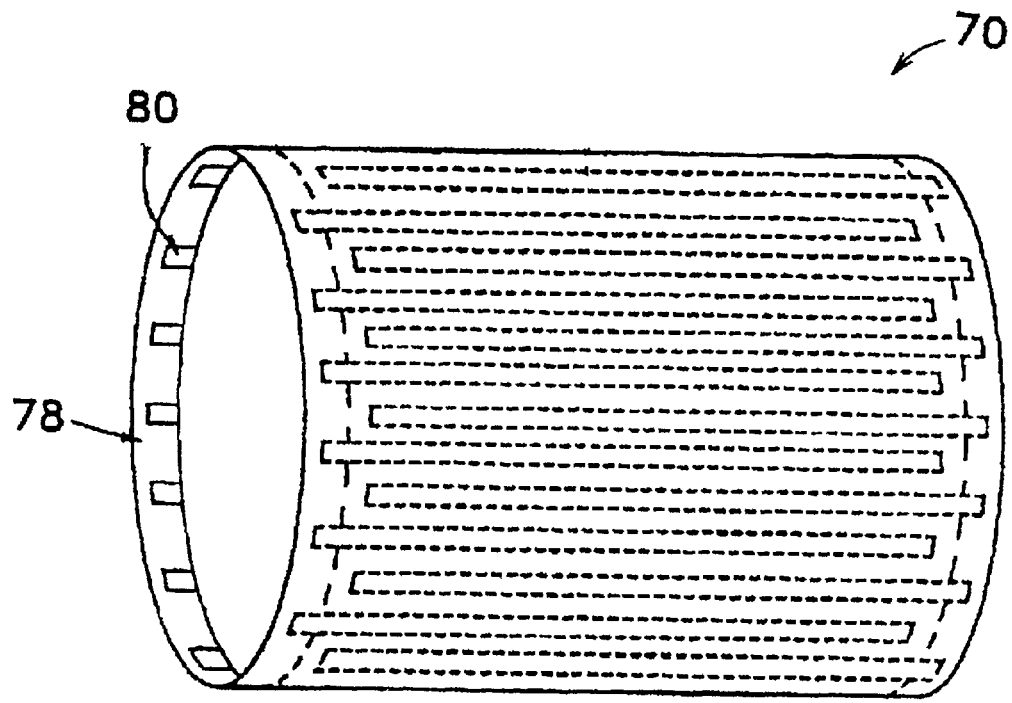
FIG. 25 is an explanatory view showing another embodiment of a medium conveying belt according to the present invention.
Figure 26:
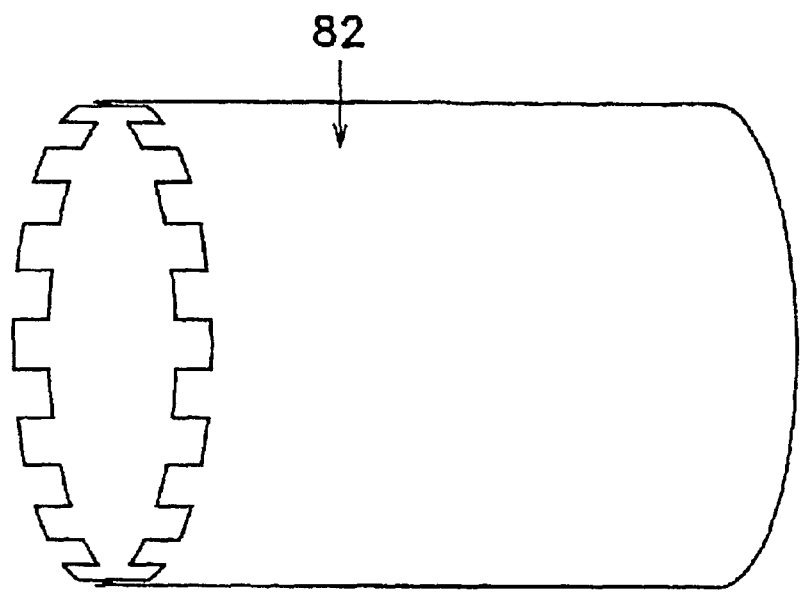
FIG. 26 is an explanatory view showing a processed state of a material of a medium conveying belt according to the present invention.
Figure 27:
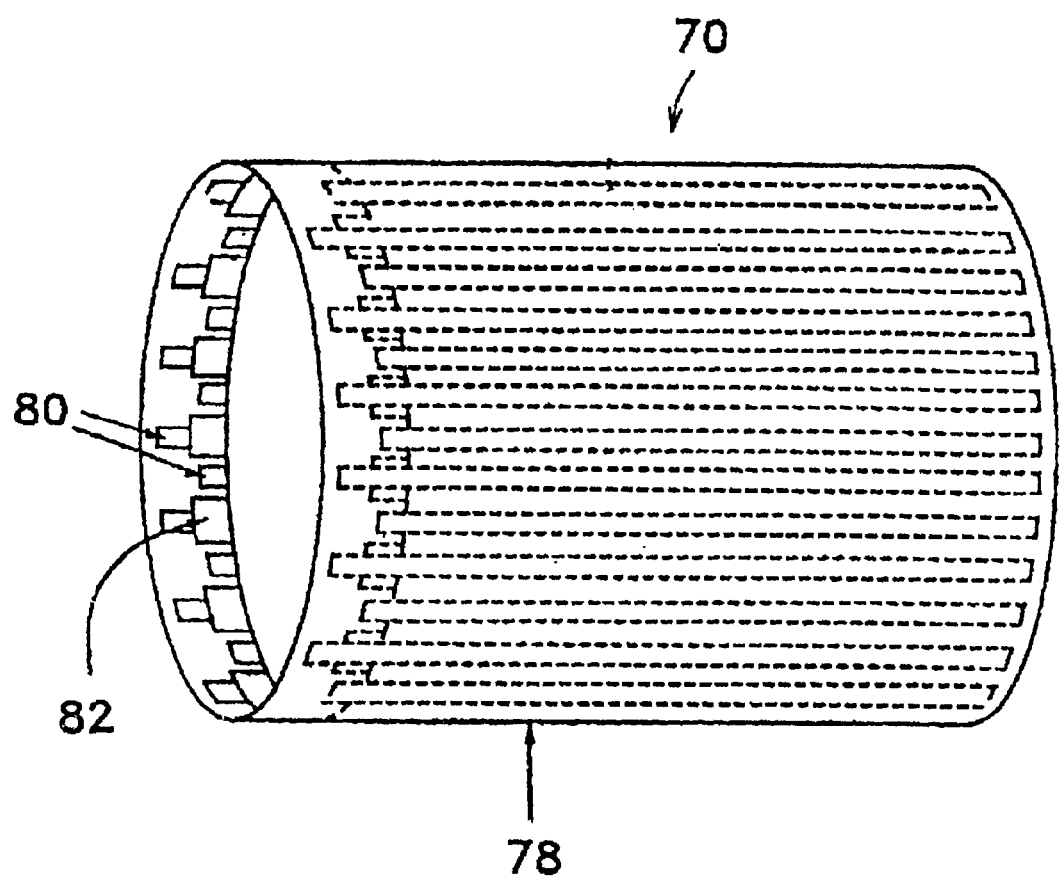
FIG. 27 is an explanatory view showing another embodiment of a medium conveying belt according to the present invention.
Figure 28:
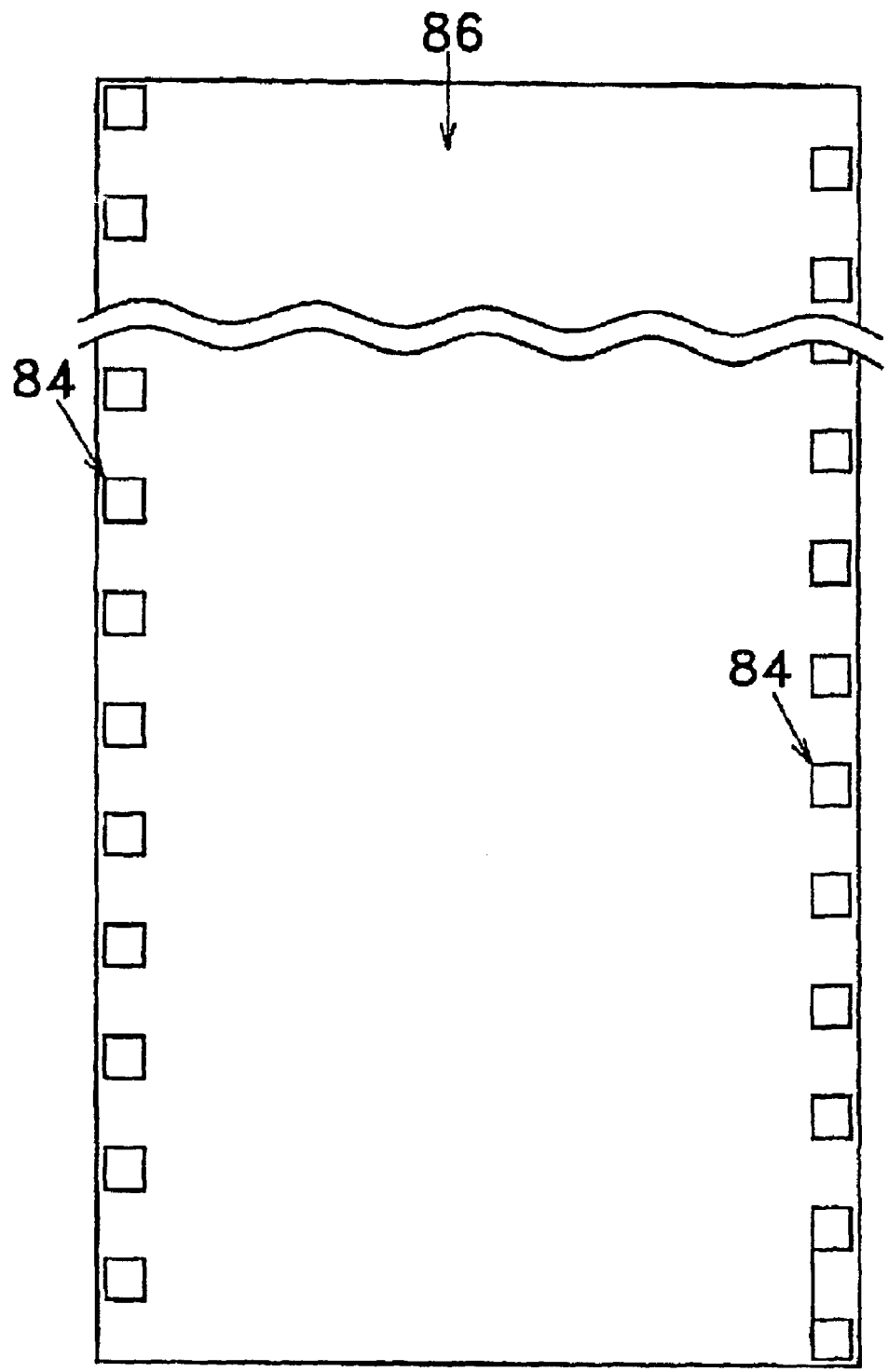
FIG. 28 is an explanatory view showing a processed state of a material of a medium conveying belt according to the present invention.
Figure 29:
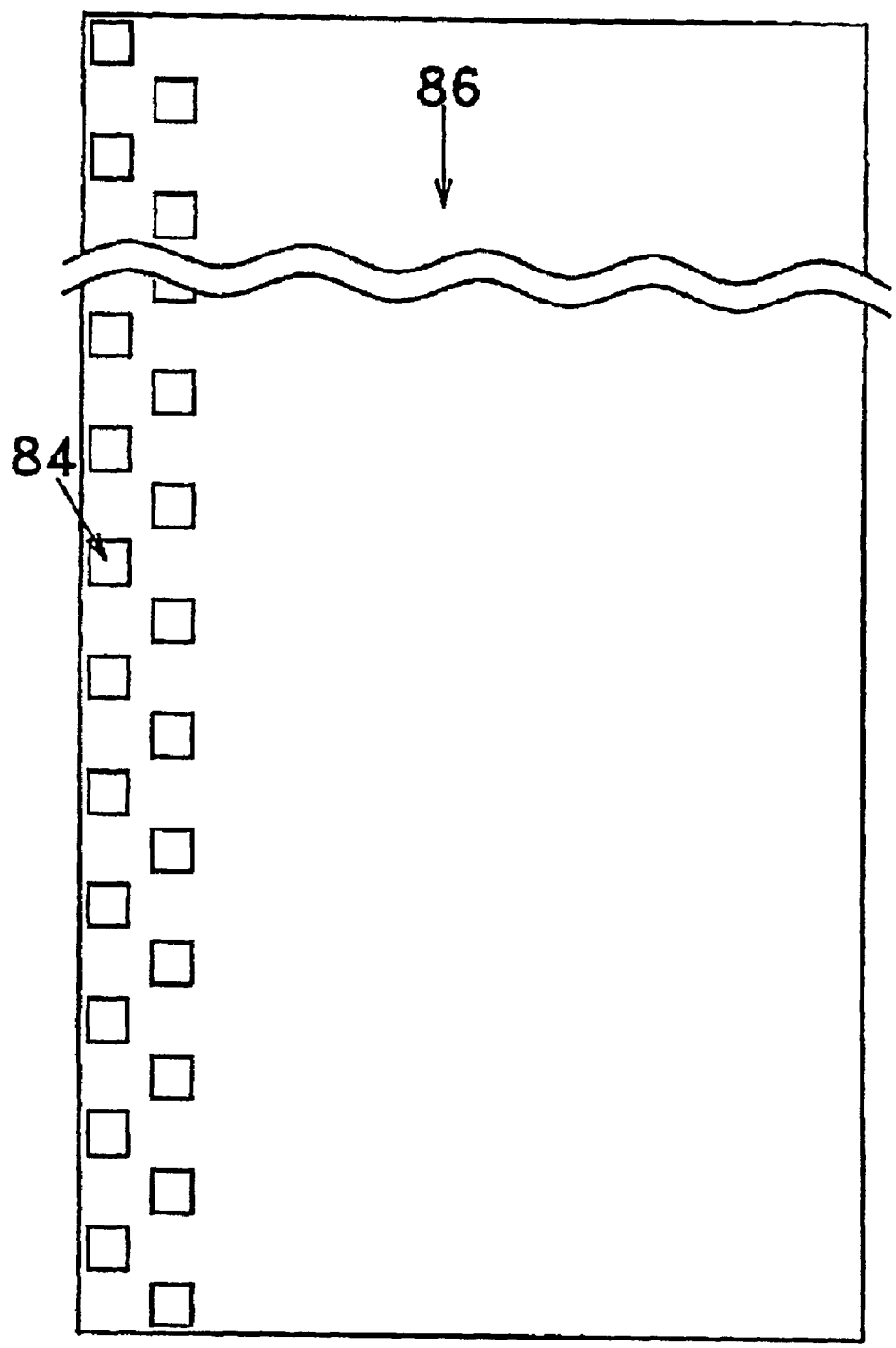
FIG. 29 is an explanatory view showing a processed state of a material of a medium conveying belt according to the present invention.
Figure 30:
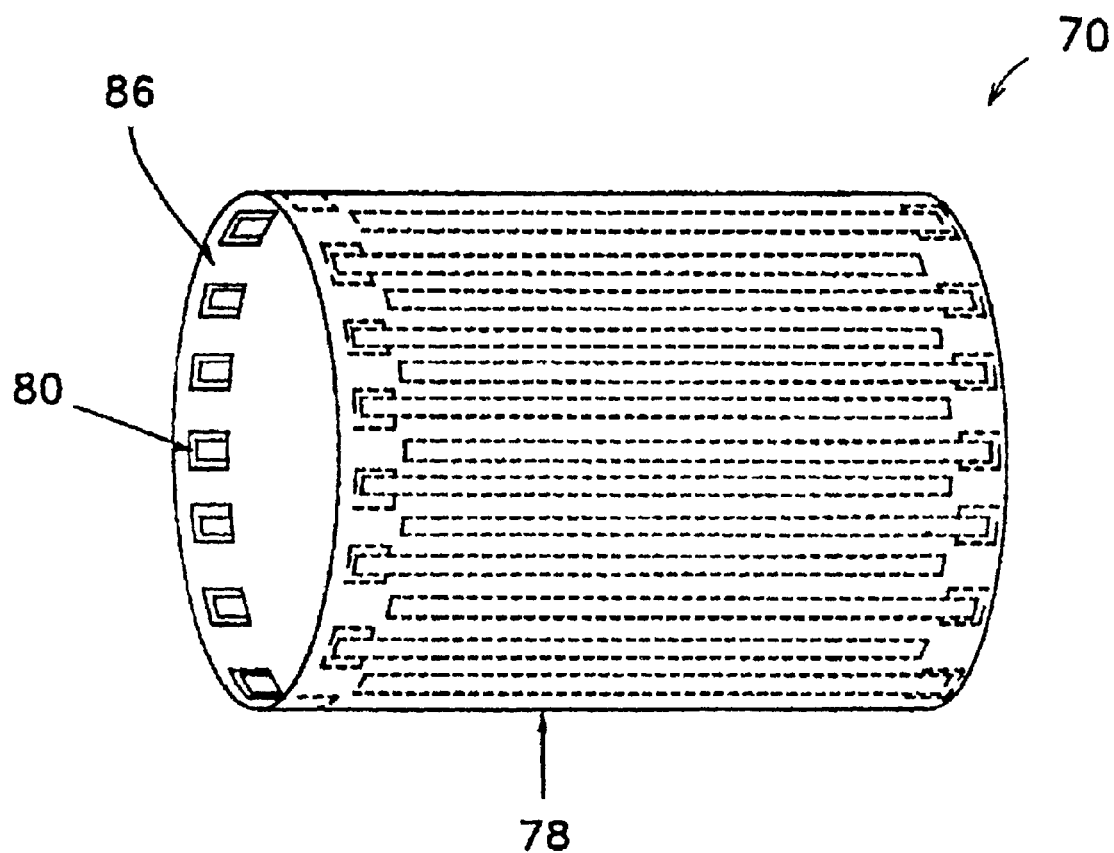
FIG. 30 is an explanatory view showing another embodiment of a medium conveying belt of the present invention.
Figure 31:
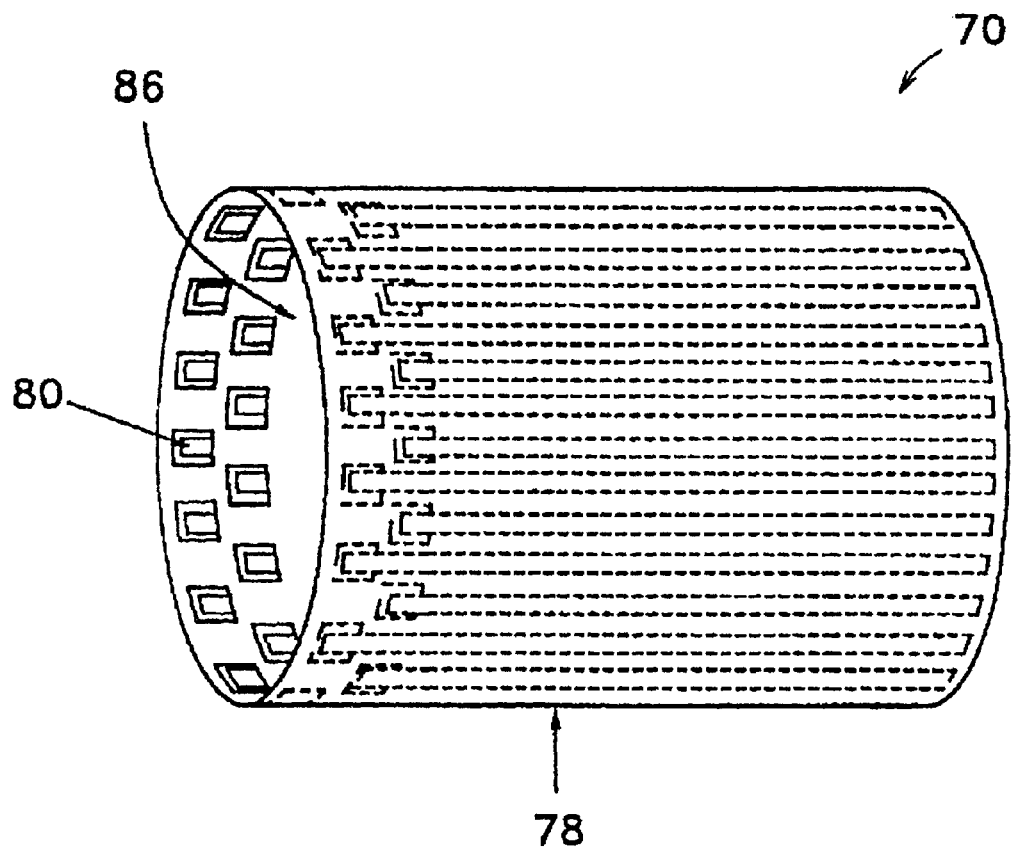
FIG. 31 is an explanatory view showing another embodiment of a medium conveying belt according to the present invention.

In Example 70 according to the present invention, an electrically conductive electrode pattern 80 is formed on a material film 78 of a protective layer having a larger width than the endless belt, for example, as shown in FIG. 15. The electrode pattern may be such that the electric power supplying part is disposed on both ends as shown in FIG. 15, or such that the electric power supplying part is disposed on only one surface as shown in FIG. 24. A belt such as shown in FIG. 25 is obtained by winding the film 78, which serves as the material of the protective layer, on the outside of the base layer made of a polymer material film and then heating to weld and/or cure the film. At this time, the protective layer material on which an electrode pattern such as shown in FIG. 24 is formed can be combined with an endless belt 82 such as shown in FIG. 26 to obtain a belt having an electric power supplying part on one side, such as shown in FIG. 27. Alternatively, an insulating part can be formed later. Also, a film 86 is used in which an opening part 84 is stamped out through a polymer material film for forming a tubular object in accordance with the position of the electrode end as shown in FIGS. 28 and 29, and is combined with a protective layer material on which an electrode pattern such as shown respectively in FIG. 15 or FIG. 24 is formed, to obtain a medium conveying belt having a shape in which the electric power supplying part is exposed at both ends or at one end of the inside of the film. such as shown in FIGS. 30 and 31.

Figure 32:
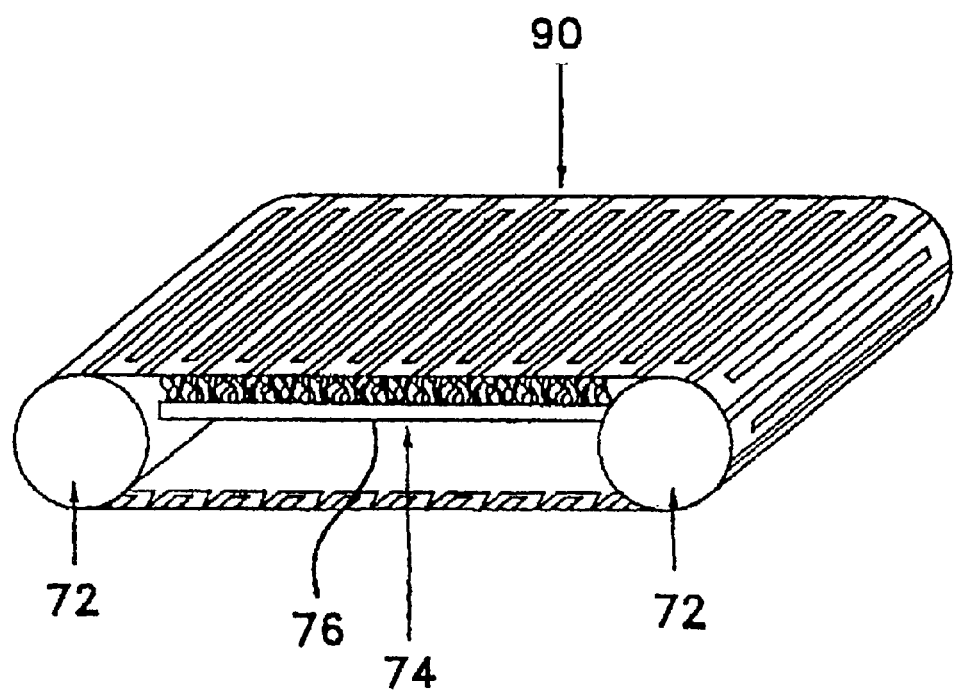
FIG. 32 is an explanatory view showing a state of use of another embodiment of a medium conveying belt according to the present invention.

Further, another embodiment of the medium conveying belt 90 of the present invention capable of supplying electric power from the inside of the belt is composed of a base layer having an electrode pattern formed thereon and a protective layer for protecting the same, wherein a polymer material film having a smaller width than the base layer in the direction perpendicular to the circumference is used as the protective layer and, after successively winding and heating it, an end portion is bent to the inside of the medium conveying belt together with the electrode pattern and press-bonded by heating to obtain the medium conveying belt 90 in which the electric power can be supplied from the inside in applying a voltage to the electrode pattern between the two layers, as shown in FIG. 32.

Figure 33:
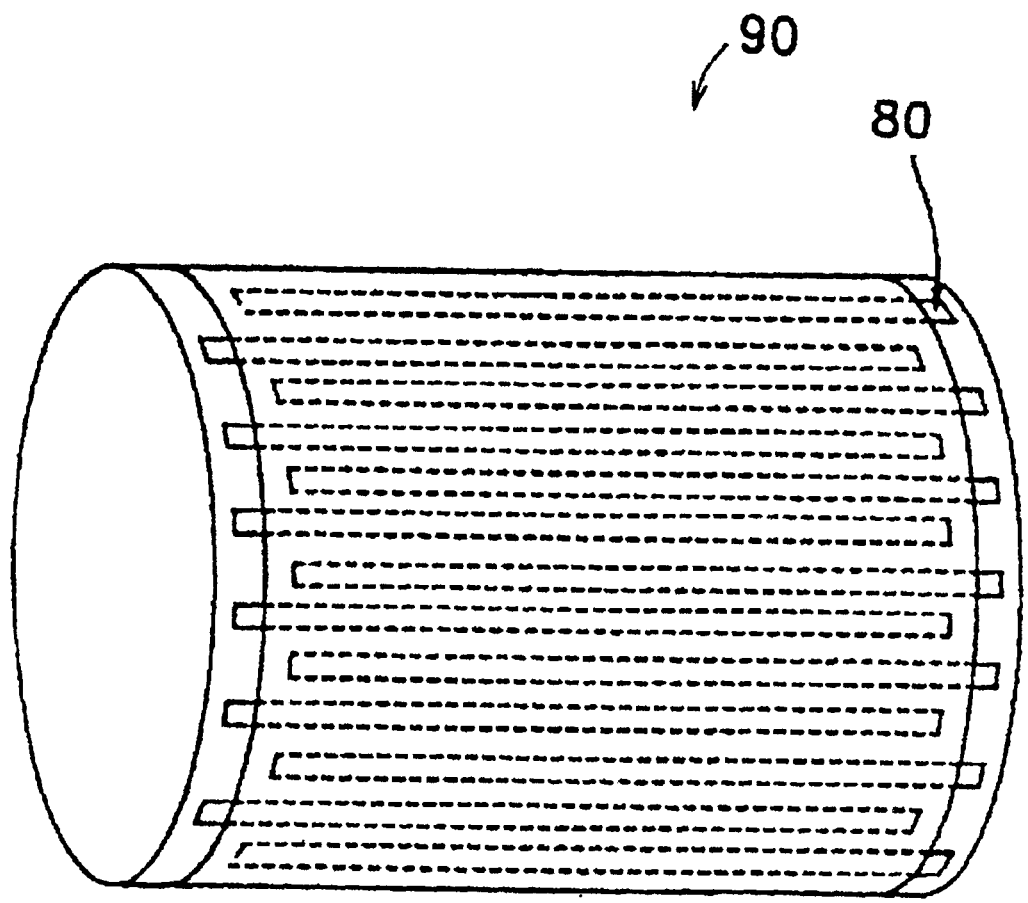
FIG. 33 is an explanatory view showing an intermediate state of production of a medium conveying belt according to the present invention.
Figure 34:
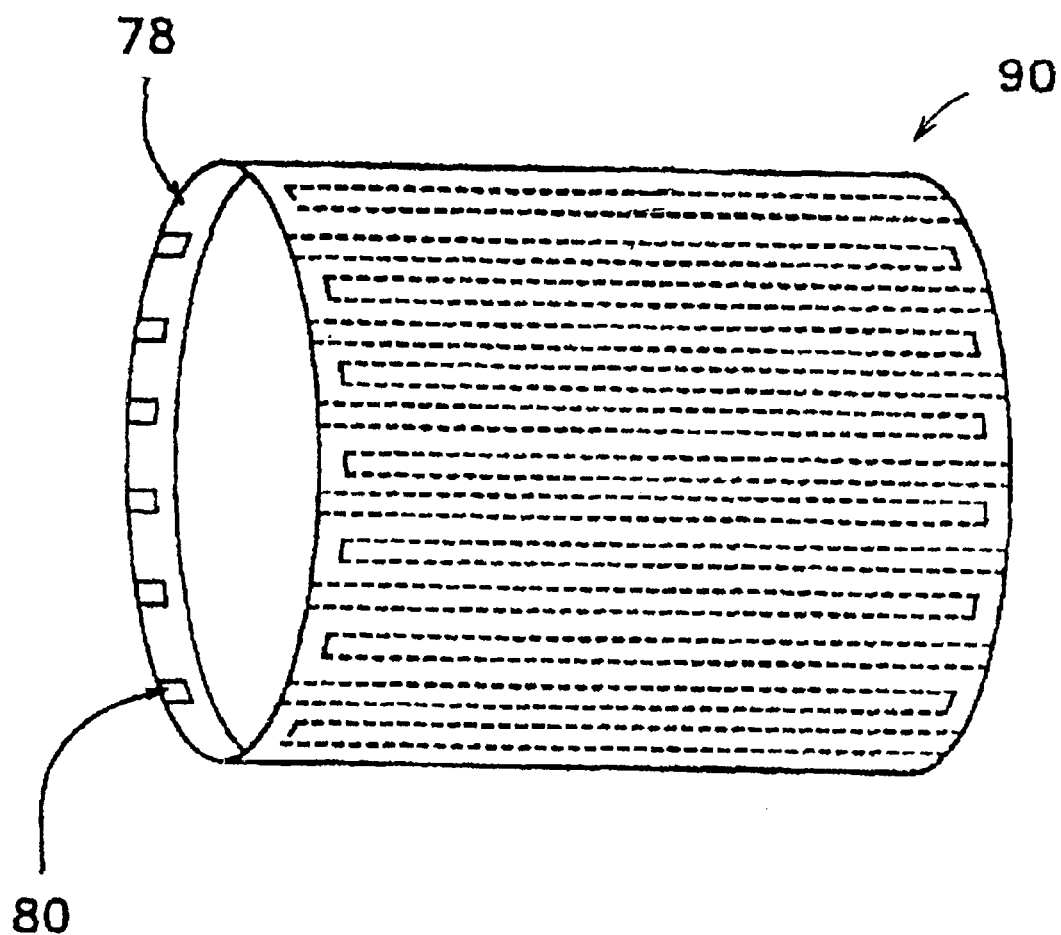
FIG. 34 is an explanatory view showing another embodiment of a medium conveying belt of the present invention.
Figure 35:
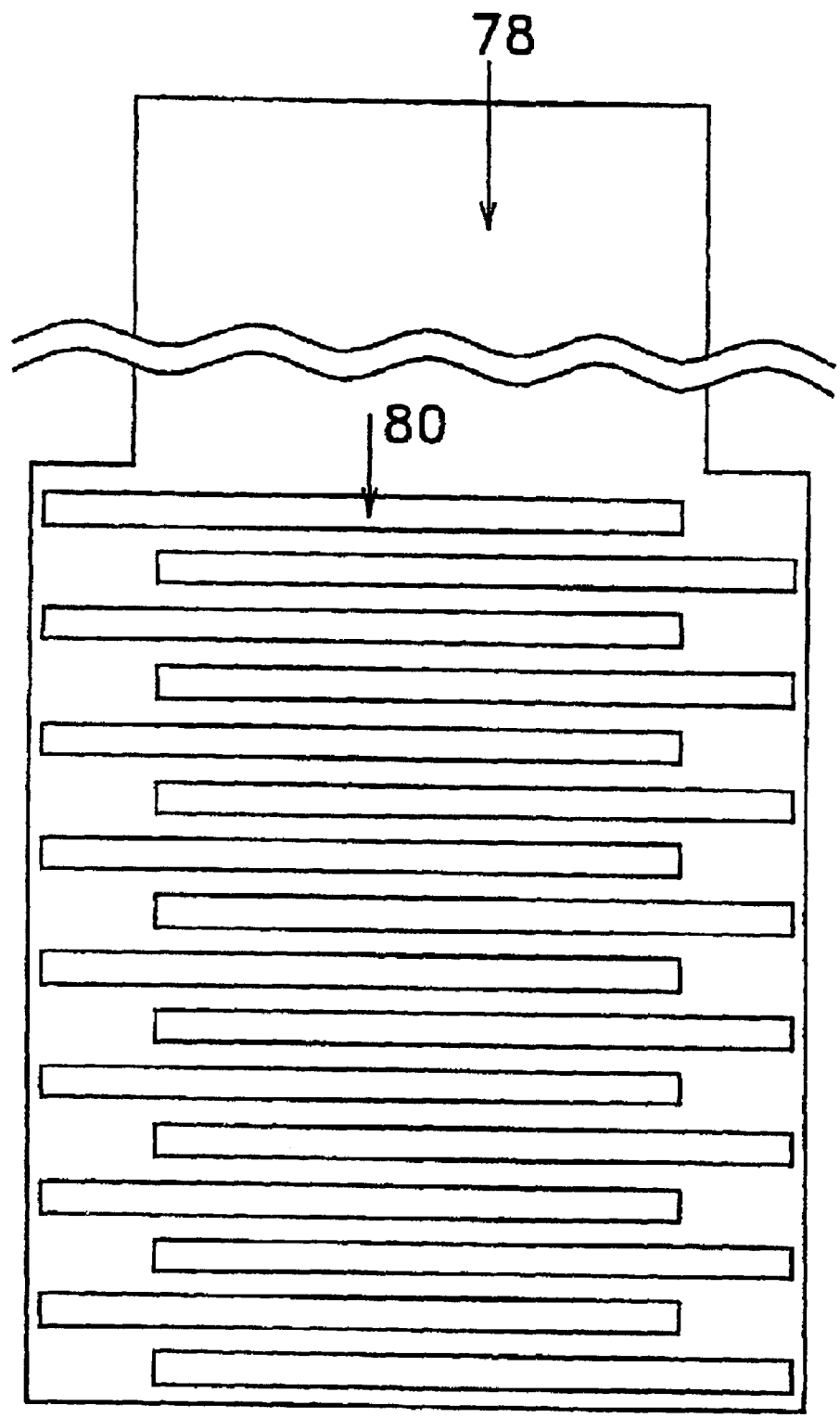
FIG. 35 is an explanatory view showing a processed state of a material of a medium conveying belt according to the present invention.
Figure 36:
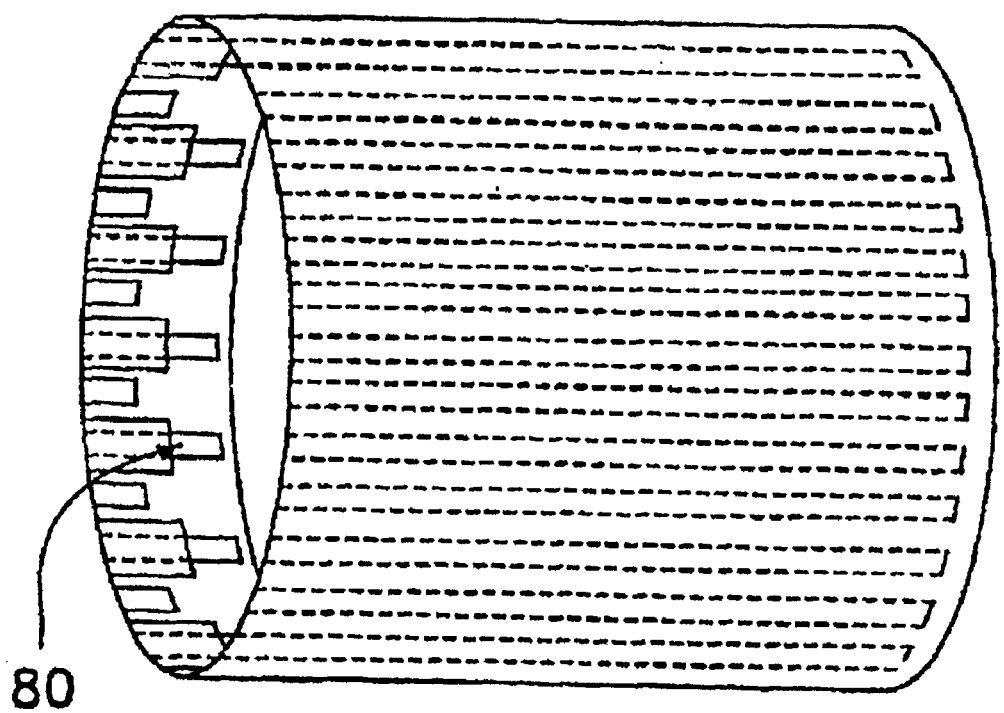
FIG. 36 is an explanatory view showing another embodiment of a medium conveying belt according to the present invention.
Figure 37:
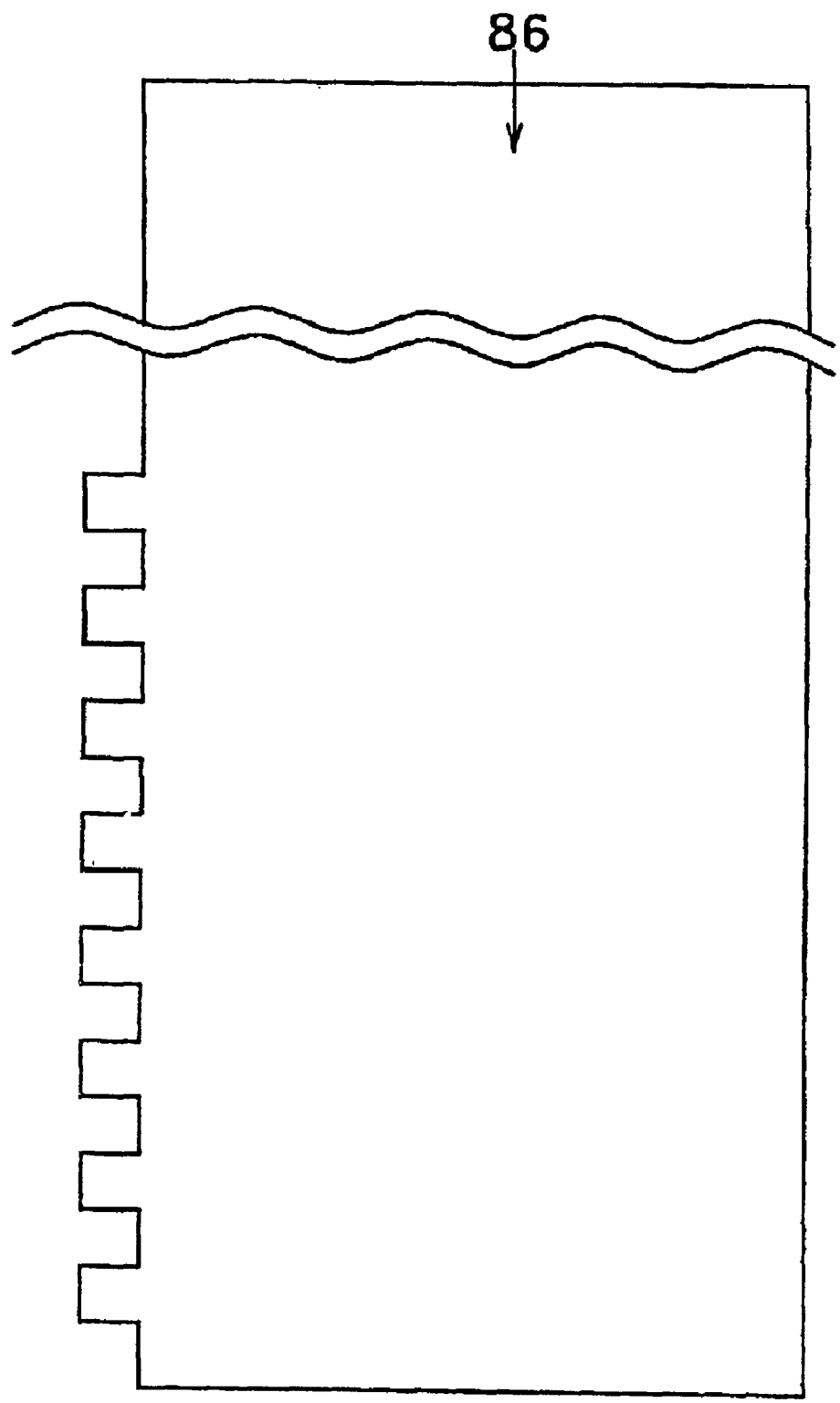
FIG. 37 is an explanatory view showing a processed state of a material of a medium conveying belt according to the present invention.

The production method of the embodiment 90 of the medium conveying belt capable of supplying electric power from the inside of the belt will be explained hereafter. For example, a belt obtained by winding a protective layer on an endless belt formed by winding a material film having an electrode pattern shown in FIG. 15 formed thereon has an electric power supplying part of the electrode on the outside in the state after heating, as shown in FIG. 33. In this embodiment, this end is bent to the inside of the belt and heat-pressed to obtain a belt capable of supplying electric power from the opposite surface of the protective layer such as shown in FIG. 34. Here, it is preferable to use a method such that a notch is disposed in the tubular object in order to facilitate the bending at this time, or the width of only the patterned portion is increased in forming the electrode pattern on the polymer material as shown in FIG. 35, thereby to reduce the thickness for allowing it to have flexibility for facilitating the bending. Further, for disposing the electric power supplying part only on one side, it is possible to use a polymer material in which an electrode pattern such as shown in FIG. 24 is formed, to dispose the electric power supplying part only on one side, as shown in FIG. 36. For this purpose, it is preferable to use a material of the protective layer such as shown in FIG. 37; however, the insulating part can be formed later.

Figure 38:
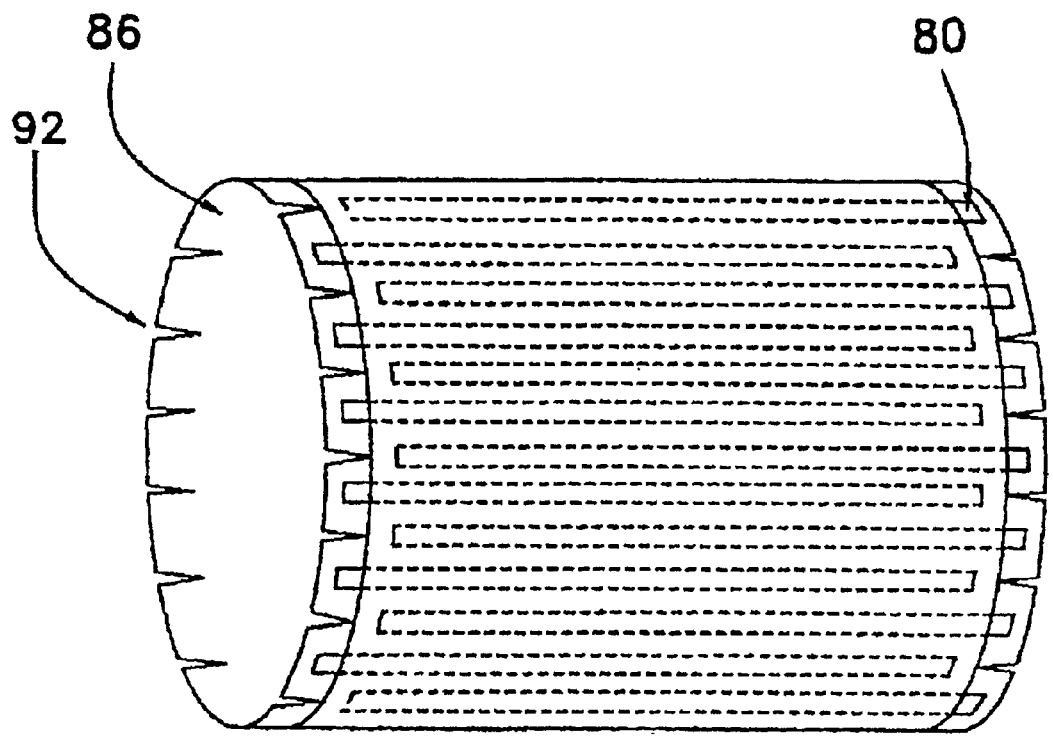
FIG. 38 is an explanatory view showing a processed state of a material of a medium conveying belt according to the present invention.
Figure 39:
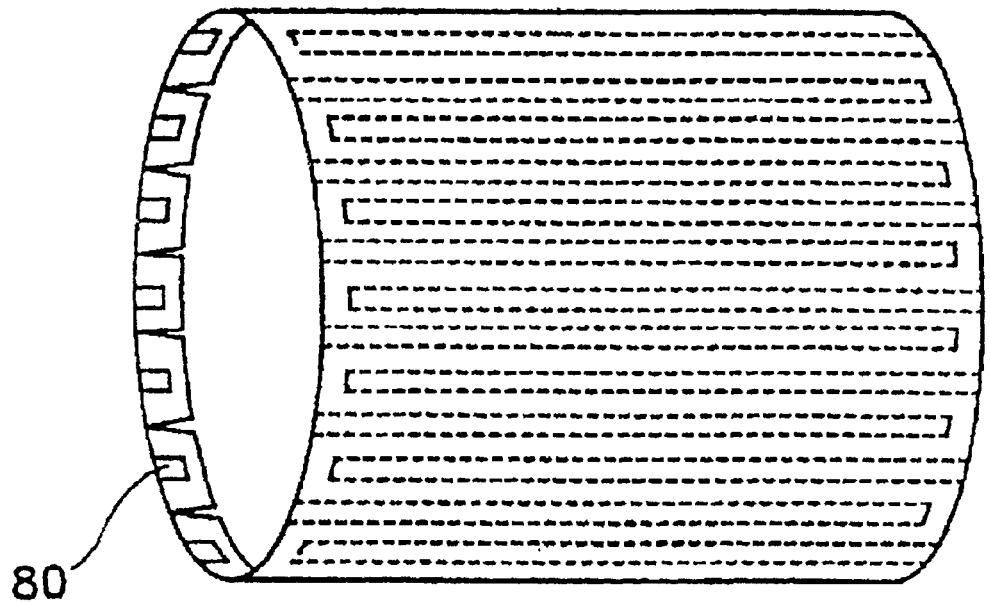
FIG. 39 is an explanatory view showing another embodiment of a medium conveying belt according to the present invention.

The end can be bent by disposing a notch 92 to facilitate the bending as shown in FIG. 38 and heat-pressing it with a hot roll, whereby one mode of the medium conveying belt of the present invention such as shown in FIG. 39 can be obtained.

Figure 40:
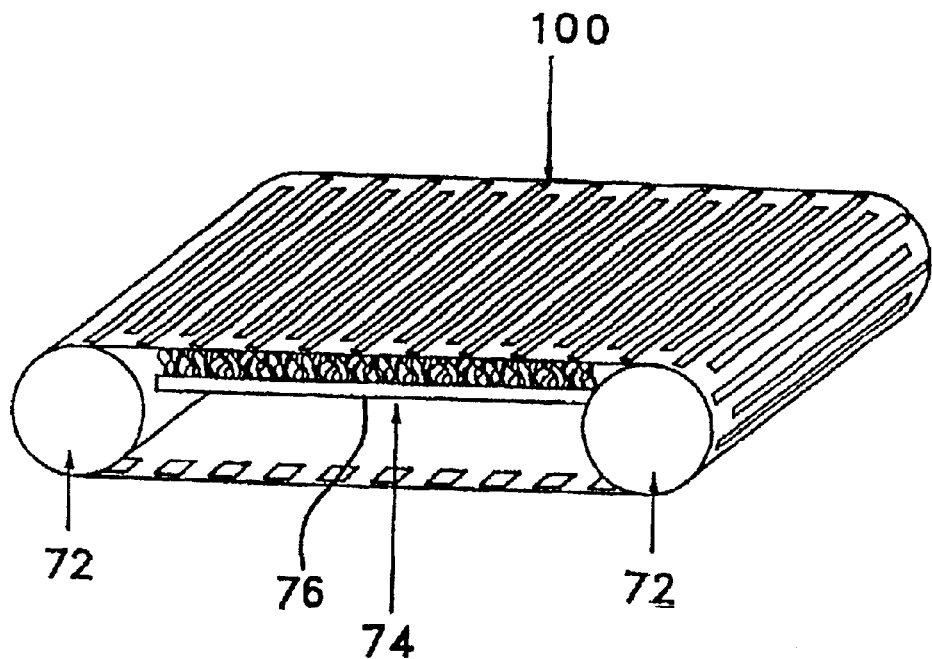
FIG. 40 is an explanatory view showing a state of use of another embodiment of a medium conveying belt according to the present invention.

Still another embodiment 100 of the medium conveying belt of the present invention in which the electric power can be supplied from the inside of the belt is made of a base layer having an electrode pattern formed thereon and a protective layer for protecting the same, wherein the endless belt or the protective layer is a film on which an electrically conductive electrode pattern is formed on both or one of them, and a medium conveying belt 100 such as shown in FIG. 40 in which the electric power is supplied from the inside of the belt is produced by processing the film into a tubular object shape by a film winding means and then drilling a hole through the tubular object before the heat-welding step or after the heat-welding step or by allowing it to have a length different from that of the protective layer in the direction perpendicular to the circumferential direction of the belt, or by further processing the end of the tubular object.

Figure 41:
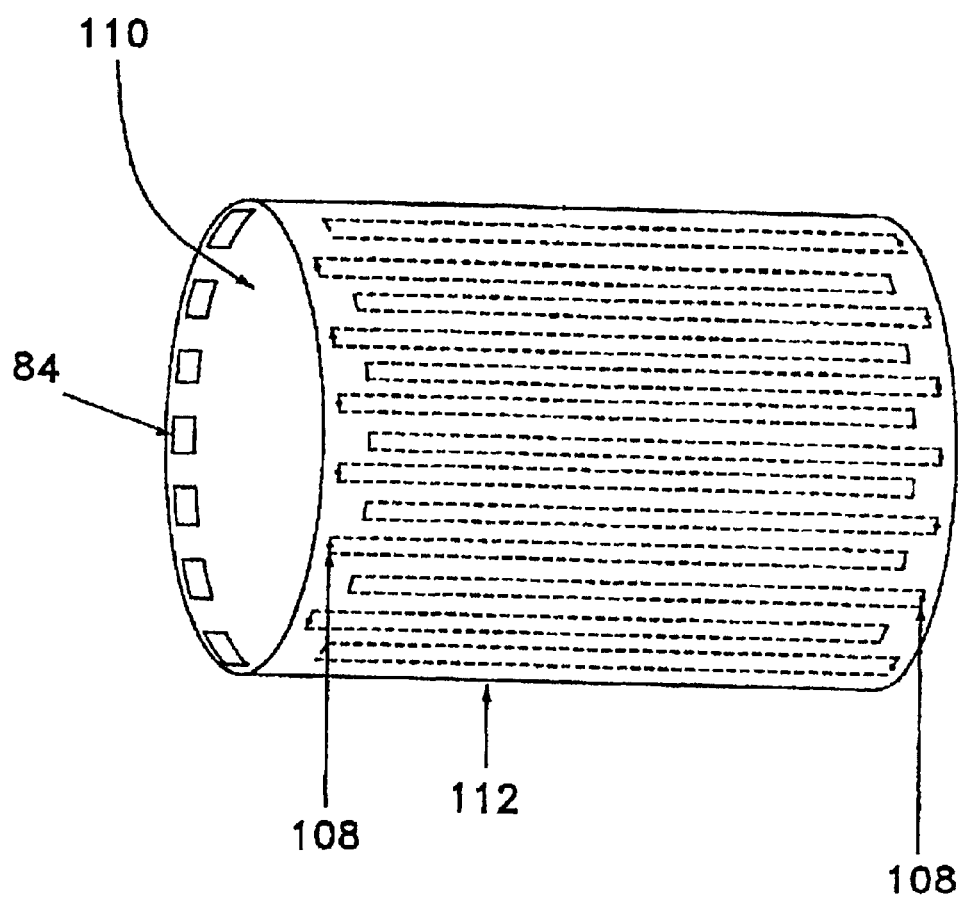
FIG. 41 is an explanatory view showing another embodiment of a medium conveying belt according to the present invention.
Figure 42:
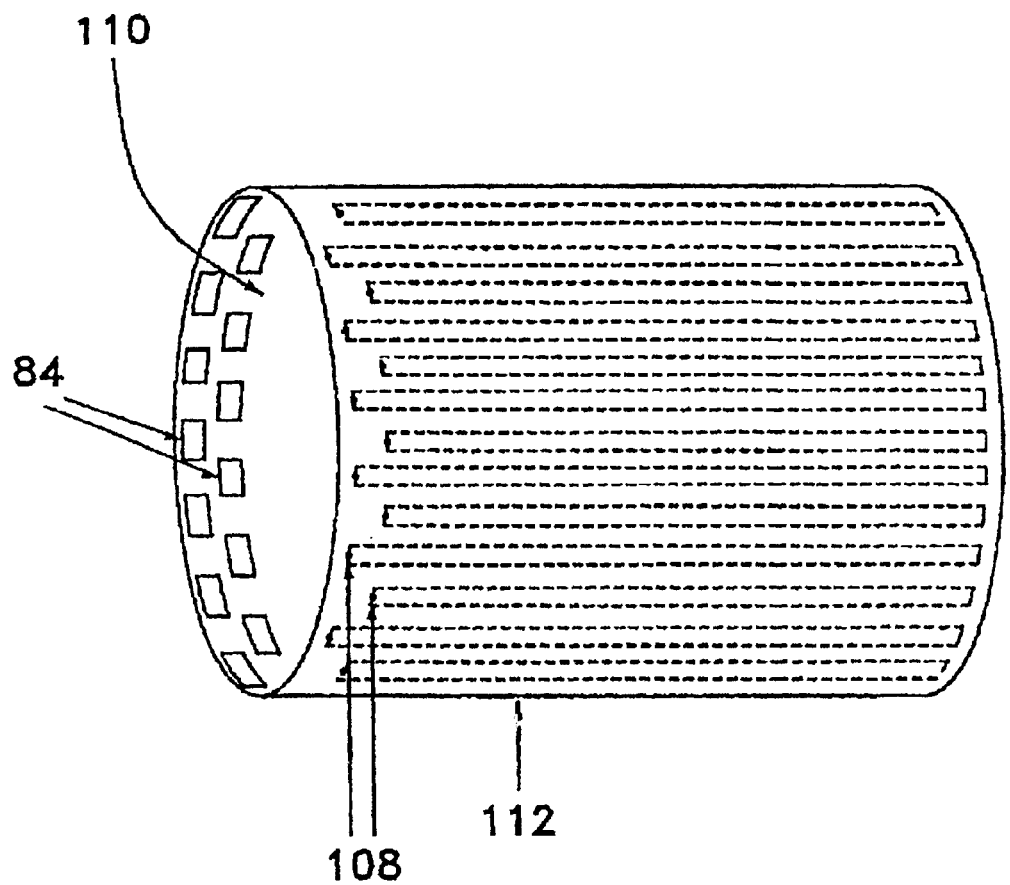
FIG. 42 is an explanatory view showing another embodiment of a medium conveying belt according to the present invention.
Figure 43:
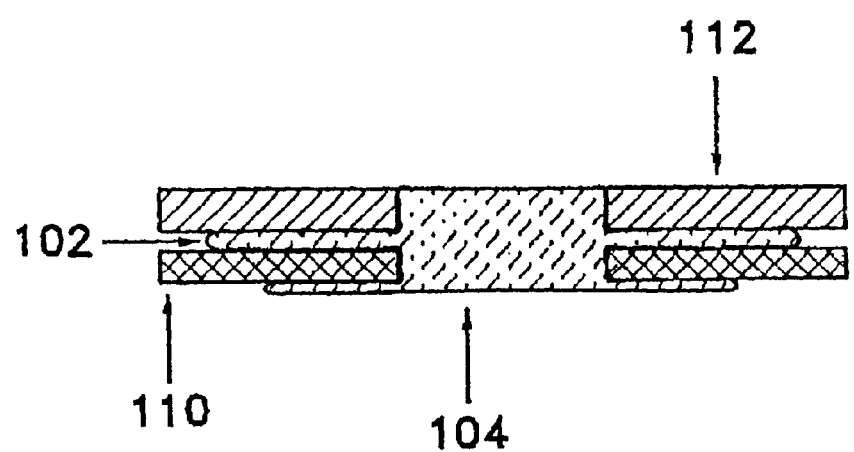
FIG. 43 is an explanatory view showing a cross section of a conductive part of a medium conveying belt according to the present invention.
Figure 44:
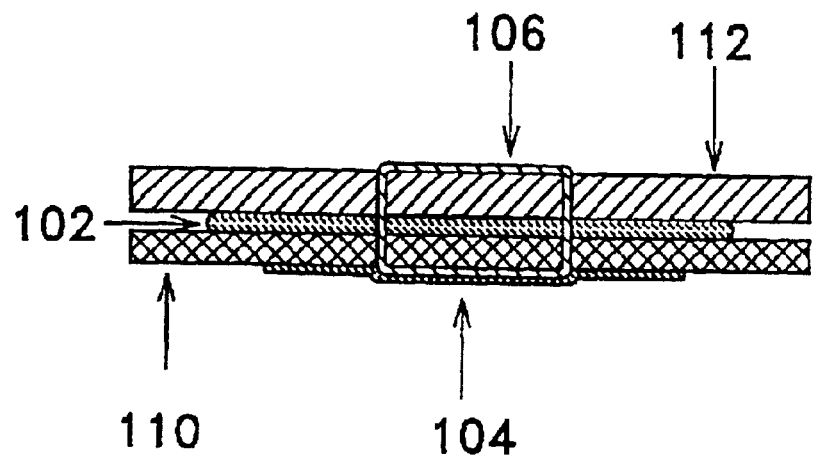
FIG. 44 is another explanatory view showing a cross section of a conductive part of a medium conveying belt according to the present invention.

The medium conveying belt 100 of the present invention is as follows. The belt having an electric power supplying part on both sides and on one side, such as shown in FIGS. 41 or 42, has a structure in which the electric conduction to the electric power supplying part is established via the base layer. For example, FIG. 43 shows that an electrically conductive electrode is formed from the opposite side of the protective layer after drilling a hole in a patterned portion and an electrically conductive substance 102 introduced into the drilled opening part 84 establishes an electrical conduction to form the power supplying part 104. FIG. 44 shows that an electrical conduction is established between layers by passing an electrically conductive fiber 106 therethrough and further an electric power supplying part 104 is formed. It is effective to use also an eyelet hole or a stapler (Hotchkiss) if it penetrates through the layers and has an electric conductivity as described above. The numeral 108 is an electrical conduction part, 110 is a tubular object, and 112 is a protective layer.

Further, in the production method of the medium conveying belt of the present invention, the medium conveying belt can be produced by further winding a resin film around a tubular object made of a polymer material in which an electrically conductive electrode pattern is formed on the outer circumferential surface, forming an electrode protective layer and then, in the heat-welding step, covering the outermost circumferential surface of the object on which the resin film is wound, with a tubular cover bag having a flat inner surface, applying a high pressure to the cover bag by bringing the inside of the cover bag into a reduced pressure state, and heat-welding the resin film in the pressurized state.

Here, in the medium conveying belt of the present invention, it is preferable that the surface roughness Ra of the outermost circumferential surface of the medium conveying belt is at most 0.5 $\mu$m, preferably at most 0.2 $\mu$m, in view of the purpose of allowing the belt itself to be electrically charged and conveying the medium while adsorbing it by the electric charge. Further, the surface roughness Rz is suitably at most 2.0 $\mu$m, preferably at most 1.0 $\mu$m, more preferably at most 0.7 $\mu$m. In the case where the surface roughness Ra is larger than 0.5 $\mu$m, the contact area between the paper and the outermost circumferential surface of the medium conveying belt is reduced to decrease the effective area of adsorption, so that the adsorptive power decreases. Also, in the case where the surface roughness Rz is larger than 2.0 $\mu$m, the contact area between the paper and the outermost circumferential surface of the medium conveying belt is reduced to decrease the effective area of adsorption, so that the adsorptive power decreases.

From the above, in order to produce a medium conveying belt having the aforesaid surface roughness by utilizing the fact that the roughness of the inner surface of the cover bag is transcribed onto the resin film on which the electrode protective layer is to be formed, it is preferable that the surface roughness Ra of the inner surface of the cover bag is at most 0.5 $\mu$m, preferably at most 0.2 $\mu$m. Further, the surface roughness Rz is suitably at most 2.0 $\mu$m, preferably 1.0 $\mu$m, more preferably at most 0.7 $\mu$m.

Here, the term "surface roughness Ra" in this specification is a value obtained in accordance with JIS B0601. More specifically, the value obtained by the following formula is represented in $\mu$m units when a sample is cut at a size of 30 mm length×3 mm width from a test material and measured with a surface roughness measurement device SE3500 (manufactured by Kosaka Kenkyuusho Co., Ltd.), a chart is drawn with a cut-off of 0.8 mm and a feeding speed of 0.1 mm/S, a portion having a standard length of L is drawn out, and the surface roughness curve is represented by Y=f(X), where the X axis is the central line of the drawn-out portion and the Y axis is the vertical direction.

$$Ra = \frac{1}{L}\int_0^L |f(X)|\,dx$$

This measurement is carried out for three pieces with the standard length (L) of 2.5 mm and the surface roughness is represented by the average value.

Actually, this value is obtained by the surface roughness analyzing system SE3500 (manufactured by Kosaka Kenkyuusho Co.,Ltd.). On the other hand, the term "surface roughness Rz" in this specification is also a value obtained by analyzing, with the surface roughness analyzing system SE3500 (manufactured by Kosaka Kenkyuusho Co., Ltd.), a value measured by the surface roughness measuring device SE3500 (manufactured by Kosaka Kenkyuusho Co., Ltd.) in accordance with JIS B0601. Specifically, Rz is a value obtained by determining a sum of an average value of the absolute values of the heights from the highest summit to the fifth summit and an average value of the absolute values of the heights from the lowest bottom to the fifth bottom as measured from the average line of the drawn-out portion in the direction of the vertical magnification, and representing this value in μm units. The adjustment of the sample and other conditions are the same as in the case of the surface roughness Ra.

Figure 45:
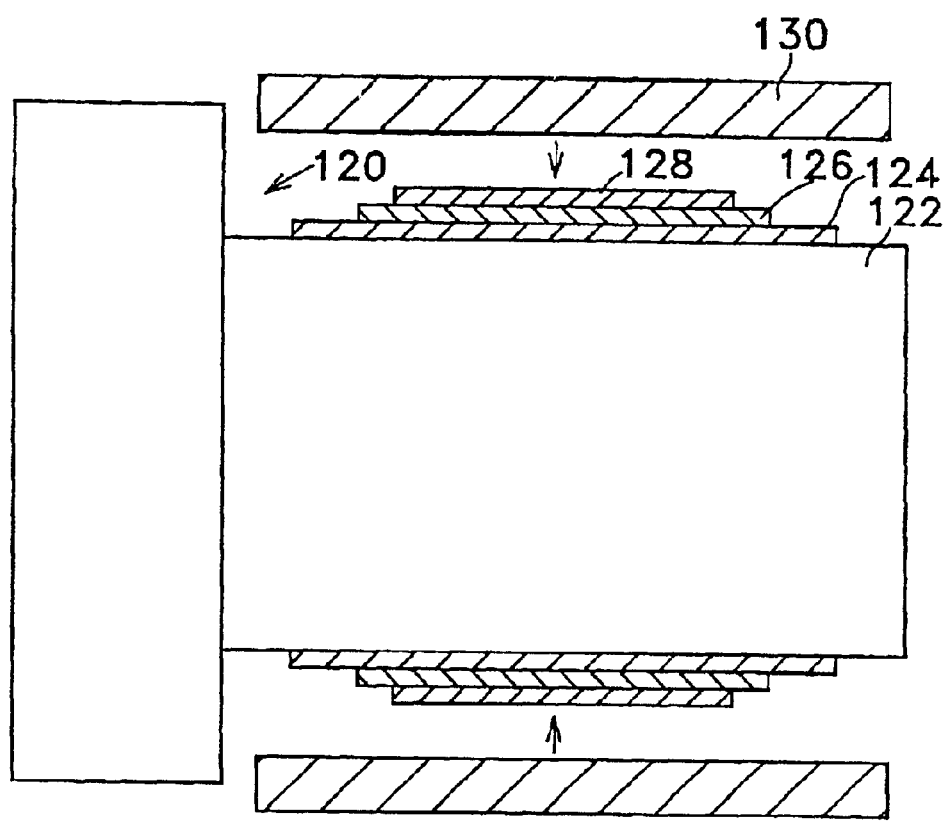
FIG. 45 is an enlarged cross-sectional explanatory view showing another embodiment of a production method of a medium conveying belt according to the present invention.

Hereafter, in the production method of this medium conveying belt, an embodiment of the heat-welding step will be explained in detail with reference to FIG. 45. As described above, a film having an electrode pattern disposed thereon is made into a tubular object 126 with the use of a tube 124 mounted on an axial core 122 of a medium conveying belt winding means 120, and then an electrode protective film 128 is laminated thereon. Thereafter, to its outer circumference, a tubular seamless cover bag 130 in which the surface roughness Ra of the inner surface that covers the whole resin film 51 is preferably at most 0.5 μm is attached, and the inside of the cover bag 130 is brought into a reduced-pressure state, and is heat-welded in a state in which a gas pressure higher than the inner surface is applied to the outside of the cover bag 130. In the above, the surface roughness Ra of the inner surface of the cover bag is most preferably at most 0.2 μm. Also, the surface roughness Rz of the inner surface of the cover bag is suitably at most 2.0 μm, preferably at most 1.0 μm. Further, it is preferable if the cover bag 130 has rubber elasticity and has a higher melting point than the resin film.

The cover bag 130 in the present invention can be made by the press-molding method using a heat-resistant elastic resin such as silicone resin or fluororesin. Namely, a split-type tubular female mold is loaded with a resin compound, and the resin compound is pressed with a tubular male mold whose circumferential surface is finished into a predetermined mirror surface. This allows the pattern on the circumferential surface of the male mold is transcribed onto the inner circumferential surface of the obtained cover bag to realize the intended surface roughness of the inner circumferential surface. Of course, the production method the cover bag is not limited to this alone.

Since the inside of the bag is in a reduced-pressure state, it will be effective if the pressure of the atmosphere gas is above the atmospheric pressure; however, it is preferable that the gas pressure of the atmosphere is preferably from 490000 to 3920000 Pa. If the gas pressure is above 3920000 Pa, a pressure tightness of the apparatus will be needed, disadvantageously leading to an expensive apparatus.

With the use of such a cover bag having a flat inner surface, preferably with a surface roughness Ra of at most 0.5 μm, the roughness of the inner surface of the cover bag is transcribed onto the resin film that forms the electrode protective layer, so that the roughness of the electrode protective layer surface can be reduced, and the step difference between the winding starting end and the winding finishing end of the resin film that forms the electrode protection can be less than 50% of the thickness of the resin film.

After the electrode protective resin film 128 is heat-welded and integrated to form a medium conveying belt, the medium conveying belt is taken out together with the tube 124 from the axial core 122, and thereafter the medium conveying belt is separated from the tube to obtain a medium conveying belt having an electrode protective resin layer 128 formed thereon. With the use of such an attachable and detachable tube, the processing operations such as attachment and detachment of the base material can be facilitated. The obtained medium conveying belt can be used in its obtained size or by cutting it for a suitable dimension adjustment.

Further, the production method can be applied also to the production method of a belt fabricated by winding a resin film for plural times, and it will be easy to reduce the surface roughness of, for example, an intermediate transcription belt of an electrophotography apparatus, which is another embodiment.

Next, a multi-layered endless belt molding apparatus capable of molding a multi-layered endless belt and further a medium conveying belt according to the present invention will be explained on the basis of the drawings.

The molding apparatus of the multi-layered endless belt according to the present invention can mold a multi-layered endless belt; further it can mold a medium conveying belt, in which an electrically conductive pattern is disposed on its outer circumference by a method such as printing, vapor deposition, etching, or plating.

In the molding apparatus of the multi-layered endless belt and the medium conveying belt of the present invention, the method of forming a tubular object of the multi-layered endless belt and the medium conveying belt by the aforesaid film winding means may be any of the previously described production methods of the multi-layered endless belt and the medium conveying belt.

Figure 46:
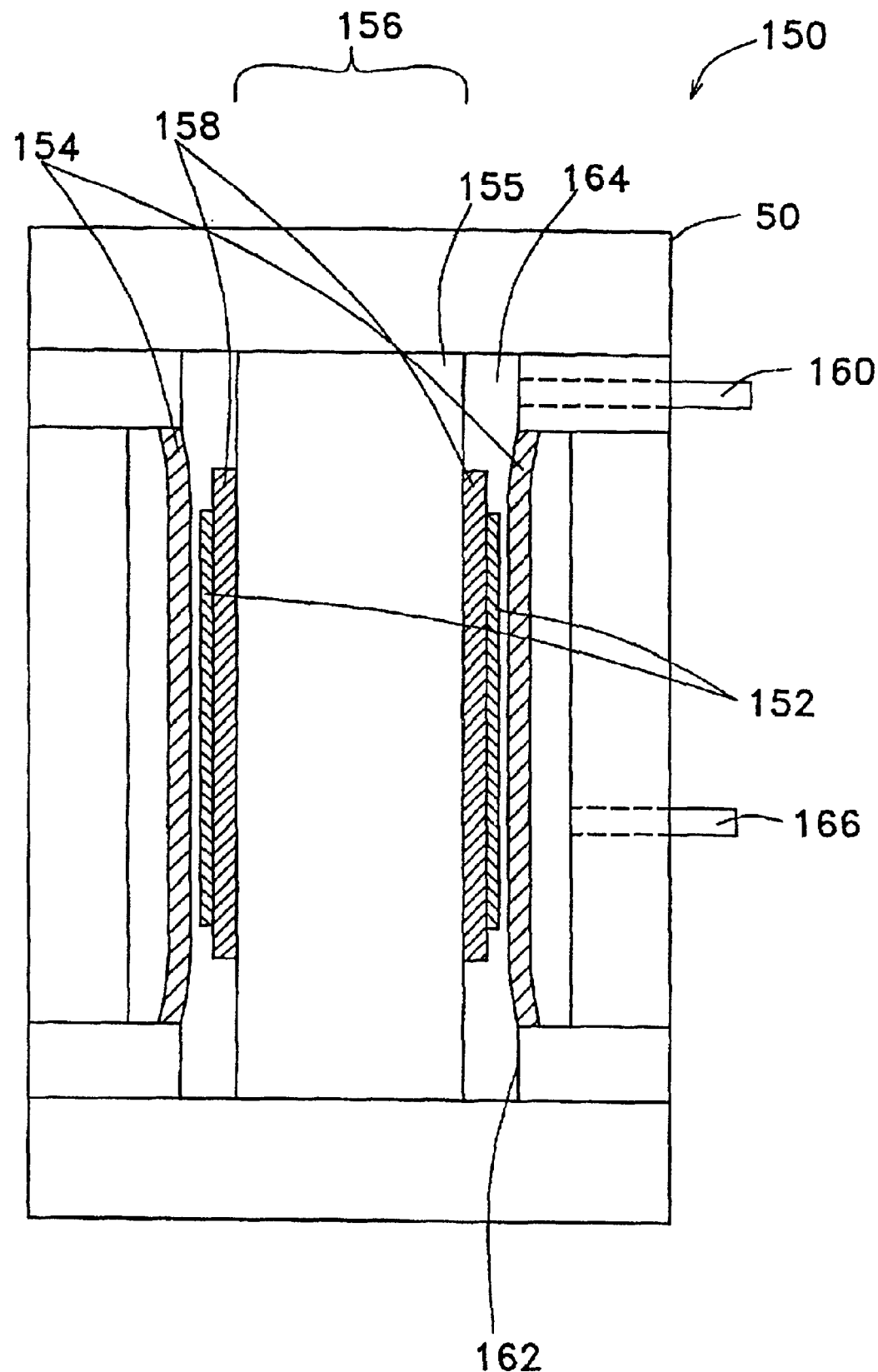
FIG. 46 is a cross-sectional side view showing one embodiment of a multi-layered endless belt molding apparatus of the present invention.

The multi-layered endless belt and the medium conveying belt described above are molded by heat-welding a wound material film; however, one embodiment of the multi-layered endless belt molding apparatus for the heat-welding step is a heat-pressurizing apparatus 150 such as shown in FIG. 46, and collectively heat-pressurizes a wound source material film. Hereafter, a specific method of heat-pressurization using this apparatus will be exemplified.

A tubular cover bag 154 having a size such that the outermost circumferential surface of a film for an electrode protective layer is completely covered is attached, and is allowed to cover the whole of a tubular object 152 constructed with a film with an electrode pattern and the film for the electrode protective layer that are wound around an attachable and detachable tube 158 in an axial core 156 constructed with an axial core main body 155 and the tube 158. Next, the inside of the cover bag 154 is brought into a reduced-pressure state via a degassing hole 160. Namely, the degassing hole 160 is a hole for bringing the inside of the space 164 surrounded by the axial core 156, the cover bag 154, and the inner wall 162 which is in contact with the cover bag 154, into a reduced-pressure state, and is a place for mounting, for example, a suction device or the like. This allows a pressure higher than the inner surface to be applied to the outside of the cover bag 154 by atmospheric pressure. Alternatively, air, water, or the like can be press-supplied through a hole 166 to pressurize the cover bag 154 from the outside.

The cover bag 154 need not necessarily be tubular; however, it is preferable to use an endless tubular body also for the cover bag 154 in order to finish the surface of the molded electrode protective layer without unevenness.

The cover bag 154 preferably has a flexibility such that the pressure from the outside can be made uniform. From this viewpoint, the cover bag 154 is preferably made of resin; however, it is not limited thereto. It is important that there is no deterioration caused by heating, and a cover bag made of a heat-resistant rubber material such as a silicone resin or a fluororesin is especially suitably used.

Further, in order to efficiently remove air remaining between the wound films and to effectively cause press-bonding of the films with each other, it is preferable that the space 164 surrounded by the cover bag 154, the tube 158, and the axial core main body 155 is brought into a reduced-pressure state; however, the processing is possible even by pressurization from the outer surface alone.

Figure 47:
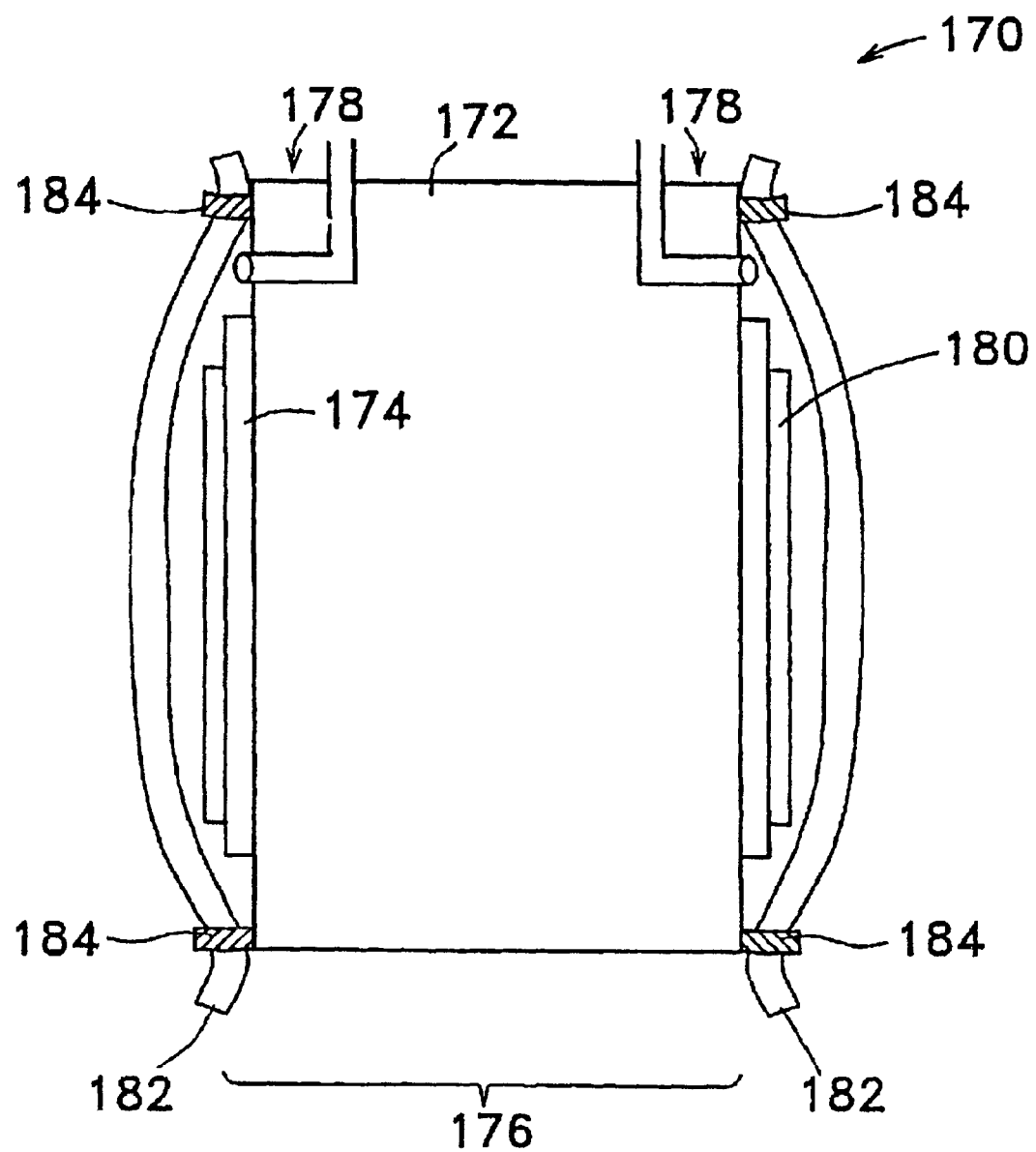
FIG. 47 is a cross-sectional side view showing one embodiment of a multi-layered endless belt molding apparatus of the present invention.

Further, in another mode, the heat-welding step of the wound tubular object is carried out by setting a device 170 such as shown in FIG. 47 into, for example, a pot body having an autoclave-like shape and by uniformly heating it with circulating hot air or the like.

A degassing hole 178 for reducing the pressure is mounted to the axial core 176 composed of the axial core main body 172 and the thin metal tube 174. A tubular cover bag 182 such that the outermost circumferential surface of a film 180 for an electrode protective layer wound around the axial core 176 is completely covered is attached, and is allowed to cover the whole of the film with the electrode pattern and the film 180 for the electrode protective layer that are wound around the attachable and detachable tube 174 of the axial core 176. Next, both ends of the cover bag 182 are strongly clamped with a clamping tool 184 such as a metal belt, and a glass wool is allowed to bite on the pressure-reducing degassing hole 178. The medium conveying belt of the present invention can be produced also by putting this device 170 into, for example, a vacuum pressing apparatus or the like and, while reducing the pressure via the pressure-reducing degassing hole 178, heating the inside of the device such as the vacuum pressing apparatus while bringing it into a pressurized state.

In the above-described construction, the heating temperature must be such that the it is heated up to the temperature necessary for both the thermoplastic resin layer or the thermoplastic resin film for forming the resin tubular object and the resin for the electrode protective layer to be softened and welded. Therefore, the heating temperature is set above the softening temperature of the resin having a higher softening point between the two resins. However, if the temperature is too high, the resin will be deteriorated, so that an appropriate temperature must be found out. Also, the temperature needed for sufficient welding differs to some extent depending also on the applied pressure, so that an appropriate temperature can be found out by performing a preliminary experiment, for example, which is performed by laminating the material in a flat plate shape on a flat plate pressing apparatus or the like, pressing it under various conditions used as parameters of the temperature, pressure, and time, and observing the welded state and the degree of deterioration of the resin.

These works are preferably performed under a clean atmosphere in order to prevent contamination of foreign substances that inhibit the electrical characteristics, and are preferably performed in a clean room.

Figure 48:
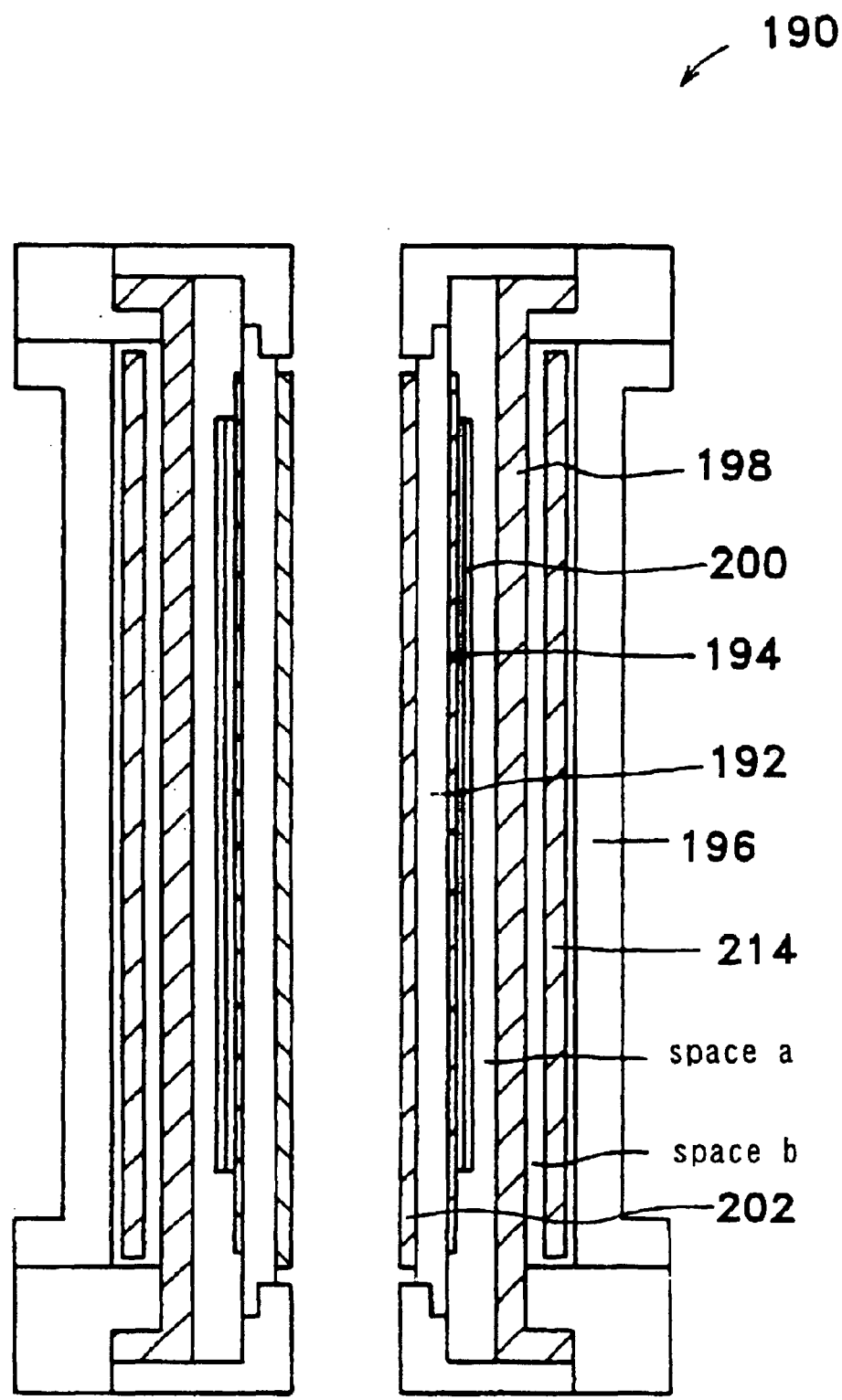
FIG. 48 is a cross-sectional side view showing another embodiment of a multi-layered endless belt molding apparatus of the present invention.

Another embodiment 190 of the molding apparatus of the multi-layered endless belt according to the present invention will be shown in FIG. 48.

The apparatus according to the present invention is an apparatus having a basic construction with a multiple tubular mold made of a hollow or solid axial core (192, 194) and an outer tube 196 surrounding thereof, and an elastic body 198 that partitions the space between the axial core and the outer tube, wherein the spaces on the axial core side and on the outer tube side with the elastic body lying therebetween (hereafter respectively referred to as space a and space b) are independently capable of being subjected to pressure reduction and/or pressurization.

The apparatus 190 according to the present invention has the aforesaid basic construction as a basis and has a structure devised in various ways. The details and characteristics of the apparatus of the present invention are as follows.

In the apparatus of the present invention, there is one in which the axial core is made of an axial core main body 192 and an endless tube 194 made of a thin metal such as stainless steel (hereafter abbreviated to as SUS), nickel (hereafter abbreviated to as Ni), steel, copper, or aluminum (hereafter abbreviated to as Al), or an alloy thereof or a heat-resistant resin such as polyimide which is attachably and detachably fitted onto the axial core main body 192.

If the endless tube fitted onto the axial core main body is a metal tube, it is preferable that the thickness is at least 0.05 mm and at most 3 mm, preferably at least 0.15 mm and at most 2 mm. Also, if it is a heat-resistant resin tube, it is preferably made of a nonthermoplastic polyimide (hereafter denoted as PI) having a thickness of at least 50 $\mu$m, preferably at least 150 $\mu$m and at most 2 mm.

The endless tube 194 fitted onto the aforesaid attachable and detachable axial core main body determines the inner diameter dimension of the molded endless belt 200, and can be made at a lower cost than each of the molds for extrusion, injection, and application drying—cure of the conventional method, and is suitable for practical application.

Further, since the axial core has such a construction, it can be easily mounted or dismounted in a state in which the film serving as the source material of the endless belt is wound around the endless tube 194, and also the source material film for the endless belt can be prepared for winding and the endless belt having completed the molding can be easily taken out by mounting the aforesaid endless tube 194 on a tubular or cylindrical axial core having the same size as the axial core main body 192, which has been separately prepared in a preliminary set-up procedure, so that the operating efficiency of the apparatus main body can be raised, which is effective from the view point of improvement in productivity.

In the apparatus of the present invention, a layer having smoothness can be disposed on the surface of the aforesaid endless tube 194.

Figure 49:
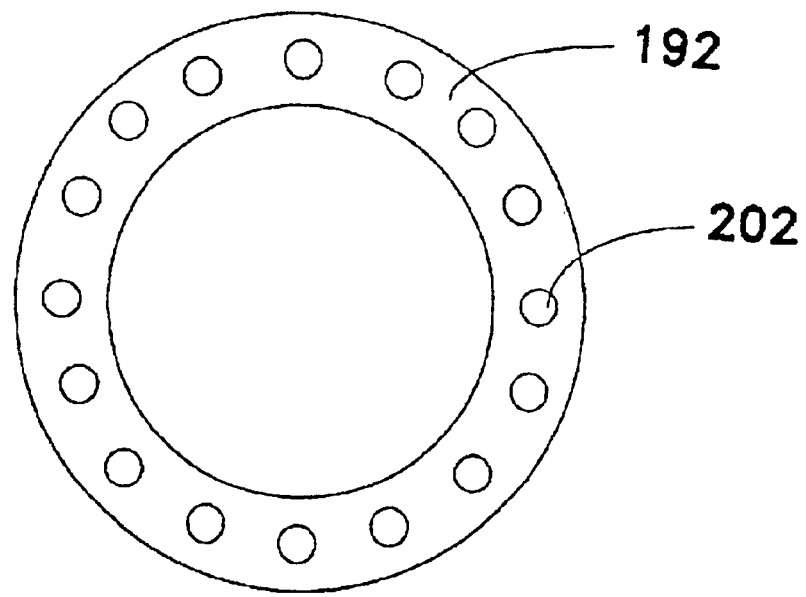
FIG. 49 is a cross-sectional explanatory view showing an Example of disposition of a heat source of a multi-layered endless belt molding apparatus according to the present invention.
Figure 50:
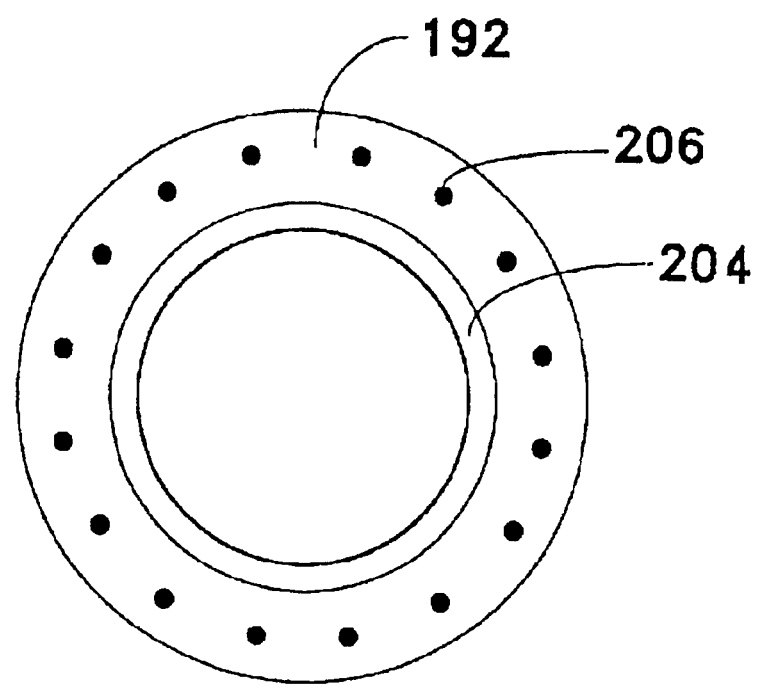
FIG. 50 is a cross-sectional explanatory view showing an Example of disposition of a heat source and a cooling mechanism of a multi-layered endless belt molding apparatus according to the present invention.
Figure 51:
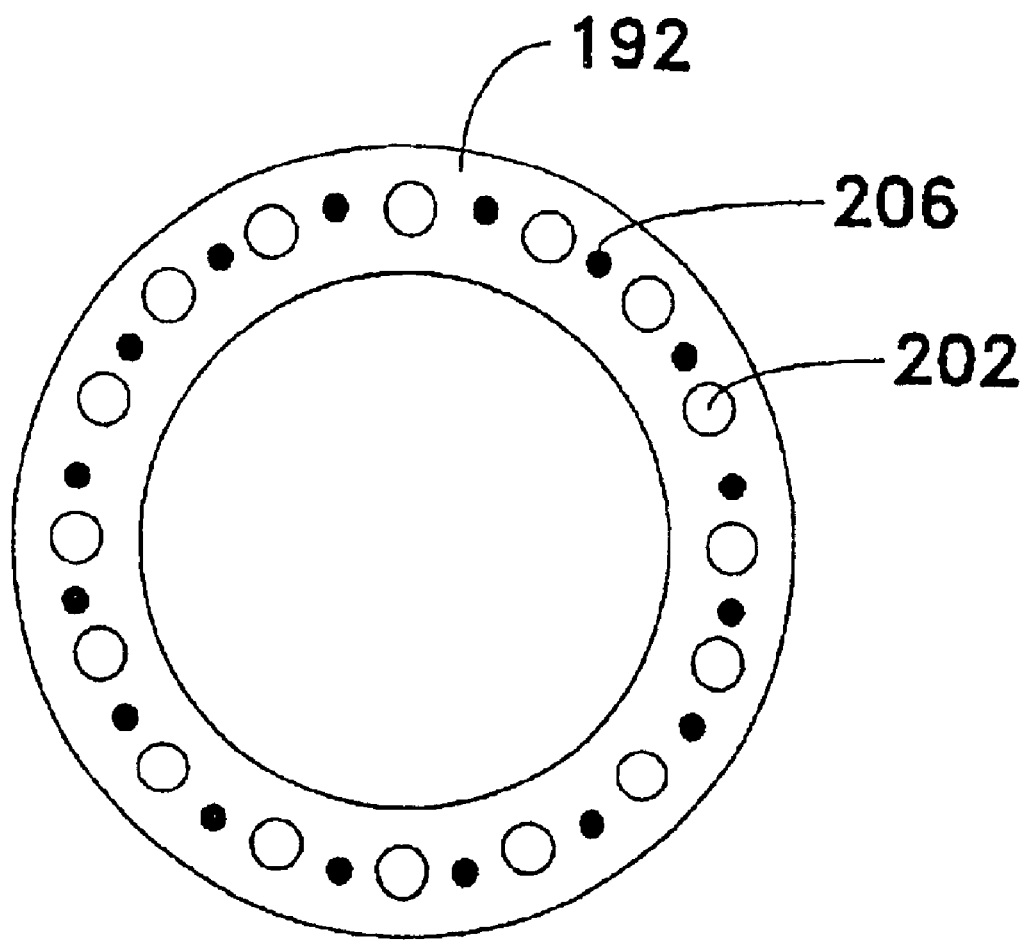
FIG. 51 is a cross-sectional explanatory view showing another Example of disposition of a heat source and a cooling mechanism of a multi-layered endless belt molding apparatus according to the present invention.

Further, in the apparatus of the present invention, in the axial core main body 192, a heat source 202 can be disposed in the inside of a hollow or solid axial core main body as shown in FIG. 49, or a heat source 204 and a cooling mechanism 206 can be disposed in the inside of a hollow axial core main body 192 as shown in FIGS. 50 and 51. Further, an elastic-body layer can be disposed in the axial core main body. By disposing a thin layer of elastic body on the surface, the heat of the aforesaid heat sources 202, 204 can be uniformly transmitted to the aforesaid endless tube 194 to make the surface temperature of the endless tube 194 surface uniform, so that it is convenient in stabilizing the molding condition of the endless belt 200.

Figure 52:
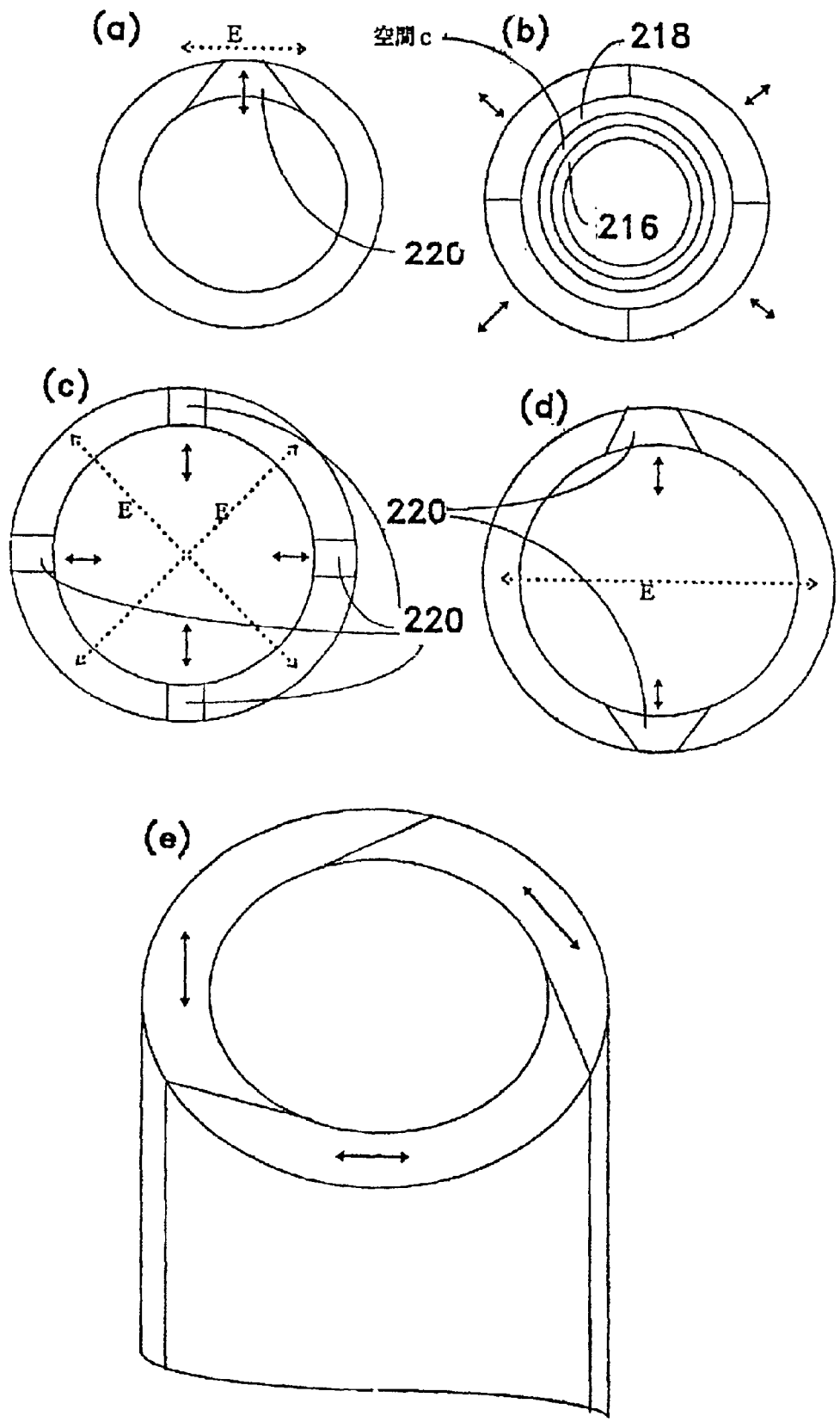
FIG. 52 is an explanatory view showing a shape of an axial core of a multi-layered endless belt molding apparatus according to the present invention.
Figure 53:
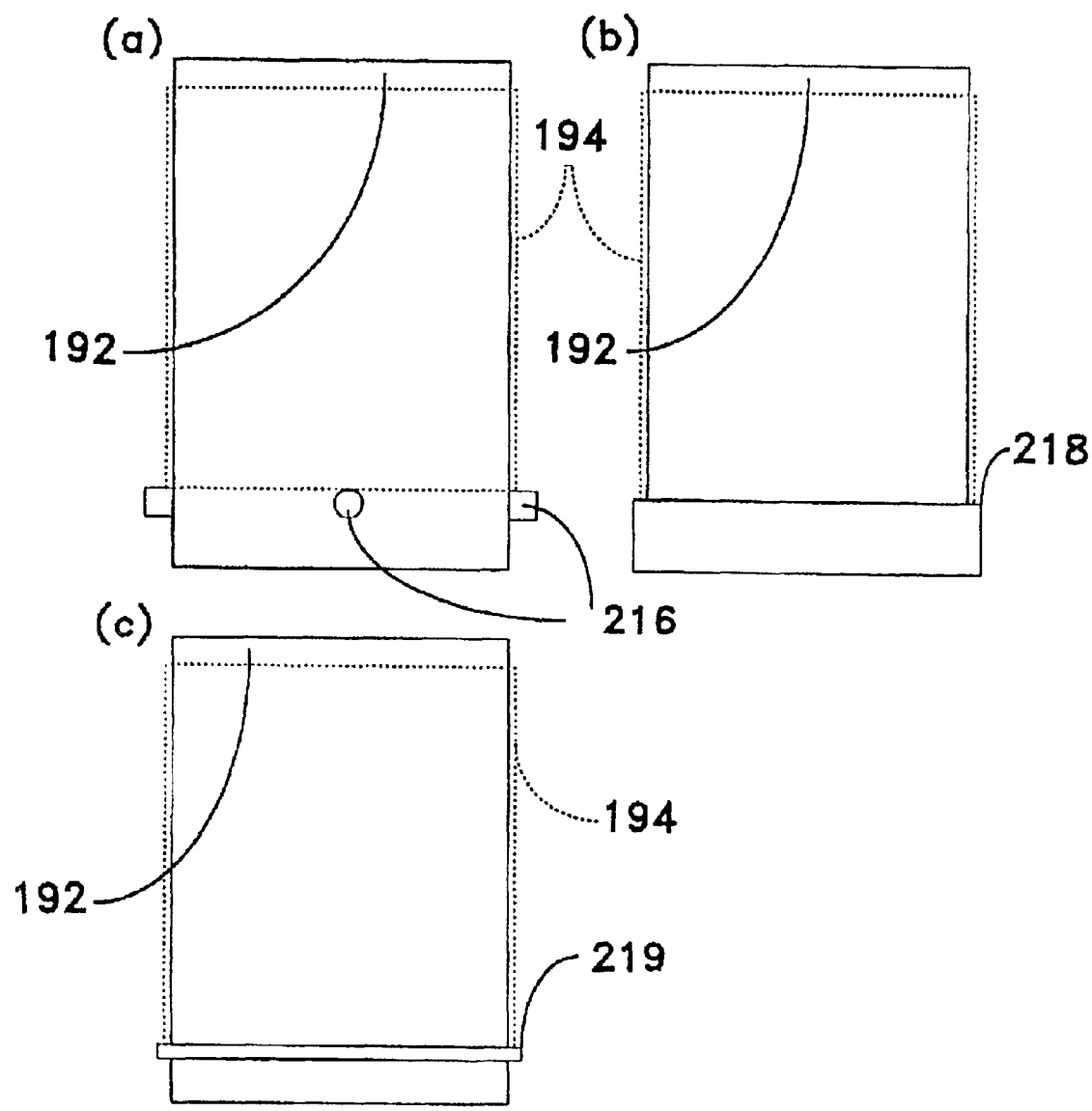
FIGS. 53(a), 53(b), 53(c) are cross-sectional explanatory views showing still another Example (provided with a protrusion) of a sectionable axial core provided with an elastic body layer of an endless belt molding apparatus according to the present invention.

In the apparatus of the present invention, the axial core main body 192 can be made expandable and contractible (FIGS. 52 and 53). If the axial core main body is not expandable or contractible, the relative dimension of the axial core main body 192 and the endless tube 194 of SUS or the like to be fitted thereon must have an extremely high precision, and if the axial core main body 192, the axial core for the preliminary set-up procedure, and the endless tube 194 are prepared in a large number, a nonconforming combination is produced, thereby generating inconvenience. In order to resolve this, it is suitable if the axial core main body 192 is expandable and contractible.

Figure 54:
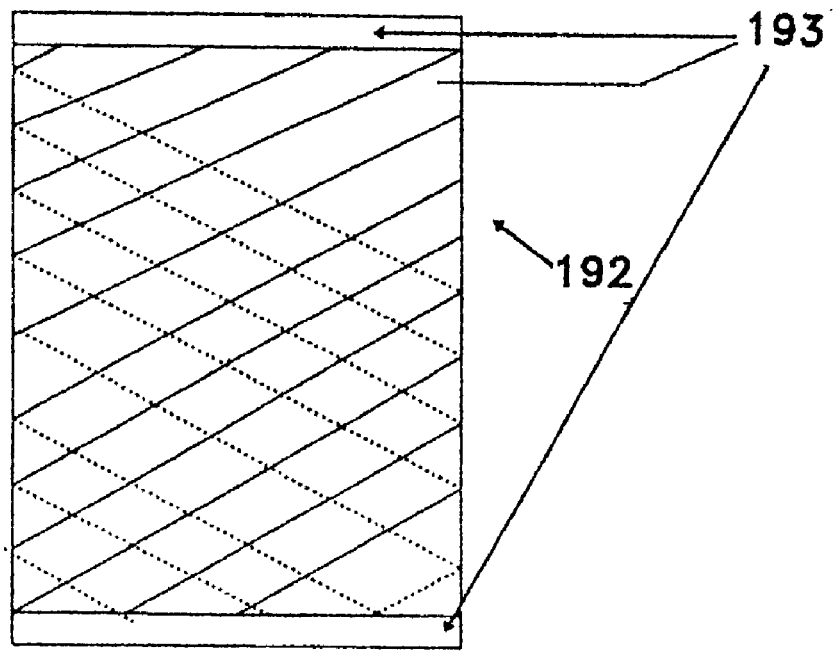
FIG. 54 is a cross-sectional explanatory view showing still another Example of an expandable and contractible axial core (expanded and contracted by pulling or pressing while twisting a plate-shaped metal) of an endless belt molding apparatus according to the present invention.
Figure 55:
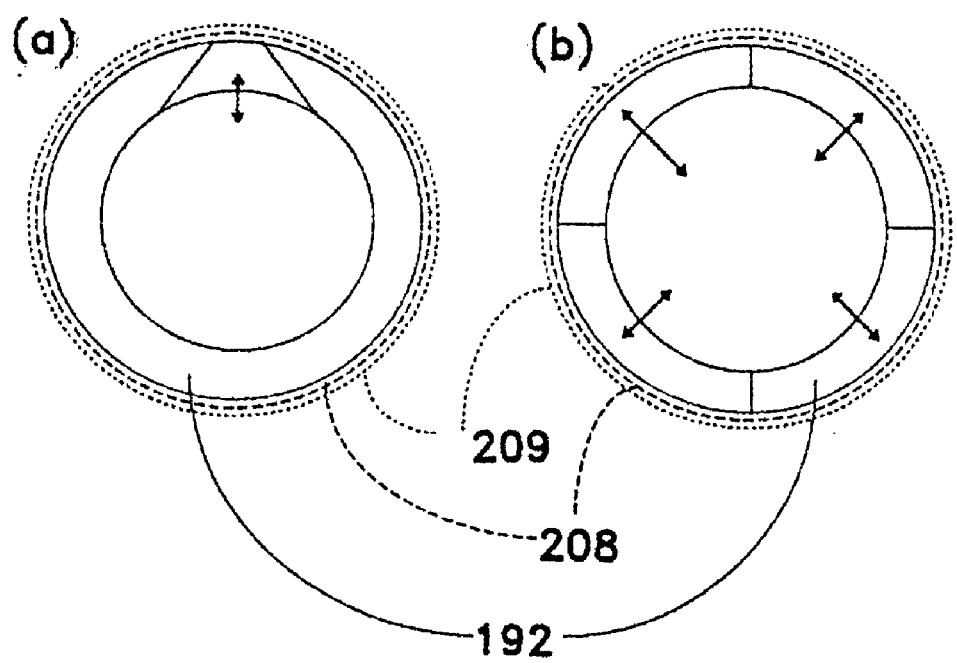
FIGS. 55(a), 55(b) are cross-sectional explanatory views showing still another Example (provided with an elastic body layer) of a sectionable axial core of an endless belt molding apparatus according to the present invention.

The expandable and contractible axial core main body may be, for example, (1) one constructed with a spiral-shaped plate-like member and being expandable and contractible by application of a torsional force: FIG. 54,
(2) one having a notch and being expandable and contractible by letting a wedge-like form in and out from the inside: FIG. 55,
(3) one sectioned and having overlapped taper-like cross sections of the sectioned parts to be expandable and contractible by increasing or decreasing the diameter of the whole by applying a force in the rotation direction: FIG. 55, or
(4) one that expands or contracts by being subjected to pressure reduction or pressurization from the inside of the sectioned axial cores via an elastic body: FIG. 55.

Here, in the Figures, 193 is an axial core, 216 is a supporting body of the elastic body for expanding and contracting the sectioned axial cores, 218 is an elastic body, and 220 is a small sectioned part.

If the axial core main body 192 is made expandable and contractible, the close adhesion property between the axial core main body 192 and the endless tube 194 can be raised. Here, the one in which a thin elastic layer 208 is disposed on the axial core main body 192 is advantageous because it smoothens the contact between the axial core main body 192 and the endless tube 194. Further, if the thin elastic body layer 208 is an elastic body having an endless tube shape and a surface treatment 209 having smoothness is performed on its surface, the endless belt can be molded without the use of the aforesaid endless tube 194 of SUS or the like by appropriately selecting the molding conditions.

In the apparatus of the present invention, there is one in which the shape of the heat source is made suitable and the heat source itself is used as the axial core.

The one having such a structure has a simple structure and is advantageous in miniaturizing the size of the apparatus as compared with the one in which the axial core and the heat source are constructed with different materials.

Figure 56:
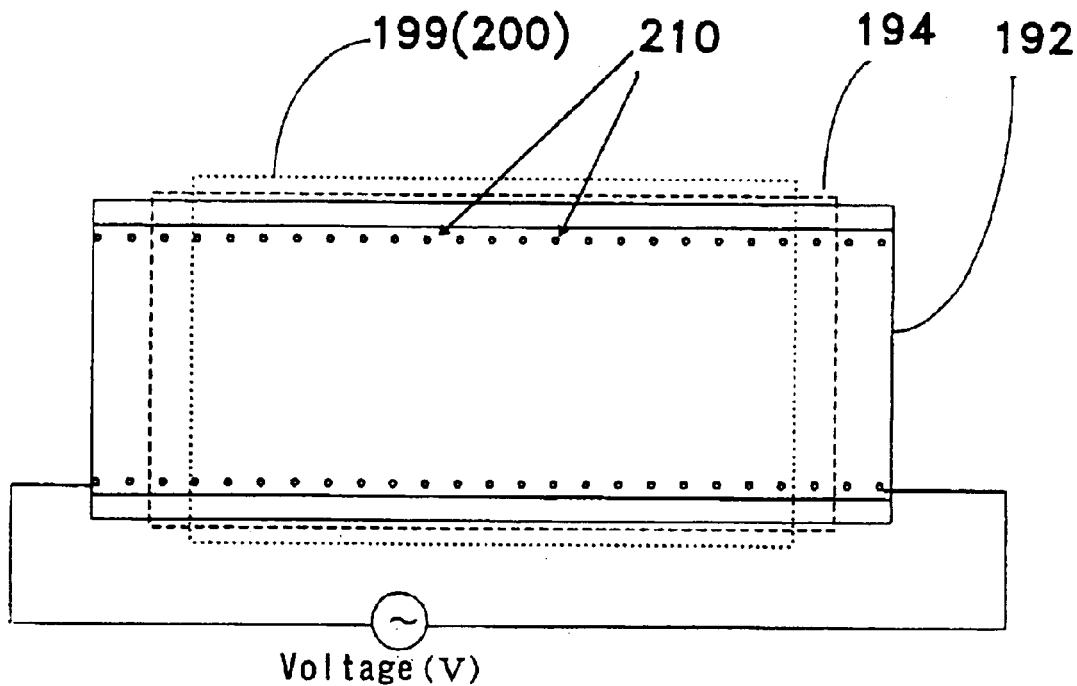
FIG. 56 is an explanatory view showing still another embodiment of a heat source of a multi-layered endless belt molding apparatus according to the present invention.
Figure 57:
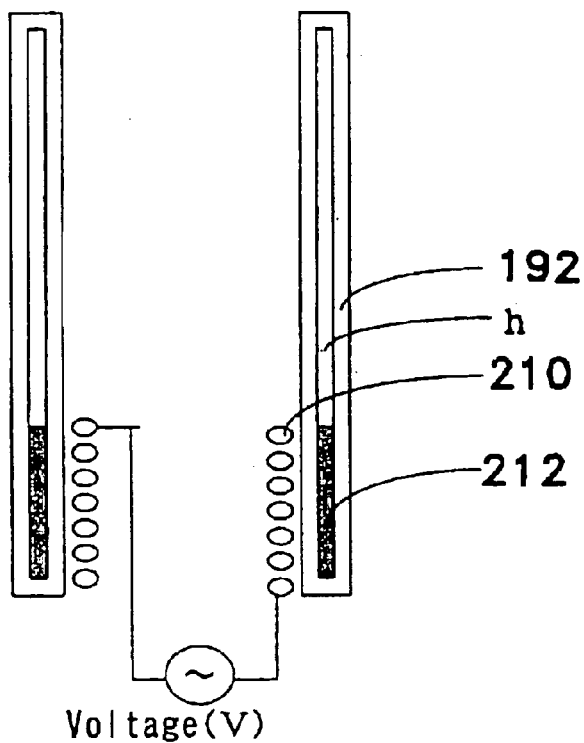
FIG. 57 is an explanatory view showing still another embodiment of a heat source of a multi-layered endless belt molding apparatus according to the present invention.
Figure 58:
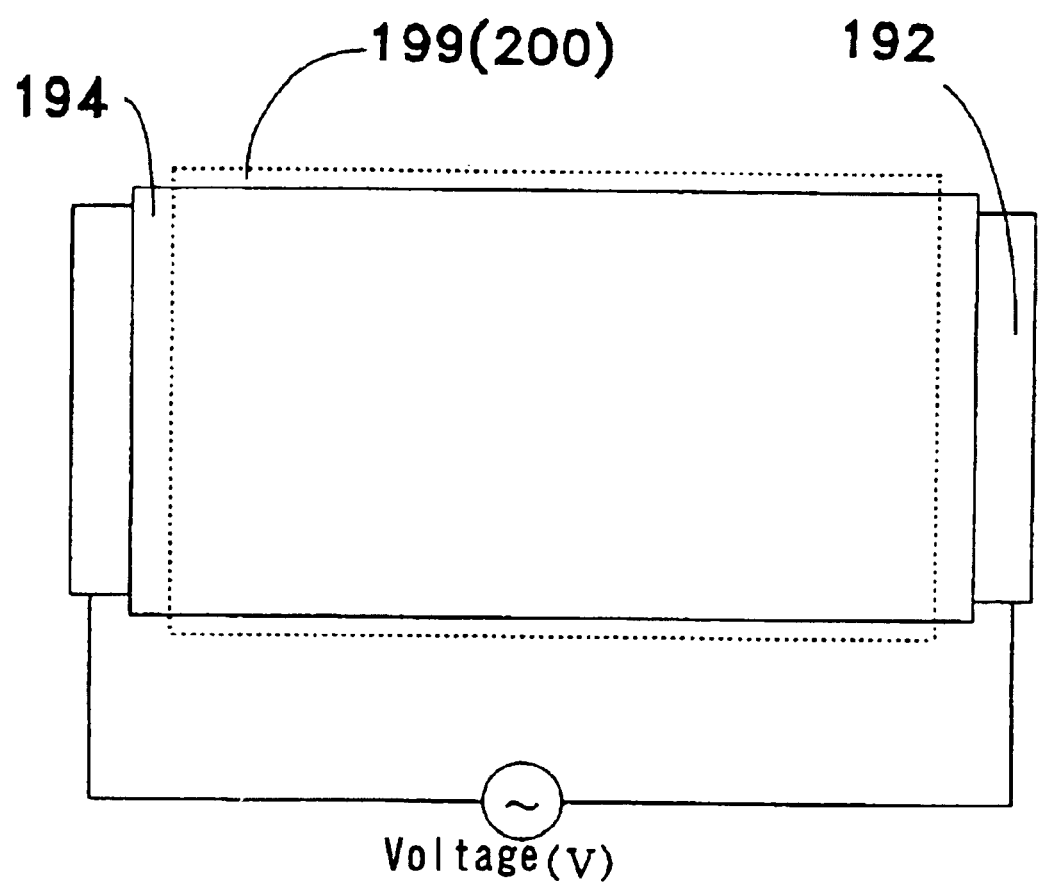
FIG. 58 is an explanatory view showing still another embodiment of a heat source of a multi-layered endless belt molding apparatus according to the present invention.

The one in which the heat source is used as the axial core is, for example, (1) One in which at least one of the hollow axial core main body 192 and the thin plate tube 194 fitted thereon is constructed with an electrically conductive material, and which is constructed so that at least one of the axial core main body 192 and the thin plate tube 194 fitted thereon can be heated by an induction coil 210 disposed in the inside of the axial core main body 192: FIG. 56,
(1)' One which has the above-mentioned construction and in which uniform heating is made possible by making the inside of the axial core main body 192 into a hollow h, enclosing a heat medium 212, and evaporating it at the time of heating: FIG. 57,
(2) One in which the heat source is constructed with a self-heat-generating ceramic and the surface is covered with an insulating coat to make an axial core main body capable of generating heat by energization: FIG. 58, or
(3) One in which an electrical conductor is constructed with an insulator such as an insulating ceramic such as alumina or zirconia, or heat-resistant glass, or various minerals such as marble, and an electrically conductive layer formed thereon, and further is covered with an insulating coat to make an axial core main body 192 capable of generating heat by energization: FIG. 58.

Here, it is suitable if the insulating coat is various heat-resistant resins, glass, or various ceramics, in view of the using method of the present apparatus, and is suitably selected in accordance with the heating condition at the time of producing the endless belt.

In the apparatus of the present invention, there is an axial core in which a cooling mechanism is disposed together with the disposed heat source: FIGS. 50 and 51

In any of the case in which the axial core is constructed with the heat source itself and the case in which the heat source is disposed in a hollow or solid axial core, it is preferable if it is one provided with a cooling mechanism, from the view point that the molding cycle of temperature raising—cooling can be made short, and an excessive heat history is not given to the source material film and the molded endless belt.

In the apparatus of the present invention, the elastic body 198 for partitioning between the axial core and the outer tube is selected from the rubber materials whose material quality is a silicone rubber, a Teflon rubber, a chlorosulfonated polyethylene rubber, or the like, in accordance with the heat processing condition of the source material film 18 to be used for molding.

Further, configutationally and dimensionally, there are:

one in which the inner diameter of the elastic body is larger than the outer diameter of the axial core (main body and an endless tube of SUS or the like fitted thereon), one in which the inner diameter of the elastic body is less than or equal to the equivalence of the outer diameter of the axial core (main body and an endless tube of SUS or the like fitted thereon), one in which the inner surface of the elastic body (axial core side) is subjected to surface treatment having smoothness, one in which the inner surface of the elastic body is made flat to have a surface roughness of at most Rz=2 ($\mu$m) (Rz is a 10-point average roughness in the measurement range of 0.8 mm), and one in which a suitable unevenness is disposed on the inner surface of the elastic body, and a suitable selection is made in accordance with the surface property and the like required in the endless belt to be molded.

For example, if surface flatness of the endless belt to be molded is required, it is essential that the inner diameter of the elastic body at the initial state is less than or equal to the equivalence of the outer diameter of the axial core, and the surface roughness thereof is less than or equal to the required surface roughness of the endless belt, and if the source material film has tackiness, it must be one subjected to a surface treatment having smoothness.

By applying a pressure via the elastic body, it is possible to apply a uniform pressure to the source material film and a completely integrated endless belt is obtained even if the source material film having unevenness in its surface is used. Further, if the pressure is applied via the elastic body 198, the elastic body presses the source material film 200 first, so that resin flowing can be prevented even if a thermoplastic resin film is used as the source material film, and an endless belt having a desired size is obtained without causing the thickness insufficiency of the end surface.

In the apparatus of the present invention, there is one in which a member 214 for restricting the enlargement of the elastic body is provided between the elastic body and the outer tube (the aforesaid space b).

The materials used for the elastic body 198 are all excellent in elongation, but with peated use, there occurs a decrease of elongation which is regarded as life span. It is not preferable to give an overloading elongation on the apparatus material, and from the viewpoint of extending the life span, it is effective to dispose such a member for an elongation restricting. Also, since the minimum elongation of the elastic body 198 is needed, the cycle time cycling between the extension and the contraction will be short, which is preferable from the view point of improvement in productivity.

In the apparatus of the present invention, there is one in which a portion of the axial core main body 192 has a protrusion 216 or step differences 218, 219, as shown in FIG. 53.

Because of the presence of such a protrusion 216 and step differences 218, 219, the endless tube 194 can be held at a predetermined position at all times in attaching the thin endless tube 194 made of SUS or the like fitted onto the axial core main body 192, and the pressure and temperature conditions in molding and processing the source material film wound around the endless tube 194 into the endless belt 200 can be made constant, so that the products can be obtained to be stable in quality.

The apparatus of the present invention and their characteristics are as described above, and the most suitable construction is selected and used in accordance with the endless belt 200 to be produced.

Further, the aforesaid apparatus according to the present invention are used according to the procedure described below.

Further, in the endless belt production method of the present invention using the apparatus 190 according to the present invention, for mounting the source material film, there are two methods, one in which the axial core is set in the apparatus after the film is wound around the axial core (the main body and the thin tube fitted thereon), and the other one in which the thin plate tube is mounted to an axial core having the same diameter as the axial core main body, the source material film is wound around it, and then the thin plate tube having the source material film wound thereon is dismounted and mounted to the axial core main body which has been already set in the apparatus.

1) A source material film 199 is wound in a preliminary set-up procedure around a thin endless tube 194 made of metal or made of resin fitted onto the axial core main body 192.
2) The aforesaid endless tube 194 having the source material film 199 wound thereon is mounted on the axial core main body 192. At this time, the operation condition of the apparatus main body differs depending whether the inner diameter of the elastic body 198 is larger than or below the equivalence of the outer diameter of the axial core.

In the case where the inner diameter of the elastic body 198 is below the equivalence of the outer diameter of the axial core First, the space between the elastic body 198 and the outer tube 196 (space b) is subjected to pressure reduction to form a gap between the elastic body and the axial core, and then the aforesaid endless tube 194 having the source material film 199 (200) wound thereon is mounted.

In the case where the inner diameter of the elastic body 198 is larger than the outer diameter of the axial core Since there is a gap between the elastic body 198 and the axial core, it is not necessary to reduce the pressure of the space b, and the aforesaid endless tube 16 having the source material film 199 (200) wound thereon can be mounted while maintaining atmospheric pressure. (If the pressure is reduced, a larger gap can be obtained to provide better workability)
3) The space a is subjected to pressure reduction and air between the wound films 200 is removed.

In the case where the inner diameter of the elastic body 40 is larger than the outer diameter of the axial core and when the endless tube 194 having the source material film 199 (200) wound thereon is mounted by reducing the pressure of the space b, it is sufficient to simply reduce the pressure of the space a. However, in the case where the endless tube 194 having the source material film 199 (200) wound thereon is mounted while maintaining the space b to be under atmospheric pressure, it is important that the pressure of the space b is reduced before the reduction of the pressure of the space a, and it is necessary to take care so that the film having the elastic body 198 wound thereon is pressed to prevent it from becoming an obstacle in removing air between the films.

The pressure reduction level at this time must be such that the relative pressure satisfies (pressure reduction level of space b ≧ pressure reduction level of space a). Further, if the inner diameter of the elastic body 198 at the initial state is below the equivalence of the outer diameter of the axial core, it is important that the relative pressure is adjusted and maintained so as to satisfy (pressure reduction level of space b > pressure reduction level of space a) to give a condition that prevents the elastic body 198 from becoming an obstacle in removing air between the wound films.
4) The space b is pressurized while maintaining the space to be under reduced pressure, and the wound films are heated while applying pressure to the wound films. By pressurizing the space b, the wound films 199 are given a uniform pressure via the elastic body 198 and are in a fixed state. In this state, the films are heated for a predetermined period of time and at a predetermined temperature, whereby the films are integrated and molded into an endless belt 200.
5) It is cooled while holding the aforesaid pressure At the any of time mounting the endless tube 194 having the source material film 199 wound thereon, air between the films by reducing the pressure of the space a is reduced to remove, and at the time of taking the molded endless belt out, and the like, the temperature of the apparatus need not be an ordinary temperature, and it is convenient if the temperature is high as long as there is no inconvenience in the work and the resin and the adhesive that form the source material film to be used and the molded product and others do not cause inconveniences such as deformation or deterioration heat, because then the molding cycle can be made faster and the productivity can be raised.
6) The endless tube 194 remaining the molded endless belt 200 attached thereto is dismounted from the axial core main body, and then the endless belt 200 is peeled off from the endless tube 194. The space b is subjected to pressure reduction and the reduced pressure state of the space a is returned to the ordinary pressure to remove the pressing force of the elastic body 198, and then the endless tube 194 having the molded endless belt 200 attached thereto is taken out from the axial core main body 192.

Since the endless tube 194 is made of a thin metal or made of resin, it is easily deformed by external force, and there will be a gap between the endless tube 194 and the molded endless belt 200, so that the two can be separated easily.

In the production method of the endless belt according to the present invention, it is suitable if air between layers of the wound source material films 199 (200) is removed under a reduced pressure condition of the space a being at most 76000 Pa, preferably at most than 10000 Pa, and they are integrated by heating in a state in which they are pressed and fixed via the elastic body 40 under the pressurization condition of the space b being a pressure of at least 101300 Pa and at most 3000000 Pa, preferably exceeding 101300 Pa and at most 2030000 Pa, more preferably exceeding 101300

Pa and at most 1010000 Pa. By doing so, it is possible to produce an endless belt having no residual air. This eliminates voids, and can prevent or reduce the generation of electric breakdown by the applied voltage in the belt having an electrically conductive pattern 220 formed thereon later, and can prolong the voltage resistance life span to an enormous extent.

Also, for example, in the case of producing a thick endless belt such as being 2 mm thick, the thickness of the source material film can be as thick as 0.5 mm; however, it is more suitable if a thin source material film such as having a thickness of 0.2 mm is used while taking care so as not to increase the winding number too much, because then it is easier to obtain an endless belt being excellent in the uniformity of thickness and the flatness of the winding starting and winding finishing portions. It goes without saying that, in the case of producing a thinner endless belt than the aforesaid ones, use of a thinner film than the aforesaid source material film is a condition to produce a good endless belt. Although this differs depending on the fluidity of the resin, it will be a good condition if the thickness of the source material film to be used is generally at most ⅓, preferably at most ⅕, of the thickness of the endless belt to be produced, and the winding number is at least 3 times, preferably at least 5 times. This is because, by using a film in accordance with the thickness of the endless belt to be produced and by suitably setting the winding number, endless belts having an arbitrary thickness, from thin endless belts to thick endless belts, can be produced, and moreover the thickness of the film can be made almost constant, so that the thickness of the obtained endless belt can be made almost constant.

In the present invention, it is suitable if the surface temperature of the axial core of the endless belt molding apparatus is set to be higher by 30° C. or more, preferably higher by 50° C. or more, than the glass transition temperature Tg of a resin selected from the heat-resistant resins capable of being used in the multi-layered endless belts according to the present invention.

Further, for example, in winding the source material film 199 around the attachable and detachable endless tube 194, uniform winding can be made without loosening of the wound films by allowing the source material films 199 to be electrostatically charged and then winding them around the endless tube 194 because the source material films 199 wound around the endless tube 194 are brought into closer adhesion with each other by static electricity, so that it is preferable Next, still another embodiment of the multi-layered endless belt molding apparatus according to the present invention will be explained.

A basic construction of this embodiment 230 is an endless belt molding apparatus 190 being constructed with at least a removable axial core and a heat-pressurizing device to which a barrier member is mounted, wherein there are two spaces that are partitioned by the barrier member between the axial core and the heat-pressurizing device, the axial core has an outer circumferential surface for winding the films, and the endless belt molding apparatus 190 is provided with a pressure processing mechanism to the films via a heat processing mechanism and the barrier member. However, in addition to this, the axial core 234 attachable and detachable to the heat-pressurizing device 232 is a tubular or cylindrical structural body and has a structure and means for independently adjusting the pressures of the inner space c of the axial core 234, the space d from the outside of the axial core 234 to the barrier member 236 of the heat-pressing device 232, and the space e from the barrier member 236 to the inside of the heat-pressurizing device 232, and includes a structure and means for heat-processing the films 240. The spaces c, d, e are connected to pipes 242, 244, 246 for adjusting the pressure, respectively.

The apparatus of the present invention is characterized in that the axial core 234 is constructed with a permeable member. For this reason, the permeability is not hindered between the spaces c and d. As a material quality of the permeable member, metals and ceramics can be mentioned as representative examples; however, those made of metal are preferably used. The permeable member has pores, and the average pore diameter of the pores is at least 1 μm and at most 15 μm, preferably at least 3 μm and at most 10 μm . If the average pore diameter is smaller, the permeability will be poor and the effect of the pressurization is unlikely to appear. If the average pore diameter is larger, the surface property of the endless belt that is in contact will be deteriorated or the endless belt will not be peeled off easily owing to the anchor effect, so that it is not suitable. The pores form the space c. Also, the endless belt after heating and cooling can be easily taken out by adopting a construction such that both ends of the axial core do not form a gap and the endless belt has pores at the contacting portions. In other words, after heating and molding, owing to the difference in thermal expansion, the inner diameter of the endless belt is in a state of being contracted than the outer diameter of the axial core. At this time, by pressurizing the space c from the axial core side, it produces an effect that the inner diameter of the endless belt is enlarged by the pressure and the endless belt can be easily taken out from the axial core 234.

Figure 59:
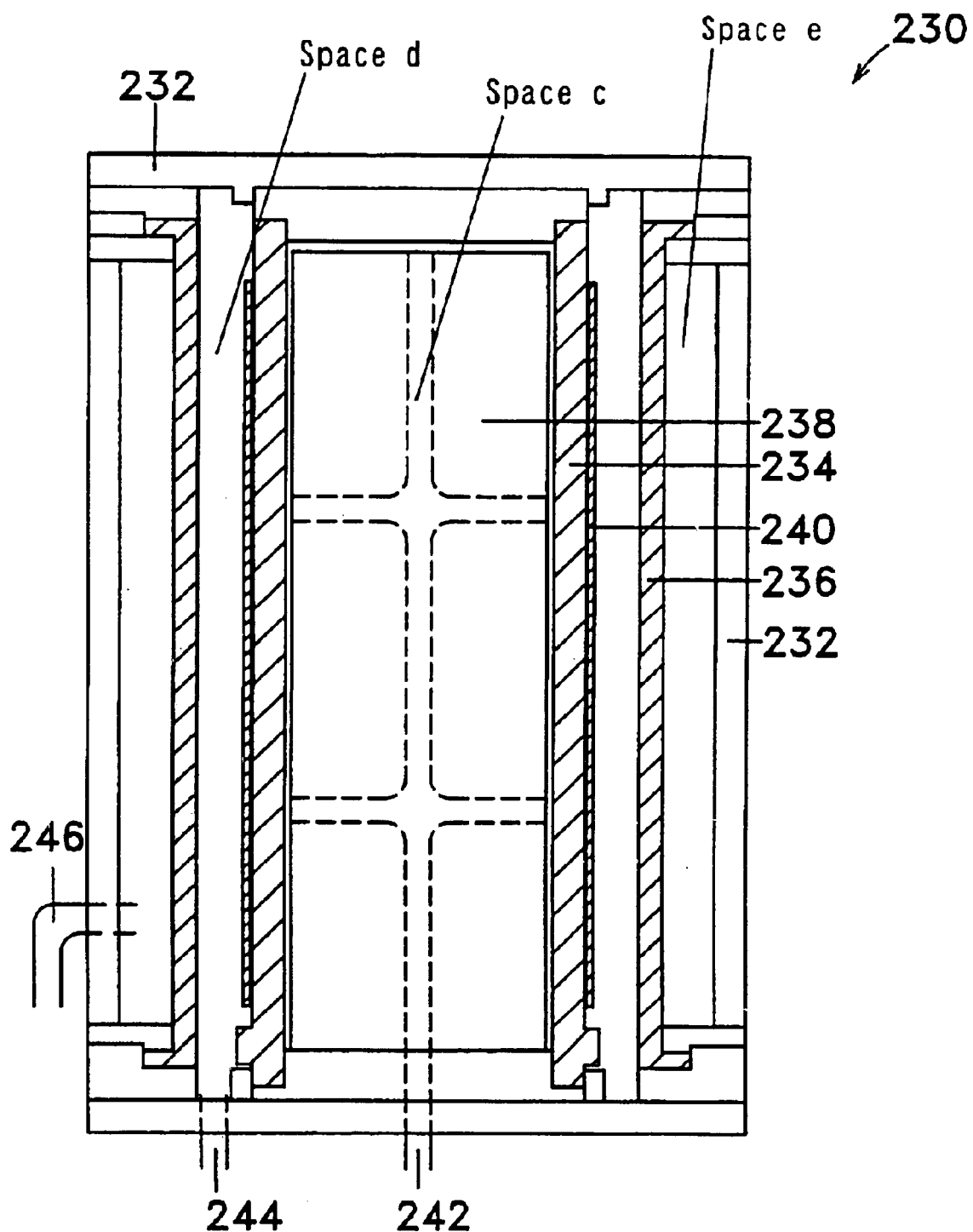
FIG. 59 is a cross-sectional side view showing another embodiment of a molding apparatus of a multi-layered endless belt according to the present invention.

Referring to FIG. 59, a cooling mechanism and/or a heating source represented as heating and cooling part 238 can be disposed in the axial core 234 of the apparatus of the present invention and its vicinity. Since the films 240 are in contact with the axial core 232, it is a good measure to dispose a structure and means for heat-processing in its vicinity. Whether the axial core 232 is tubular or cylindrical, it is preferable to dispose a cooling mechanism if a heat source is to be disposed, since the molding cycle of temperature raising—cooling can be made short and also from the view point of not giving an excessive heat history to the source material films and the molded endless belt.

Figure 60:
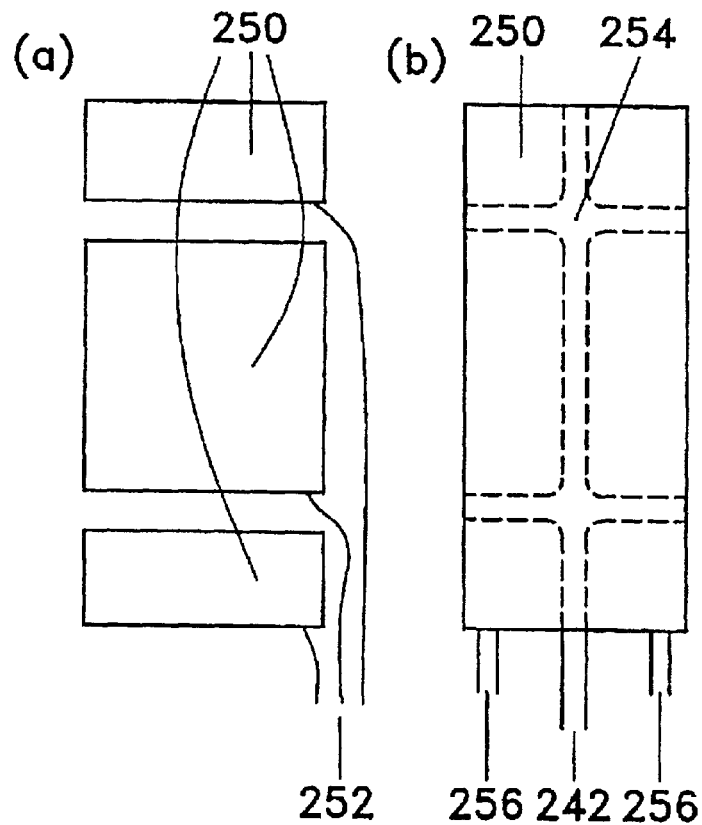
FIG. 60(a) is an explanatory view showing a heat source of an endless belt molding apparatus according to the present invention.
FIG. 60(b) is an explanatory view showing a cooling part of an endless belt molding apparatus according to the present invention.

In the apparatus of the present invention, referring to FIG. 60, it is possible to construct the axial core 232 with the heat source 250 itself to provide a heater disposed in the inside of the tubular axial core. In the Figure, number 252 is a wiring for the heat source. Further, a certain portion within the axial core 232 located in the further inside can be made into a cooling block 252. This is a heat transmitting block capable of passing a medium for cooling, and is made capable of controlling and cooling. In the case of this Figure, number 254 is a hollow for pressure adjustment, 256 is a pipe for the cooling medium. Further, by allowing the axial core 232 to have a tubular structure, it is possible to dispose a heating source and a cooling mechanism in the inside thereof, and the apparatus can be downsized, so that it is industrially preferable.

In the apparatus of the present invention, regarding the aforesaid barrier member, the material quality is representatively selected from rubber materials such as silicone rubber, Teflon rubber, and chlorosulfonated polyethylene rubber, and is selected for use in accordance with the heat processing condition of the source material films used for molding. Also, morphologically, there are one in which the inside (axial core side) of the aforesaid barrier member is subjected to surface treatment having smoothness, one in which the inside of the elastic body is made flat, and others, and it is suitably selected in accordance with the surface property and others required in the endless belt to be molded.

For example, if surface flatness of the endless belt to be molded is required, it is essential that the surface roughness thereof is less than or equal to the required surface roughness of the endless belt, and if the source material film has stickiness, it must be one subjected to a surface treatment having smoothness.

By applying a pressure via the aforesaid barrier member 236, it is possible to apply a uniform pressure to the source material film and a completely integrated endless belt is obtained even if the one in which the surface of the source material film has unevenness such as being subjected to, for example, embossing processing is used. Further, if the pressure is applied via the elastic body, the elastic body presses the source material film first, so that resin flowing can be prevented even if a thermoplastic resin film is used as the source material film, and an endless belt having a desired size is obtained without causing the thickness insufficiency of the end surface. The apparatus of the present invention and their characteristics are as described above, and the most suitable construction is selected and used in accordance with the endless belt to be produced.

Further, the multi-layered endless belt molding apparatus 230 according to the present invention are used according to the procedure described below.

(1) A source material film is wound around an axial core 234 in a separate step.
(2) The above-described axial core 234 having the source material film wound thereon is mounted to a heat-pressurizing device 232.

At this time, if the pressure of the space e is reduced, a larger gap is obtained to produce a better workability. The pressure reduction may be carried out but it need not be necessarily carried out.

(3) The space is pressurized while maintaining the space c and space d in a reduced pressure state, to remove air between the wound films.
(4) The films are heated while maintaining the pressure reduction of the space c and space d and pressurization of the space e.

By pressurizing the space e, the wound films are given a uniform pressure via the barrier member 236 and are in a fixed state. In this state, the films are heated for a predetermined period of time and at a predetermined temperature, whereby the films are integrated and molded into an endless belt shape.

5) The films are cooled while maintaining the pressure reduction of the space c and space d and pressurization of the space e.

At the time of mounting the axial core 234 having the source material film wound thereon, when the pressure of the space c and the space d is reduced to remove air between the films, and at the time of taking the molded endless belt out, and the like, the temperature of the apparatus need not be an ordinary temperature, and it is convenient if the temperature is high as long as there is no inconvenience in the work and the resin and the adhesive that form the source material film to be used and the molded product and others do not cause inconveniences such as deformation or deterioration of state by heat, because then the molding cycle can be made faster and the productivity can be raised.

(6) After the cooling is ended, the space d and the space e are returned to ordinary pressure and the space c is pressurized.

At this time, by pressurizing the axial core 234 from the space c side, the molded endless belt is enlarged by pressure and peeled off from the axial core 234. Namely, the pressure of the space d and the space e is reduced and returned to ordinary pressure to remove the pressing force of the barrier member 236, and then the space c is pressurized from the axial core 2 side to peel off the molded endless belt from the axial core 234. Thereafter, the endless belt is taken out together with the axial core 234 from the heat-pressurizing apparatus 232 to obtain the endless belt.

Further, in the method of producing an endless belt having a desired size and characteristics using the apparatus according to the present invention, the axial core 234 is mounted in an attachable and detachable state to the axial core disposed on the resin film winding apparatus; the source material film is wound around the axial core 234 while giving a tensile force; then the axial core 234 having the source material film wound thereon is mounted on the apparatus of the present invention; air between layers of the wound source material films is removed by reducing pressure; then a uniform pressure is applied to the wound source material films via a barrier member 236 formed with an elastic body; the wound source material films are heated and integrated in a fixed state to obtain an endless belt; and, after cooling, the space c is pressurized from the axial core 234 side and the molded endless belt is peeled off from the axial core 234 and then taken out from the apparatus.

In the production method of the endless belt according to the present invention, it is suitable if air between layers of the wound source material films is removed under a reduced pressure condition of the space c and space d being at most 76000 Pa, preferably at most 10000 Pa, and they are integrated by heating in a state in which they are pressed and fixed via the barrier member 236 under the pressurization condition of the space e being a pressure of at least 101300 Pa and at least 2940000 Pa, preferably at least 101300 Pa and at most 1960000 Pa, more preferably at least 200000 Pa and at most 980000 Pa. By doing so, it is possible to produce an endless belt without residual air. This eliminates voids, and can prevent or reduce the generation of electric breakdown by the applied voltage in the belt having an electrically conductive pattern formed thereon later, and can prolong the voltage resistance life span to an enormous extent.

Also, for example, in the case of producing a thick endless belt such as being 2 mm thick, the thickness of the source material film can be as thick as 0.5 mm; however, it is more suitable if a thin source material film such as having a thickness of 0.2 mm is used while taking care so as not to increase the winding number too much, because then it is easier to obtain an endless belt being excellent in the uniformity in the thickness and the flatness of the winding starting and winding finishing portions. It goes without saying that, in the case of producing a thinner endless belt than the aforesaid ones, use of a thinner film than the aforesaid source material film is a condition to produce a good endless belt. Although this differs depending on the fluidity of the resin, it will be a good condition if the thickness of the source material film to be used is generally at most ⅓, preferably at most ⅕, of the thickness of the endless belt to be produced, and the winding number is at least 3 times, preferably at least 5 times. Under such a condition, by using a film in accordance with the thickness of the endless belt to be produced and by suitably setting the winding number, endless belts having an arbitrary thickness, from thin endless belts to thick endless belts, can be produced, and moreover the thickness of the film can be made almost uniform, so that the thickness of the obtained endless belt can be made almost uniform.

In the production method of the endless belt according to the present invention, the wound source material films are integrated by heating, so that the layer thickness of the endless belt can be set to be arbitrary by the thickness of the source material films and the winding number, it is possible to produce a thick endless belt easily and stably as compared with the case in which a jig is subjected to application and drying—curing, and moreover, there are no low-molecule residual or gas residual at the curing time such as in the case of drying and curing after the solution is applied, so that it is preferable also in view of characteristics of the belt. Further, it is easy to produce thin endless belts as well as thick endless belts as compared with the extrusion or injection method. Further, it is easy to produce belts having a size from a long diameter to a short diameter and from long ones to short ones, the method is excellent in precision as well, and those having a uniform thickness in the circumferential direction and the width direction can be made.

In the endless belt production method of the present invention, the molding method of using an attachable and detachable axial core 234 is excellent in productivity because the winding preparation of the source material films and the dismounting of the produced endless belt, can be carried out in different steps, and also always stabilizes the inner diameter dimension of the endless belt, so that it is outstandingly excellent in precision and preferable as compared with the extrusion or injection method of the conventional method. Further, this production method can be applied to all of those in which the films are made of resin, and has a high general-purpose property. Also, by making the film in a large amount using a method having a good productivity such as the casting method, the extrusion-calendering method, the roll-calendering method, or the application and drying method to the carrier film, the production cost at the time of mass production can be reduced, and in addition, by preparing axial cores of various kinds in advance, it can be easily adapted also to the production of various product types having different sizes in a small amount. Here, the apparatus of the present invention can be used for molding the aforesaid multi-layered endless belt, and the material quality of the films applied to the present apparatus can be applied as a monolayer or multi-layer shape by using the above-described various resins having various properties in accordance with the intended usage. Also, the surface of these resin films can be subjected to the aforesaid surface treatment. Further, films on which an electrode pattern is formed can be applied, and can be used for molding a medium conveying belt.

EXAMPLES

Hereafter, Examples of the present invention will be shown. The present invention is not limited to these Examples.

Example 1 and Example 2 were carried out using the aforesaid multi-layered endless belt apparatus 170 according to the present invention.

Example 1

A laminate film in which a layer of thermoplastic polyimide PIXEO•TP-D (Tg 151° C.) (manufactured by Kanegafuchi Chemical Industry Co., Ltd.) of 4 $\mu$m thickness was formed on both surfaces of APICAL NPI (manufactured by KANEKA Corporation Co., Ltd.), which is a nonthermoplastic polyimide film of 12.5 $\mu$m thickness, was cut to a width of 430 mm and a length of 3141 mm. On an end portion thereof having a length of 785 mm in the length direction, an electrode pattern having an electrode width of 6 mm, an inter-electrode distance of 3 mm, and a thickness of 10 $\mu$m was formed by screen printing with the use of an epoxy silver paste. The film having the electrode pattern formed thereon was wound for four layers around an axial core in an apparatus 170 such as shown in FIG. 47 so that the electrode pattern comes to the outermost layer. The axial core was made of two components including an axial core (tubular body) made of SUS and a thin metal tube made of SUS, having a thickness of 200 $\mu$m, having a diameter that was in close contact with the axial core at an ordinary temperature, and having a surface subjected to PFA thin layer treatment. The metal tube was attachably and detachably disposed in the axial core. Here, the length of the thin metal tube was shorter than the axial core, and an opening for pressure reduction was disposed on a portion of the axial core which was not covered with the metal tube. Thereafter, as a resin film for an electrode protective layer, Cefral Soft G150F200 (manufactured by Central Glass Co., Ltd.), which is a polymer of vinylidene fluoride and chlorotrifluoroethylene having a thickness of 25 $\mu$m was wound for four layers.

Thereafter, a seamless tubular object made of silicone rubber having an inner diameter larger by 1 mm than the outer diameter of the outermost circumferential surface having the resin film for the electrode protective layer wound thereon was attached to cover the entire axial core. Next, both ends of this seamless tubular body made of rubber were strongly fastened with a clamping fixing tool such as a belt made of metal, and glass wool was allowed to bite on the aforesaid pressure reduction opening. The glass wool was used for preventing the pressure reduction caused by the rubber completely being in close contact with the opening at the time of pressurization. The whole set having the clamping tool thereon was introduced into a vacuum press apparatus manufactured by Ashida Seisakusho Co., Ltd., and the pressure was reduced down to 13 Pa via the pressure reduction opening, and the inside of the vacuum press apparatus was brought into a pressurized state of 0.98 MPa by nitrogen pressurization. Further, by hot air circulation, the temperature of the whole system was raised up to 200° C. at a rate of 10° C./min, and after maintaining the temperature at 200° C. for 5 minutes, the temperature was lowered to an ordinary temperature at a rate of 10° C./min. After the pressure was returned to ordinary state both in pressurization and pressure reduction, the set was taken out from the vacuum press apparatus. The clamping tool and the rubber pipe body were removed and a thin metal tube having a polyimide film belt wound thereon was removed from the axial core. Further, the thin metal tube was deformed and a medium conveying belt was taken out.

The resin film for the electrode protective layer had a specific volume resistance of 3.4×10$^{14}$ Ω·cm, a dielectric constant of 6.4, and a melting point of 160° C. Further, the thickness of the heat-welded electrode protective resin layer was 100 $\mu$m. Further, the step difference of the winding starting end and the winding finishing end of the electrode protective resin film were 5 $\mu$m and 4 $\mu$m, respectively.

Figure 61:
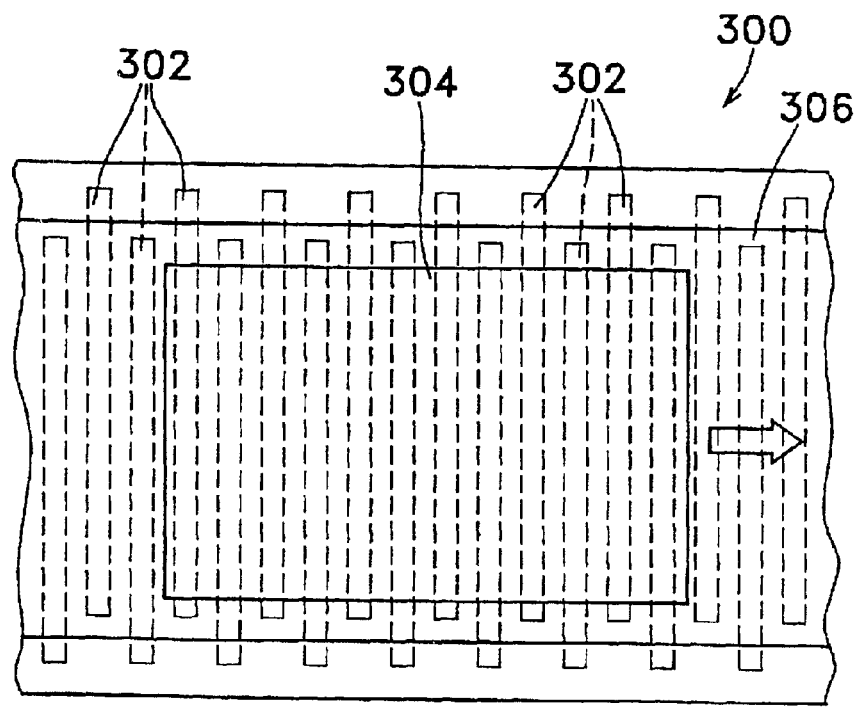
FIG. 61 is an explanatory plan view of an essential part showing an experiment method of adsorption power of a medium conveying belt according to the present invention.

The adsorptive power of this medium conveying belt on paper was measured. The measurement method was as shown in FIG. 61. A DC voltage of 3 kV was applied between the electrodes of the electrode pattern 302 in the medium conveying belt, and a paper 304 having an A4 size was allowed to be adsorbed by the belt 300. The numeral 306 represents a protective film. Thereafter, the paper 304 was pulled in the direction shown by an arrow in the Figure, in the direction parallel to the surface of the belt 300, and the maximum power at the time when the paper 304 moved was measured as the adsorptive power. The adsorptive power was 15 kg. Further, in order to measure the voltage resistance, a DC voltage was applied between the electrodes of the electrode pattern 302 in a state where a paper having an A4 size similar to the above-described one was placed; the applied voltage was gradually raised; and the voltage at which the electric current value exceeded 1 mA was evaluated as the voltage resistance. The voltage resistance value was 6.2 kV.

Further, this conveying belt was stretched under a light tension between two rollers having a diameter of 5 cm, and they were rotated at a speed of about 30 cm/sec to conduct a conveyance test for eye observation. As a result of this, conspicuous irregularity of the rotation of the belt was not noticed.

Example 2

A medium conveying belt was fabricated in the same manner as in Example 1 except that, instead of using one in which the thermoplastic polyimide film layer was formed on both sides of the nonthermoplastic polyimide, a 20 $\mu$m-thick film prepared by adding 25% (with respect to the resin component) of a clay-based compound Smectite SPN (manufactured by Corp Chemical Co., Ltd.) to a similar thermoplastic polyimide was wound for four layers and used, and measurements similar to those of the Example were carried out. As a result of this, both the adsorptive power and the voltage resistance showed values similar to the Example, and the conveying property was good without irregularity.

The step difference of the winding starting end and the winding finishing end of the electrode protective resin film were each about 8 $\mu$m.

Comparative Example 1

An electrode pattern having an electrode width of 6 mm, an inter-electrode distance of 3 mm, and a thickness of 10 $\mu$m was formed (printed) on a nonthermoplastic polyimide film having a thickness of 75 $\mu$m with the use of an epoxy-based silver paste. The film having the electrode pattern formed thereon was stuck onto a 25 $\mu$m polyimide film in a belt form with the use of a 10 $\mu$m tape having an epoxy-based adhesive of the B stage applied thereon, and the adhesive was heat-cured for bonding. Thereafter, Cefral Soft G150F200 (manufactured by Central Glass Co., Ltd.), which is a polymer of vinylidene fluoride resin and chlorotrifluoroethylene, was applied as an electrode protective resin layer by the coater method so that it would have a thickness of 100 $\mu$m, thereby to prepare a medium conveying belt. The applied electrode protective resin layer had a specific volume resistance of $3.0\times10^{14}$ $\Omega\cdot$cm, a dielectric constant of 6.5, and a melting point of 160° C. Further, the thickness of the applied electrode protective resin layer was 100 $\mu$m.

The adsorptive power on paper and the voltage resistance of this medium conveying belt were measured in the same manner as in Example 1. As a result of this, the voltage resistance had a low value of 3 kV, although the adsorptive power was approximately the same as that of Example 1. Further, as a result of the belt conveying test, irregularity of movement was noticed when the belt joining portion passed over the roller.

Further, the step difference of the protective layer on the joining portion of the nonthermoplastic polyimide was 7 $\mu$m; however, at the joining portion in the inside was still measured as 35 $\mu$m which was the step difference of the joining tape.

The following Examples 3 to 5 are Examples of the production method of a medium conveying belt in which the electric power can be supplied from the inside.

Example 3

An epoxy resin made of a mixture (2:1) of cresol novolac epoxy resin (Epicoat 180S65 manufactured by Yuka Shell Epoxy Co., Ltd.) and a novolac phenolic resin (PSM-4327 manufactured by Gun-ei Chemical Industry Co., Ltd.) is applied on one surface of a polyimide film (Apical NPI manufactured by Kanegafuchi Chemical Industry Co., Ltd.) to prepare a material for forming an endless belt. While maintaining the adhesive layer in the B stage state in which the reaction is stopped midway, a film is stamped out and wound around a supporting body, as shown in FIG. 28. Thereafter, as shown in FIG. 15, a PVDF film (KF film manufactured by Kureha Chemical Industry Co., Ltd.) having a melting point Tm of 170° C. on which an electrode pattern is formed with an electrically conductive paste (Dotite FA-323 manufactured by Fujikura Kasei Co., Ltd.) is wound. This is heated and pressurized to obtain a medium conveying belt such as shown in FIG. 30, in which the electric power is supplied from the opposite surface of the protective layer surface.

Example 4

A film of thermoplastic polyimide having a glass transition temperature Tg of 150° C. (PIXEO TP-D manufactured by Kanegafuchi Chemical Industry Co., Ltd.) is used as a material for forming an endless belt, and an electrode of copper foil is press-bonded with a flat plate press. This is wound around a tubular supporting body having a diameter of about 250 mm. Thereafter, a film of PVF resin (Tedler TST20SG4 manufactured by Du pont Co., Ltd.) is wound. This is heat-pressurized to obtain a belt such as shown in FIG. 33. Next, in order to facilitate the bending of a tubular object, a cutout is formed as shown in FIG. 38, followed by heat-pressurization with hot rolls to obtain a medium conveying belt in which the electric power is supplied from the opposite surface of the protective layer surface, as shown in FIG. 39.

Example 5

An adhesive layer made of a thermoplastic polyimide having a glass transition temperature Tg of 150° C. (PIXEO TP-D manufactured by KANEKA Corporation Co., Ltd.) was disposed on both surfaces of a polyimide film (Apical NPI manufactured by KANEKA Corporation Co., Ltd.) as a material for forming an endless belt (PIXEO BP manufactured by KANEKA Corporation Co., Ltd.). An electrode pattern was formed with an electrically conductive paste (Dotite FA-323 manufactured by Fujikura Kasei Co., Ltd.) on the surface of the film, as shown in FIG. 24. Thereafter, it was wound around a supporting body. A PFA resin film (Aflon PFA manufactured by Asahi Glass Co., Ltd.), which was a protective layer material, was wound thereon. This was heat-pressurized to obtain a belt such as shown in FIG. 42. Next, an electrically conductive fiber (Sanderlon manufactured by Nippon Sanmo Senshoku Co., Ltd.) was sewn with a sewing machine to penetrate through an electrode portion, and an electrically conductive paste was applied with a dispenser and heat-cured to obtain a medium conveying belt in which the electric power is supplied from the opposite surface of the protective layer surface.

Examples 6 to 8

The following Examples 6 to 8 are Examples of the present invention capable of obtaining an excellent electrostatic adsorptive power by adjusting the surface roughness of a belt with the use of a cover bag.

Example 6

An electrode pattern 14 having an electrode width of 6 mm, an inter-electrode distance of 3 mm, and a thickness of 10 $\mu$m was formed on a nonthermoplastic polyimide film having a thickness of 50 μm with the use of an epoxy-based silver paste. The film having the electrode pattern 14 formed thereon was joined in a belt shape and attached to an axial main body. Thereafter, as a resin film, Cefral Soft G150F200 (manufactured by Central Glass Co., Ltd.) having a thickness of 25 μm, which is a polymer of vinylidene fluoride and chlorotrifluoroethylene, was wound for four layers under an ordinary pressure while applying a suitable tension. Thereafter, a seamless tubular bag made of a silicone rubber, which had an inner diameter larger by 1 mm than the outer diameter of the outermost circumferential surface of the wound electrode protective resin film and in which the surface roughness Ra of the inner surface is 0.2 μm and Rz was 0.5 μm, was attached in a state of covering the entire resin film. Thereafter, a seal was made between the bag and a medium conveying belt forming apparatus 30; the inside of the bag was brought into a reduced pressure state of 13 Pa; and the outer circumferential atmosphere of the bag was brought into a pressurized state of 1.96 MPa with nitrogen gas. Further, the outer circumferential atmosphere temperature was raised to 200° C., and after maintaining at 200° C. for 5 minutes, it was cooled to an ordinary temperature. Thereafter, the nitrogen gas was leaked to return the pressure to atmospheric pressure, and then in the state in which the reduced pressure of the inside of the bag was released to return the pressure to atmospheric pressure, the bag was removed to prepare a medium conveying belt having the electrode protective resin film welded thereon. The electrode protective resin film that was put to use had a specific volume resistance of $3.4 \times 10^{14}$ Ω·cm, a dielectric constant of 6.4, and a melting point of 160° C. Further, the thickness of the heat-welded electrode protective resin layer was 100 μm. Further, the surface roughness Ra of the electrode protective resin film was 0.1 μm, and Rz was 0.4 μm.

In the manner shown in FIG. 61, the adsorptive power of this medium conveying belt on paper was measured. The paper 304 was pulled in the direction shown by an arrow in the Figure, in the direction parallel to the surface of the belt, and the maximum power at the time when the paper 304 moved was measured as the adsorptive power. The results are shown in Table 1.

Examples 7 to 8

A medium conveying belt was obtained in the same manner as in Example 6 except that the surface roughness Ra and the surface roughness Rz of the inner surface of the cover bag were set to be the values shown in Table 1. The specific volume resistance and the dielectric constant of the obtained electrode protective resin film were as shown in Table 1. Further, the adsorptive power on paper 304 and the surface roughness Ra and the surface roughness Rz of the electrode protective film were measured in the same manner as in Example 6. The results are shown in Table 2.

Comparative Example 2–3

A medium conveying belt was obtained in the same manner as in Example 6 except that the surf ace roughness Ra and the surface roughness Rz of the cover bag were set to be the values shown in Table 1.

The adsorptive power of these medium conveying belts on paper was measured in the same manner as in Example 6. As a result, as shown in Table 1, the surface roughnesses Ra of the medium conveying belts were as large as 0.5 μm and 0.7 μm, and the surface roughnesses Rz were as large as 2.3 μm and 2.9 μm, and the adsorptive powers were both low values as compared with the Examples.

[Preliminary Tests 1 to 13]

The preliminary tests 1 to 13 were carried out for determining the optimal range of the operation condition of the multi-layered endless belt molding apparatus according to the present invention.

Conditions regarded as being suitable were grasped in advance by carrying out various preliminary tests (the tests were carried out, as conditions for comparison, by applying a pressure using a flat plate press, for the case in which the source material films were sandwiched between rubber mats, for the case in which pressure was applied by air pressure via rubber, for the case in which pressure reduction was present/absent between the laminated films, for the case in which a pattern was printed with an electrically conductive paint on the film surface to provide unevenness, for the case in which a thermoplastic resin film of a different kind was superposed on a multi-layered film, for the case in which the heating temperature was changed, and for other cases at that time) on the films that were put to use, and a part thereof will be described below.

TABLE 1

| | | Electrode protective film | | | | Measurement result | | |
|---|---|---|---|---|---|---|---|---|
| | Resin | Surface roughness of cover bag inside surface Ra (μm) | Surface roughness of cover bag inside surface Rz (μm) | Specific volume resistance (Ωcm) | Dielectric constant | Surface roughness of outer circumferential surface of medium conveying belt Ra (μm) | Surface roughness of outer circumferential surface of medium conveying belt Ra (μm) | Adsorptive power (kg) |
| Example 6 | Cefral Soft G150F200 | 0.2 | 0.5 | 3.40E + 14 | 6.4 | 0.1 | 0.4 | 15.5 |
| Example 7 | Cefral Soft G150F200 | 0.4 | 1.5 | 3.40E + 14 | 6.4 | 0.3 | 1.3 | 13.6 |
| Example 8 | Cefral Soft G150F200 | 0.2 | 0.7 | 3.40E + 14 | 6.4 | 0.1 | 0.6 | 14.8 |
| Comparative Example 2 | Cefral Soft G150F200 | 0.6 | 2.5 | 3.40E + 14 | 6.4 | 0.5 | 2.3 | 10.2 |
| Comparative Example 2 | Cefral Soft G150F200 | 0.7 | 3.0 | 3.40E + 14 | 6.4 | 0.7 | 2.9 | 9.6 |

[Preliminary Test 1]

With the use of a flat plate press P shown in FIG. 62, heating and pressurization were carried out via a rubber mat 310 in atmospheric air. Only a thermoplastic resin film 312 was used as a source material film.

1) A fluororesin film having a glass transition temperature Tg of 130° C. was used as the thermoplastic resin film and was heat-pressurized at 160° C. and 3900000 Pa. (After raising the temperature, it was held for 2 minutes, and thereafter it was cooled with a cooling press for 5 minutes.) As a result, the film was barely in close adhesion, but large air bubbles were noticed in a large number.

2) A fluororesin film having a glass transition temperature Tg of 130° C. was used as the thermoplastic resin film and was heat-pressurized at 160° C. and 9800000 Pa. (After raising the temperature, it was held for 2 minutes, and thereafter it was cooled with a cooling press for 20 minutes.) As a result, the film was fully inclose adhesion, but a large number of air bubbles from large ones to small ones were noticed.

3) A fluororesin film having a glass transition temperature Tg of 130° C. was used as the thermoplastic resin film and was heat-pressurized at 200° C. and 16000000 Pa. (After raising the temperature, it was held for 2 minutes, and thereafter it was cooled with a cooling press for 20 minutes.) As a result, the film was fully in close adhesion and large air bubbles were not noticed, but resin flowing was present on an end surface.

[Preliminary Test 2]

With the use of a flat plate press P shown in FIG. 62, heating and pressurization were carried out via a rubber mat 310 in atmospheric air. A laminate film 314 in which a TPI layer was attached on the surface of a PI film was used as a source material film.

1) One having a glass transition temperature Tg of 150° C. was used as the TPI and was heat-pressurized at 180° C. and 3900000 Pa. (After raising the temperature, it was held for 2 minutes, and thereafter it was cooled with a cooling press for 5 minutes.) As a result, close adhesion power was insufficient and large air bubbles were present in a large number.

2) One having a glass transition temperature Tg of 150° C. was used as the TPI and was heat-pressurized at 180° C. and 9800000 Pa. (After raising the temperature, it was held for 2 minutes, and thereafter it was cooled with a cooling press for 20 minutes.) As a result, close adhesion power was sufficient but air bubbles were present in a large number.

3) One having a glass transition temperature Tg of 150° C. was used as the TPI and was heat-pressurized at 200° C. and 16000000 Pa. (After raising the temperature, it was held for 2 minutes, and thereafter it was cooled with a cooling press for 20 minutes.) As a result, close adhesion power was sufficient and large air bubbles were absent (minute air bubbles were present to some extent).

[Preliminary Test 3]

With the use of a flat plate press P shown in FIG. 62, heating and pressurization were carried out via a rubber mat 310 in atmospheric air. A laminate film 314 in which an epoxy layer was attached on the surface of a PI film was used as a source material film.

1) One in the B stage state (the state in which the reaction was stopped midway) was used as the epoxy layer and was heat-pressurized at 160° C. and 3900000 Pa. (After raising the temperature, it was held for 2 minutes, and thereafter it was cooled with a cooling press for 5 minutes.) As a result, close adhesion power was a little insufficient and minute air bubbles were present in a large number.

2) One in the B stage state (the state in which the reaction was stopped midway) was used as the epoxy layer and was heat-pressurized at 160° C. and 9800000 Pa. (After raising the temperature, it was held for 2 minutes, and thereafter it was cooled with a cooling press for 20 minutes.) As a result, close adhesion power was sufficient but air bubbles were interspersed.

[Preliminary Test 4]

With the use of a flat plate press P shown in FIG. 62, heating and pressurization were carried out via a rubber mat 310 in atmospheric air. A laminate film 314 in which an epoxy layer was attached on the surface of a PI film as well as a thermoplastic resin film 312 were used in superposition as a source material film.

1) One in the B stage state (the state in which the reaction was stopped midway) was used as the epoxy layer and fluororesin film having a glass transition temperature Tg of 130° C. was used as the thermoplastic resin film. They were heat-pressurized at 160° C. and 3900000 Pa. (After raising the temperature, it was held for 2 minutes, and thereafter it was cooled with a cooling press for 5 minutes.) As a result, close adhesion power was a little insufficient and also air bubbles were noticed in a large number.

2) One in the B stage state (the state in which the reaction was stopped midway) was used as the epoxy layer and fluororesin film having a glass transition temperature Tg of 130° C. was used as the thermoplastic resin film. They were heat-pressurized at 200° C. and 16000000 Pa. (After raising the temperature, it was held for 2 minutes, and thereafter it was cooled with a cooling press for 20 minutes.) As a result, close adhesion power was sufficient and large air bubbles were absent, but minute air bubbles were interspersed and resin flowing was noticed on the end surface.

[Preliminary Test 5]

With the use of a flat plate press P shown in FIG. 62, heating and pressurization were carried out via a rubber mat 310 in atmospheric air. A laminate film 314 obtained by printing on a PI film surface with an electrically conductive paint and attaching an epoxy layer thereon as well as a thermoplastic resin film 312 were used in superposition as a source material film.

1) One in the B stage state (the state in which the reaction was stopped midway) was used as the epoxy layer and fluororesin film having a glass transition temperature Tg of 130° C. was used as the thermoplastic resin film. The unevenness of the surface caused by the electrically conductive paint was from 7.2 to 8.3 μm. They were heat-pressurized at 200° C. and 16000000 Pa. (After raising the temperature, it was held for 2 minutes, and thereafter it was cooled with a cooling press for 20 minutes.) As a result, close adhesion power was sufficient as a whole, but a portion that was not in close adhesion was present in the vicinity of the pattern and resin flowing was generated on the end surface.

[Preliminary Test 6]

Figure 63:
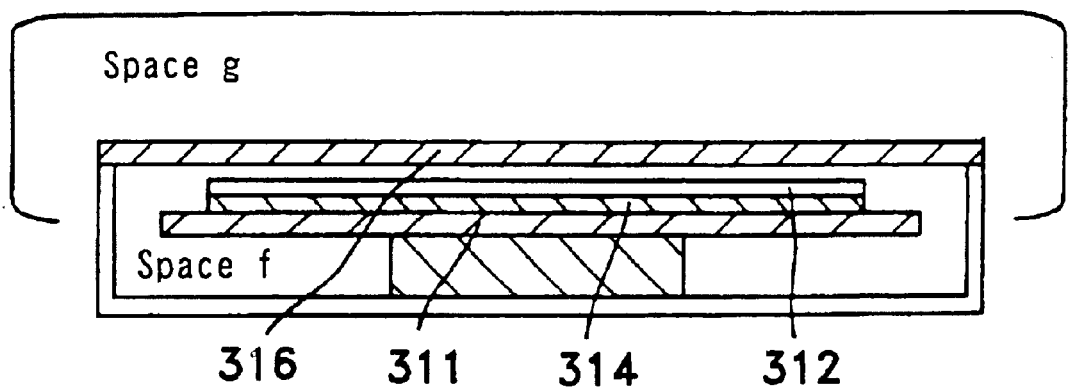
FIG. 63 is an explanatory view of a flat plate press, in which the pressure can be reduced and increased via an elastic body, for performing a preliminary test on a source material film used in an endless belt production method according to the present invention.

As shown in FIG. 63, the space f partitioned by an elastic body (silicone rubber) 316 was subjected to pressure reduction to about 1300 Pa, and pressurized by the air pressure of (the space g) via the elastic body 316. (It results in being pressurized relatively with about 100000 Pa.) A laminate film 314 in which a TPI layer was attached on the surface of a PI film was used as a source material film.

1) One having a glass transition temperature Tg of 150° C. was used as the TPI and heated at 180° C. (After raising the temperature, it was held for 2 minutes, and thereafter it was left to stand for 30 minutes for cooling.) As a result, close adhesion power was a little insufficient, air bubbles were absent by eye observation.

2) One having a glass transition temperature Tg of 150° C. was used as the TPI and heated at 200° C. (After raising the temperature, it was held for 2 minutes, and thereafter it was left to stand for 30 minutes for cooling.) As a result, close adhesion power was sufficient, and also air bubbles were absent.

[Preliminary Test 7]

As shown in FIG. 63, the space f partitioned by an elastic body (silicone rubber) 316 was subjected to pressure reduction to about 1300 Pa, and pressurized by air pressure via the elastic body 316. A laminate film 314 in which an epoxy layer was attached on the surface of a PI film was used as a source material film.

1) One in the B stage state (the state in which the reaction was stopped midway) was used as the epoxy layer and heated at 200° C. (After raising the temperature, it was held for 2 minutes, and thereafter it was left to stand for 30 minutes for cooling.) As a result, close adhesion power was sufficient, and also air bubbles were absent.

[Preliminary Test 8]

As shown in FIG. 63, the space f partitioned by an elastic body (silicone rubber) 316 was subjected to pressure reduction to about 1300 Pa, and pressurized by air pressure via the elastic body 316. A laminate film 314 in which an epoxy layer was attached on the surface of a PI film as well as a thermoplastic resin film 312 were used in superposition as a source material film.

1) One in the B stage state (the state in which the reaction was stopped midway) was used as the epoxy layer, and a fluororesin film having a glass transition temperature Tg of 130° C. was used as the thermoplastic resin film. They were heated at 180° C. (After raising the temperature, it was held for 2 minutes, and thereafter it was left to stand for 30 minutes for cooling.) As a result, close adhesion power was sufficient, and also air bubbles were absent.

2) One in the B stage state (the state in which the reaction was stopped midway) was used as the epoxy layer, and a fluororesin film having a glass transition temperature Tg of 130° C. was used as the thermoplastic resin film. They were heated at 200° C. (After raising the temperature, it was held for 2 minutes, and thereafter it was left to stand for 30 minutes for cooling.) As a result, close adhesion power was sufficient, air bubbles were absent, and also resin flowing was absent on the end surface.

[Preliminary Test 9]

As shown in FIG. 63, the space f partitioned by an elastic body was subjected to pressure reduction to about 1300 Pa, and pressurized by air pressure via the elastic body 316. A laminate film 314 obtained by printing on a PI film surface with an electrically conductive paint and attaching an epoxy layer thereon as well as a thermoplastic resin film 312 were used in superposition as a source material film.

1) One in the B stage state (the state in which the reaction was stopped midway) was used as the epoxy layer and fluororesin film having a glass transition temperature Tg of 130° C. was used as the thermoplastic resin film. The unevenness of the surface caused by the electrically conductive paint was from 7.2 to 8.3 μm. They were heated at 180° C. (After raising the temperature, it was held for 2 minutes, and thereafter it was left to stand for 30 minutes for cooling.) As a result, close adhesion power was a little weak but air bubbles were absent.

2) One in the B stage state (the state in which the reaction was stopped midway) was used as the epoxy layer and fluororesin film having a glass transition temperature Tg of 130° C. was used as the thermoplastic resin film. The unevenness of the surface caused by the electrically conductive paint was from 7.2 to 8.3 μm. They were heated at 200° C. (After raising the temperature, it was held for 2 minutes, and thereafter it was left to stand for 30 minutes for cooling.) As a result, close adhesion power was sufficient, air bubbles were absent, and also resin flowing was absent on the end surface.

[Preliminary Test 10]

Figure 64:
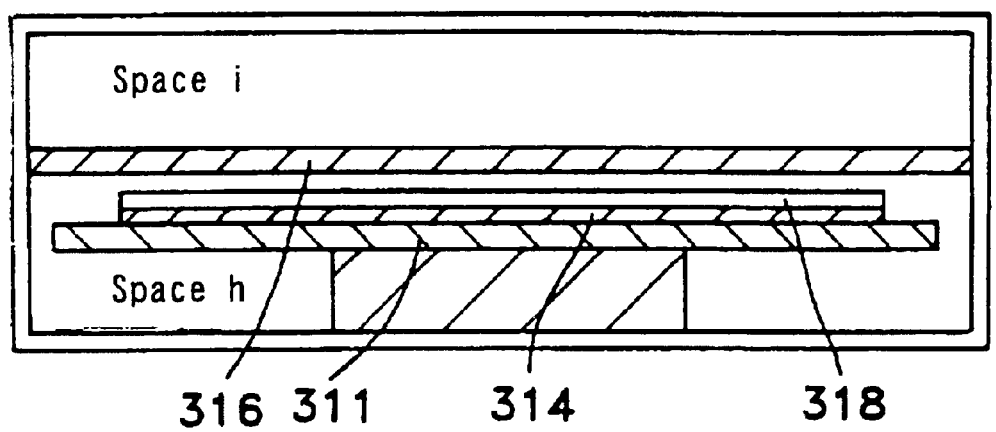
FIG. 64 is an explanatory view of another flat plate press, in which the pressure can be reduced and increased via an elastic body, for performing a preliminary test on a source material film used in an endless belt production method according to the present invention.

As shown in FIG. 64, the pressure of the space h partitioned by an elastic body (silicone rubber) was reduced and the space i was pressurized to pressurize the source material film via the elastic body 316. A laminate film 314 in which a TPI layer was attached to the surface of a PI film was used as the source material film. Here, in the Figure, 311 is a supporting stand.

1) One having a glass transition temperature Tg of 150° C. was used as the TPI. The temperature was raised up to 200° C. at a speed of 6° C./min and, after maintaining it for 2 minutes, it was cooled at a speed of 4° C./min. The reduced pressure level was pressure 76000 Pa, and the pressurization was 3000000 Pa. As a result, the close adhesion power was sufficient, and also air bubbles were not noticed.

2) One having a glass transition temperature Tg of 150° C. was used as the TPI. The temperature was raised up to 200° C. at a speed of 6° C./min and, after maintaining it for 2 minutes, it was cooled at a speed of 4° C./min. The reduced pressure level was pressure 2000 Pa, and the pressurization was 2030000 Pa. As a result, the close adhesion power was sufficient, and also air bubbles were not noticed.

3) One having a glass transition temperature Tg of 150° C. was used as the TPI. The temperature was raised up to 200° C. at a speed of 6° C./min and, after maintaining it for 2 minutes, it was cooled at a speed of 4° C./min. The reduced pressure level was pressure 2000 Pa, and the pressurization was 1010000 Pa. As a result, the close adhesion power was sufficient, and also air bubbles were not noticed.

[Preliminary Test 11]

As shown in FIG. 64, the pressure of the space h partitioned by an elastic body 316 was reduced and the space i was pressurized to pressurize the source material film via the elastic body 316. A laminate film 314 in which an epoxy layer was attached to the surface of a PI film was used as the source material film.

1) One in the B stage state (the state in which the reaction was stopped midway) was used as the epoxy layer. The temperature was raised up to 200° C. at a speed of 6° C./min and, after maintaining it for 2 minutes, it was cooled at a speed of 4+ C./min. The reduced pressure level was pressure 2000 Pa, and the pressurization was 2030000 Pa. As a result, the close adhesion power was sufficient, and also air bubbles were not noticed.

2) One in the B stage state (the state in which the reaction was stopped midway) was used as the epoxy layer. The temperature was raised up to 200° C. at a speed of 6° C./min and, after maintaining it for 2 minutes, it was cooled at a speed of 4° C./min. The reduced pressure level was pressure 2000 Pa, and the pressurization was 1010000 Pa. As a result, the close adhesion power was sufficient, and also air bubbles were not noticed.

[Preliminary Test 12]

As shown in FIG. 64, the pressure of the space h partitioned by an elastic body 316 was reduced and the space i was pressurized to pressurize the source material film via the elastic body 316. A laminate film 314 in which an epoxy layer was attached to the surface of a PI film as well as a thermoplastic resin film 312 were used in superposition as the source material film.

1) One in the B stage state (the state in which the reaction was stopped midway) was used as the epoxy layer, and a fluororesin film having a glass transition temperature Tg of 130° C. was used as the thermoplastic resin film. The temperature was raised up to 200° C. at a speed of 6° C./min and, after maintaining it for 2 minutes, it was cooled at a speed of 4° C./min. The reduced pressure level was pressure 2000 Pa, and the pressurization was 2030000 Pa. As a result, the close adhesion power was sufficient, air bubbles were not noticed, and also resin flowing was absent.

2) One in the B stage state (the state in which the reaction was stopped midway) was used as the epoxy layer, and a fluororesin film having a glass transition temperature Tg of 130° C. was used as the thermoplastic resin film. The temperature was raised up to 200° C. at a speed of 6° C./min and, after maintaining it for 2 minutes, it was cooled at a speed of 4° C./min. The reduced pressure level was pressure 2000 Pa, and the pressurization was 1010000 Pa. As a result, the close adhesion power was sufficient, air bubbles were not noticed, and also resin flowing was absent.

[Preliminary Test 13]

As shown in FIG. 64, the pressure of the space h partitioned by an elastic body was reduced and the space i was pressurized to carry out pressurization via the elastic body 314. A laminate film 314 obtained by printing on a PI film surface with an electrically conductive paint and attaching an epoxy layer thereon as well as a thermoplastic resin film 312 were used in superposition as a source material film.

1) One in the B stage state (the state in which the reaction was stopped midway) was used as the epoxy layer, and a fluororesin film having a glass transition temperature Tg of 130° C. was used as the thermoplastic resin film. The unevenness of the surface caused by the electrically conductive paint was from 7.2 to 8.3 μm. The temperature was raised up to 200° C. at a speed of 6° C./min and, after maintaining it for 2 minutes, it was cooled at a speed of 4° C./min. The reduced pressure level was pressure 2000 Pa, and the pressurization was 2030000 Pa. As a result, the close adhesion power was sufficient, air bubbles were not noticed, and also resin flowing was absent.

2) One in the B stage state (the state in which the reaction was stopped midway) was used as the epoxy layer, and a fluororesin film having a glass transition temperature Tg of 130° C. was used as the thermoplastic resin film. The unevenness of the surface caused by the electrically conductive paint was from 7.2 to 8.3 μm. The temperature was raised up to 200° C. at a speed of 6° C./min and, after maintaining it for 2 minutes, it was cooled at a speed of 4° C./min. The reduced pressure level was pressure 2000 Pa, and the pressurization was 1010000 Pa. As a result, the close adhesion power was sufficient, air bubbles were not noticed, and also resin flowing was absent.

[Results of the Preliminary Tests]

The results of the preliminary tests were summarized in Tables 2 to 5.

TABLE 2

| | Combination of films | |
|---|---|---|
| | Film type | |
| 1 | fluororesin | |
| 2 | PI/TPI | |
| 3 | PI/epoxy | |
| 4 | PI/epoxy | fluororesin |
| 5 | PI/pattern printing/epoxy | fluororesin |

Three kinds of apparatus were used.

A: FIG. 62 flat plate press
B: FIG. 63 press by film pressure reduction and atmospheric pressure
C: FIG. 64 press capable of pressure reduction and raising the temperature and cooling Explanation of symbols:
× . . . poor  Δ . . . little poor  ○ . . . good

TABLE 3

| In the case of flat plate press | | | | | |
|---|---|---|---|---|---|
| Film | 160° C. 3900000 Pa | 160° C. 9800000 Pa | 180° C. 3900000 Pa | 180° C. 9800000 Pa | 200° C. 16000000 Pa |
| 1 | X | X | | | Δ |
| 2 | | | X | X | Δ |
| 3 | X | Δ | | | |
| 4 | X | | | | Δ |
| 5 | | | | | Δ |

TABLE 4

| Press by film pressure reduction and atmospheric pressure | | |
|---|---|---|
| Film | 180° C. | 200° C. |
| 2 | Δ | ○ |
| 3 | | ○ |
| 4 | ○ | ○ |
| 5 | Δ | ○ |

TABLE 5

| Press capable of pressure reduction and raising the temperature and cooling | | | |
|---|---|---|---|
| Film | 3000000Pa Reduced pressure 76000Pa | 2030000Pa Reduced pressure 2000Pa | 1010000Pa Reduced pressure 2000Pa |
| 2 | ○ | ○ | ○ |
| 3 | | ○ | ○ |
| 4 | | ○ | ○ |
| 5 | | ○ | ○ |

From the above, heating and pressurizing conditions were generally as follows.

1) The heating temperature are suitably higher by at least 30° C., preferably higher by 50° C., than the glass transition temperature Tg of the thermoplastic resin.
2) If the pressurizing force is increased, air bubbles between the films will be small. (If the pressure between the films is not reduced, air bubbles are not necessarily absent.
3) By reducing the pressure of the space where the films are present to remove air between the films, generation of air bubbles can be restrained.
4) By reducing the pressure of the space where the films are present and performing pressurization via an elastic body (rubber), the generation of resin flowing can be prevented even in a high-temperature state. (It produces an effect of checking the resin flowing.)
5) If the pressure of the space where the films are present is reduced and pressurization is performed via rubber, a good close adhesion power is obtained even if the surface has unevenness.
6) If pressurization is carried out with a high pressure, a secure close adhesion power is obtained; however, a sufficient close adhesion power is obtained even with a low pressure.

Based on these, the present invention was carried out as follows.

Examples 9 to 12

The Examples 9 to 12 were carried out with use of a multi-layered endless belt molding apparatus 190 according to the present invention shown in FIG. 48.

Example 9

A thin plate tube having a thickness of 0.15 mm in which a release layer: thickness of 15 µm made of a fluororesin was disposed on the surface thereof was mounted in an attachable and detachable state on an axial core (the axial core main body corresponding size of the apparatus of the present invention: φ 249.3 mm) disposed in a resin film winding apparatus. On the attachable and detachable thin plate tube, first a source material film 18 having a thickness of 0.025 mm was wound for four layers as a base layer while giving a tensile force; further, a source material film of a different kind having a thickness of 0.02 mm was wound for five layers for a cover layer, and then the source material film including plural kinds and the thin plate tube were taken out in an integrated state. They were then mounted to the axial core main body of the apparatus 190 of the present invention shown in FIG. 48 while reducing the pressure of the space b to 670 Pa to enlarge the gap. Then, the pressure of the space a was reduced to 2000 Pa and air between the laminated films was removed for about 3 minutes. Next, while maintaining the reduced pressure of the space a at 2000 Pa, the space b was pressurized to 960000 Pa to apply a pressure to the source material film 20 via an elastic body (rubber), and the temperature was raised up to about 200° C. at a speed of 6° C./min. The heating source was a heater disposed in the inside of a hollow axial core as shown in FIG. 51, and has a hole 206 through which a cooling medium can be passed, thereby to make the control and cooling possible.

After this state was maintained for 3 minutes, while maintaining the conditions of pressure reduction of the space a and pressurization of the space b, the temperature was lowered at a speed of 4° C./min for cooling to room temperature, thereby to form an integrated endless belt.

Thereafter, the endless belt and the attachable and detachable thin plate tube were taken out simultaneously, and the endless belt and the attachable and detachable thin plate tube were separated to take only the endless belt out.

Here, the resin film winding apparatus was used to wind the source material film around the thin plate tube, and incorporates therein a driving device capable of rotating the axial core and capable of controlling the speed.

Regarding the source material films used here, the base layer was a laminate film in which an epoxy layer was disposed to a thickness of 5 µm on both surfaces of a PI film of 15 µm to provide a total thickness of 25 µm, and the cover layer was a fluororesin film having a thickness of 20 µm and a glass transition temperature Tg of 130° C. to which barium titanate having a particle size of less than 2 µm was added at about 12% as a filler.

The endless belt molded body obtained in this manner was an endless belt 20 having an outer diameter of about φ 250 mm and a thickness of about 200 µm, and had a sufficient precision with a thickness variation of about 10 µm. Further, the inner surface of the endless belt had been flattened by being pressed onto the axial core by the applied pressure and the outer surface had the fluororesin melted by heat and had been pressurized by the elastic body (rubber) 40 having a flat surface to provide a smooth surface also at the winding finishing end. In addition, air bubbles between the films were absent, and resin flowing at the end in the width direction was absent, so that it was fully practicable.

Example 10

Approximately the same condition as in the previous example was used, and the condition of pressurizing the space b was set to be 2000000 Pa.

Regarding the source material films used here, the base layer was a laminate film in which a TPI layer having a Tg of 150° C. was disposed to a thickness of 5 µm on both surfaces of a PI film of 15 µm to provide a total thickness of 25 µm, and the cover layer was a fluororesin film having a thickness of 20 µm and a glass transition temperature Tg of 130° C. to which barium titanate having a particle size of less than 2 µm was added at about 26% as a filler.

The endless belt molded body obtained in this manner was an endless belt 20 having an outer diameter of about φ 250mm and a thickness of about 200 µm, and had a sufficient precision with a thickness variation of about 10 µm. Further, the inner surface of the endless belt 20 had been flattened by being pressed onto the axial core by the applied pressure and also due to the softened and melted TPI, and the outer surface had the fluororesin melted by heat and had been pressurized by the elastic body (rubber) 43 having a flat surface to provide a smooth surface also at the winding finishing end, so that it was fully practicable.

Example 11

Approximately the same condition as in the previous example was used, and the condition of pressurizing the space b was set to be 2000000 Pa.

Regarding the source material films used here, the base layer was a laminate film in which a TPI layer having a Tg of 15° C. was disposed to a thickness of 5 µm on both surfaces of a PI film of 15 µm to provide a total thickness of 25 µm and an electrode pattern having a thickness of about 8 µm had been printed thereon with an electrically conductive paint, and the cover layer was a fluorine-based film having a thickness of 20 µm and a glass transition temperature Tg of 130° C. to which titanium oxide having a particle size of less than 5 µm was added at about 11% as a filler.

The endless belt molded body obtained in this manner was an endless belt having an outer diameter of about φ 250 mm and a thickness of about 200 µm, and had a sufficient precision with a thickness variation of about 10 µm. Further, the inner surface of the endless belt had been flattened by being pressed onto the axial core by the applied pressure and also due to the softened and melted TPI, and the outer surface had the fluororesin melted by heat and had been pressurized by the elastic body (rubber) having a flat surface to provide a smooth surface, and also air bubbles were absent in the vicinity of the electrode pattern, so that it was fully practicable.

Example 12

Approximately the same condition as in the previous example was used, and the condition of pressurizing the space b was set to be 2800000 Pa.

Regarding the source material films used here, the base layer was a laminate film in which an epoxy layer in the B stage state was disposed to a thickness of 5 µm on both surfaces of a PI film of 15 µm in thickness to provide a total thickness of 25 µm and an electrode pattern 34 having a thickness of about 8 µm had been printed thereon with an electrically conductive paint, and the cover layer 36 was a fluorine-based film having a thickness of 20 µm and a glass transition temperature Tg of 130° C. to which titanium oxide having a particle size of less than 5 µm was added at about 25% as a filler.

The endless belt molded body obtained in this manner was an endless belt having an outer diameter of about φ 250 mm and a thickness of about 200 µm, and had a sufficient precision with a thickness variation of about 10 µm. Further, the inner surface of the endless belt had been flattened by being pressed onto the axial core by the applied pressure, and the outer surface had been pressurized by the elastic body (rubber) having a flat surface to provide a smooth surface, and also air bubbles were absent also in the vicinity of the unevenness D caused by the electrode pattern, so that it was fully practicable.

Examples 13 to 16

In the Examples 13 to 16, embodiments of the endless belt molding apparatus 230 according to the present invention shown in FIG. 59 and the production method using the same apparatus were carried out in accordance with the results of the preliminary tests.

Example 13

In the endless belt production method of the present invention using the apparatus 230 according to the present invention shown in FIG. 59, it is desirable to mount the source material films by winding the films with wrinkles as few as possible by expelling air between the films with a nip roll. Further, it is preferable if the winding finishing film end is heated for provisional welding, because then the axial core can be handled easily. Further, a plurality of films are used and the axial core is set in the apparatus after laminating the films on the axial core.

Around the axial core mounted to the resin film winding apparatus, a source material film having a thickness of 0.025 mm was wound for four layers as a base layer while giving a tensile force, and further a source material film of a different kind having a thickness of 0.02 mm was wound as a cover layer for five layers. Then the wound source materials of plural kinds and the axial core are taken out in an integrated state. Here, the resin film winding apparatus is used to wind the source material films around the axial core, and incorporates therein a driving device capable of rotating the axial core and capable of controlling the speed. They were then mounted to the axial core of the apparatus 230 of the present invention while reducing the pressure of the space e to 660 Pa to enlarge the gap. Then, the pressure of the space c and the space d was reduced to 660 Pa and air between the laminated films was removed for about 3 minutes. Next, while maintaining the reduced pressure of the space c and the space d at 660 Pa, the space e was pressurized to 960000 Pa to apply a pressure to the source material films via a barrier member (silicone rubber), and the applied pressure was maintained for about 3 minutes. Then, the temperature was raised up to a temperature of about 200° C. at a speed of 6° C./min. The heating source was a heater disposed in the inside of a tubular axial core shown in FIG. 60 and has, in the further inside thereof, a heat transmission block through which a cooling medium can be passed, thereby to make the control and cooling possible. After the state of about 200° C. was maintained for 3 minutes, while maintaining the conditions of pressure reduction of the space c and the space d and pressurization of the space e, the temperature was lowered at a speed of 4° C./min for cooling to room temperature, thereby to form an integrated endless belt. Thereafter, the molded endless belt was pressed and widened by pressure by pressurization from the space a of the axial core, and peeled off from the axial core. Then, the separated endless belt was taken out together with the axial core.

Regarding the source material films used here, the base layer was a laminate film in which an epoxy layer was disposed to a thickness of 5 µm on both surfaces of a PI film of 15 µm in thickness to provide a total thickness of 25 µm, and the cover layer was a fluororesin film having a thickness of 20 µm and a glass transition temperature Tg of 130° C. to which barium titanate having a particle size of less than 2 µm was added at about 12% as a filler.

The endless belt molded body obtained in this manner was an endless belt having an outer diameter of about φ 250 mm and a thickness of about 200 µm, and had a sufficient precision with a thickness variation of about 10 µm. Further, the inner surface of the endless belt had been flattened by being pressed onto the axial core surface by the applied pressure, and the outer surface had the fluororesin melted by heat and had been pressurized by the barrier member (rubber) having a flat surface to provide a smooth surface also at the winding finishing end. In addition, air bubbles between the films were absent, and resin flowing at the end in the width direction was absent, so that it was fully practicable.

Example 14

Approximately the same condition as in the previous example was used, and the condition of pressurizing the space e was set to be 196000 Pa.

Regarding the source material films used here, the base layer was a laminate film in which a TPI layer having a Tg of 150° C. was disposed to a thickness of 5 µm on both surfaces of a PI film of 15 µm in thickness to provide a total thickness of 25 µm, and the cover layer was a fluororesin film having a thickness of 20 µm and a glass transition temperature Tg of 130° C. to which barium titanate having a particle size of less than 2 µm was added at about 26% as a filler.

The endless belt molded body obtained in this manner was an endless belt 20 having an outer diameter of about φ 250mm and a thickness of about 200 µm, and had a sufficient precision with a thickness variation of about 10 µm. Further, the inner surface of the endless belt 20 had been flattened by being pressed onto the axial core surface by the applied pressure and also due to the softened and melted TPI, and the outer surface had the fluororesin melted by heat and had been pressurized by the barrier member (rubber) having a flat surface to provide a smooth surface also at the winding finishing end, so that it was fully practicable.

Example 15

Approximately the same condition as in the previous example was used, and the condition of pressurizing the space c was set to be 1960000 Pa.

Regarding the source material films used here, the base layer was a laminate film in which a TPI layer having a Tg of 150° C. was disposed to a thickness of 5 µm on both surfaces of a PI film of 15 µm in thickness to provide a total thickness of 25 µm and an electrode pattern having a thickness of about 8 µm had been printed thereon with an electrically conductive paint, and the cover layer was a fluorine-based film having a thickness of 20 µm and a glass transition temperature Tg of 130° C. to which titanium oxide having a particle size of less than 5 µm was added at about 11% as a filler.

The endless belt molded body obtained in this manner was an endless belt having an outer diameter of about φ 250 mm and a thickness of about 200 µm, and had a sufficient precision with a thickness variation of about 10 µm. Further, the inner surface of the endless belt had been flattened by being pressed onto the axial core surface by the applied pressure and also due to the softened and melted TPI, and the outer surface had the fluororesin melted by heat and had been pressurized by the barrier member (rubber) having a flat surface to provide a smooth surface, and also air bubbles were absent in the vicinity of the electrode pattern, so that it was fully practicable.

Example 16

Approximately the same condition as in the previous example was used, and the condition of pressurizing the space c was set to be 2840000 Pa.

Regarding the source material films used here, the base layer was a laminate film in which an epoxy layer in the B stage state was disposed to a thickness of 5 $\mu$m on both surfaces of a PI film of 15 $\mu$m in thickness to provide a total thickness of 25 $\mu$m and an electrode pattern having a thickness of about 8 $\mu$m had been printed thereon with an electrically conductive paint, and the cover layer was a fluorine-based film having a thickness of 20 $\mu$m and a glass transition temperature Tg of 130° C. to which titanium oxide having a particle size of less than 5 $\mu$m was added at about 25% as a filler.

The endless belt molded body obtained in this manner was an endless belt having an outer diameter of about $\phi$ 250 mm and a thickness of about 200 $\mu$m, and had a sufficient precision with a thickness variation of about 10 $\mu$m. Further, the inner surface of the endless belt had been flattened by being pressed onto the axial core surface by the applied pressure, and the outer surface had been pressurized by the barrier member (rubber) having a flat surface to provide a smooth surface, and also air bubbles were absent also in the vicinity of the unevenness caused by the electrode pattern, so that it was fully practicable.

As shown above, embodiments of the endless belt according to the present invention, the medium conveying belt made of the same, the production method thereof, the molding apparatus, and the production method using the same were explained; however, the present invention is not limited to the above-described modes.

Industrial Applicability

In the multi-layered endless belt according to the present invention, a laminate film having an adhesive layer or a thermoplastic resin layer disposed on a nonthermoplastic polyimide film is wound around an axial core and bonded with heat. Further, in the production method of a multi-layered endless belt according to the present invention, the size of the belt can be easily fabricated from those having a large diameter to those having a small diameter, and from long ones to short ones, and also the thickness in the circumferential direction and in the width direction can be made uniform. Furthermore, a multi-layered endless belt having a smooth winding starting end and a smooth winding finishing end can be obtained.

For this reason, the layer thickness of the multi-layered endless belt can be arbitrarily set in accordance with the thickness of the film and the winding number. Therefore, not only thick multi-layered endless belts but also thin multi-layered endless belts can be easily and stably produced, and there are no low molecule residues or gas residues at the time of curing, such as at the time of producing a tubular body by applying a solution, so that it is preferable. Further, the general-purpose property is high and, by producing the films in a large amount by a method having a good productivity, the production cost at the time of mass production will be low.

Further, a function that cannot be obtained by combined use of various members can be imparted by disposing an electrically conductive pattern on the outer circumference of the multi-layered endless belt according to the present invention, by a method such as printing, vapor deposition, etching, or plating.

Also, since the production method of the medium conveying belt of the present invention is a method in which a film with an electrode pattern and a resin film for an electrode protective layer are wound and thereafter collectively heat-welded, medium conveying belts of various sizes from those having a large diameter to those having a small diameter and from long ones to short ones can be formed, and the width of the electrode protective layer can be freely set with respect to the inner layer width. Moreover, the thickness of the resin tubular object and the electrode protective layer in the circumferential direction and in the width direction can be easily made uniform. Also, since the electrode pattern can be printed on on a planar film, it is excellent in workability and provides a higher yield than the method of printing an electrode pattern on a tubular object prepared in advance. Further, the production method of the medium conveying belt of the present invention has a high general-purpose property and, by producing the source material films in a large amount by a method having a good productivity, the production cost at the time of mass production can be made low.

Also, as regards the method of producing a medium conveying belt in which the electric power is supplied from the opposite surface of the protective layer surface, a medium conveying belt in which the electric power is supplied from the inside of the belt can be produced by drilling a hole through an endless belt before or after heating, or by allowing it to have a length different from the protective layer in a direction perpendicular to the belt circumferential direction, and/or by processing an end of the endless belt.

Further, by adjusting the surface roughness of the cover bag, the surface roughness Ra of the medium conveying belt can be reduced, and also a belt having a surface without unevenness or flaws can be fabricated, so that an excellent electrostatic adsorptive power is obtained and the belt can convey paper, OHP sheet, or the like by fully adsorbing it.

Also, the endless belt molding apparatus according to the present invention makes use of an apparatus having a hollow or solid axial core, a multiple tubular mold made of an outer tube surrounding the axial core, and an elastic body that partitions a space between the axial core and the outer tube as a fundamental construction, and integrates the wound source material films by heating while performing pressure reduction and pressurization. Therefore, the layer thickness of the endless belt can be arbitrarily set in accordance with the thickness of the source material films and the winding number, so that not only thick endless belts but also thin endless belts can be easily and stably fabricated. In addition, there is no residue of air bubbles and also there are no low molecule residues or gas residues at the time of curing, such as at the time of producing an endless belt by applying a solution, so that it is preferable. Also, endless belts of various sizes from those having a large diameter to those having a small diameter and from long ones to short ones can be easily fabricated, and the thickness in the circumferential direction and in the width direction can be made uniform. Further, the axial core of the endless belt molding apparatus of the present invention is more inexpensive and has a longer life than each mold in the conventional methods. so that it is practically suitable. Further, this production method can be applied to all of those made into a film and has a high general-purpose property, so that by producing the source material films in a large amount by a method having a good productivity, the production cost at the time of mass production can be made low.

In the production method using the molding apparatus of the multi-layered endless belt of the present invention, the preparation of winding the source material films and the removal of the endless belts, which are the products after molding, can be carried out in a preliminary set-up procedure, so that it is excellent in productivity. In addition it stabilizes the inner diameter dimension of the endless belts at all times, so that it is outstandingly excellent in precision and preferable as compared with the extrusion and injection method of the conventional methods. Further, this production method can be applied to all of those made into a film with resin, and has a high general-purpose property. Therefore, by producing the films in a large amount by a method having a good productivity such as the casting method, the extrusion-calendering method, the roll-calendering method, or the application and drying method to carrier films, the production cost at the time of mass production can be made low. Also, by preparing axial cores of various kinds in advance, it can be easily adapted to production of various product types having different sizes and in a small amount.

Further, by using a permeable metal in the axial core of the endless belt molding apparatus of the present invention, the belts can be easily peeled off, so that it is practically suitable. Further, this production method can be applied to all of those made into a film and has a high general-purpose property, so that by producing the source material films in a large amount by a method having a good productivity, the production cost at the time of mass production can be made low.

What is claimed is:

1. A method of producing a multilayered endless medium conveying belt having an electrically conductive electrode pattern on an outer circumferential surface of the belt and an electrode protective layer on an outer circumferential surface of the electrode pattern, comprising the steps of:

preparing a laminated source material film composed of a plurality of layers including a layer of nonthermoplastic polyimide film and a layer of thermoplastic resin;

forming one electrode pattern for one circumferential length of a medium conveying belt at one end on one surface of a layer of the laminated source material film;

winding the laminated source material film with the one electrode pattern formed thereon at least two times around an axial core so that the electrode pattern formed on the one surface of a layer of the laminated source material film forms said electrode pattern on the outermost circumferential surface of the wound laminated source material film, and further winding a resin film at least two times around the wound laminated source material film on a surface of said electrically conductive electrode pattern to form an electrode protective layer; and heat-welding the laminated source material film with said electrically conductive electrode pattern formed thereon and the protective resin layer thereover while they are wound around the axial core to form the medium conveying belt.

2. The production method of a medium conveying belt according to claim 1, wherein said source material film is a laminate film formed by disposing an adhesive layer formed from at least one selected from the group consisting of epoxy resin, silicone resin, vinyl ester resin, phenolic resin, unsaturated polyester resin, bismaleimide resin, urethane resin, melamine resin, and urea resin, on an entire surface or a specific portion of one surface or both surfaces of a nonthermoplastic polyimide film.

3. The production method of a medium conveying belt according to claim 1, wherein said source material film is a laminate film formed by disposing a thermoplastic resin layer made of a thermoplastic polyimide resin or at least one resin selected from the group consisting of polyether sulfone, polyethylene terephtalate, polyethylene naphthalate, polyether ether ketone, polyphenylene sulfide, polyetherimide, polysulfone, polyamideimide, polyetheramide, and polyarylate, on an entire surface or a specific portion of one surface of a nonthermoplastic polyimide film.

4. The production method of a medium conveying belt according to claim 1, wherein said source material film is formed by laminating a monolayer film made of a thermoplastic polyimide resin or at least one resin selected from the group consisting of polyether sulfone, polyethylene terephthalate, polyethylene naphtalate, polyether ether ketone, polyphenylene sulfide, polyetherimide, polysulfone, polyamideimide, polyetheramide, and polyarylate to a nonthermoplastic polyimide film.

5. The production method of a medium conveying belt according to claim 4, further comprising a delivering step of delivering the monolayer film and the nonthermoplastic polyimide film.

6. The production method of a medium conveying belt according to claim 1, further comprising the step of forming another electrode pattern for one circumferential length of a medium conveying belt at the other end on the opposite surface of said one layer of laminated source material film, winding the film with the electrode patterns formed thereon at least two times around an axial core so that one electrode pattern is on the outermost circumferential surface and the other electrode pattern is on the innermost circumferential surface of said laminated source material film, and further winding a resin film for forming the electrode protective layer at least two times around the electrode pattern on the outermost circumferential surface.

7. The production method of a medium conveying belt according to claim 2, further comprising the step of forming another electrode pattern for one circumferential length of a medium conveying belt at the other end on the opposite surface of said one layer of laminated source material film, winding the film with the electrode patterns formed thereon at least two times around an axial core so that one electrode pattern is on the outermost circumferential surface and the other electrode pattern is on the innermost circumferential surface of said laminated source material film, and further winding a resin film for forming the electrode protective layer at least two times around the electrode pattern on the outermost circumferential surface.

8. The production method of a medium conveying belt according to claim 3, further comprising the step of forming another electrode pattern for one circumferential length of a medium conveying belt at the other end on the opposite surface of said one layer of laminated source material film, winding the film with the electrode patterns formed thereon at least two times around an axial core so that one electrode pattern is on the outermost circumferential surface and the other electrode pattern is on the innermost circumferential surface of said laminated source material film, and further winding a resin film for forming the electrode protective layer at least two times around the electrode pattern on the outermost circumferential surface.

9. The production method of a medium conveying belt according to claim 4, further comprising the step of forming another electrode pattern for one circumferential length of a medium conveying belt at the other end on the opposite surface of said one layer of laminated source material film, winding the film with the electrode patterns formed thereon at least two times around an axial core so that one electrode pattern is on the outermost circumferential surface and the other electrode pattern is on the innermost circumferential surface of said laminated source material film, and further winding a resin film for forming the electrode protective layer at least two times around the electrode pattern on the outermost circumferential surface.

10. The production method of a medium conveying belt according to claim 5, further comprising the step of forming another electrode pattern for one circumferential length of a medium conveying belt at the other end on the opposite surface of said one layer of laminated source material film, winding the film with the electrode patterns formed thereon at least two times around an axial core so that one electrode pattern is on the outermost circumferential surface and the other electrode pattern is on the innermost circumferential surface of said laminated source material film, and further winding a resin film for forming the electrode protective layer at least two times around the electrode pattern on the outermost circumferential surface.

11. The production method of a medium conveying belt according to any one of claims 1 and 2–10, including the step of forming a hole in at least one layer of said laminated source material film so that the one electrode pattern is exposed to the inside of the medium conveying belt after winding and heating, or narrowing the width of said at least one layer in a direction perpendicular to the circumferential direction for the same purpose, whereby electric power can be supplied from the inside of the belt in applying a voltage to the one electrode pattern.

12. The production method of a medium conveying belt according to any one of claims 1 and 2–10, further comprising a post-processing step of bending an end of the laminated source material film with the one electrode pattern together with that electrode pattern to the inside of the medium conveying belt for contact-bonding by heating, wherein the width of said electrode protective layer is narrowed in a direction perpendicular to the circumferential direction so that said electrode protective layer is narrower than that of at least one layer of said laminated source material film.

13. The production method of a medium conveying belt according to any one of claims 1 and 2–10, wherein an electrical conduction is established between the one electrode pattern and the inside surface of the medium conveying belt by drilling a hole through the medium conveying belt and forming a through-hole with an electrically conductive paste, or by processing with an electrically conductive fiber using a sewing machine, or by using an eyelet, a stapler, or another method, whereby an electric power can be supplied from the inside of the belt in applying a voltage to the one electrode pattern.

14. The production method of a medium conveying belt according to any one of claims 1 and 2–10, wherein axial core used in said winding step comprises a main body and an attachable and detachable thin metal layer fitted onto the main body.

15. The production method of a medium conveying belt according to claim 14, wherein said attachable and detachable thin metal layer has an adhesion preventive layer disposed on a surface thereof.

16. The production method of a medium conveying belt according to any one of claims 1 and 2–10, wherein said heating step comprises:
a step of attaching a tubular cover bag on an outermost circumferential surface of the wound electrode protective layer to cover the whole of the laminated source material film with the electrode pattern and the electrode protective layer with the cover bag; and
a step of heat-welding the laminated source material film with the electrode pattern and the electrode protective layer in a state in which an outside of the cover bag receives a pressure higher than a pressure applied to an inside of the cover bag.

17. The production method of a medium conveying belt according to claim 16, wherein a surface roughness Ra of the inside of said tubular cover bag is at most 0.5 µm.

18. The production method of a medium conveying belt according to claim 16, wherein a surface roughness Rz of the inside of said tubular cover bag is at most 2.0 µm.

19. The production method of a medium conveying belt according to claim 16, wherein the cover bag has a rubber elasticity.

20. The production method of a medium conveying belt according to claim 17, wherein the cover bag has a rubber elasticity.

21. The production method of a medium conveying belt according to claim 18, wherein the cover bag has a rubber elasticity.

22. The production method of a medium conveying belt according to any one of claims 1 and 2 10, wherein a filler having the maximum particle size of at most 5 µm is introduced into the laminated source material film constituting said medium conveying belt.

23. The production method of a medium conveying belt according to claim 12, wherein a filler having the maximum particle size of at most 5 µm is introduced into the laminated source material film constituting said medium conveying belt.

24. The production method of a medium conveying belt according to claim 11, wherein a filler having the maximum particle size of at most 5 µm is introduced into the laminated source material film constituting said medium conveying belt.

25. The oroduction method of a medium conveying belt according to any one of claims 1 and 2–10, wherein an electric power supplying part is disposed only on one side.

26. The production method of a medium conveying belt according to claim 11, wherein an electric power supplying part is disposed only on one side.

27. The production method of a medium conveying belt according to claim 12, wherein an electric power supplying part is disposed only on one side.

28. The production method of a medium conveying belt according to claim 16, wherein said step of heat-welding the laminated source material film with the electrode pattern and the electrode protective layer is a step of heat-welding the laminated source material film with the electrode pattern and the electrode protective layer in a state in which an outside of the cover bag receives a gas pressure higher than a gas pressure applied to an inside of the cover bag.

29. The production method of a medium conveying belt according to claim 16, wherein said step of heat-welding the laminated source material film with the electrode pattern and the electrode protective layer is a step of heat-welding the laminated source material film with the electrode pattern and the electrode protective layer after bringing the inside of the cover bag into a reduced pressure state.

30. The production method of a medium conveying belt according to claim 28, wherein said step of heat-welding the laminated source material film with the electrode pattern and the electrode protective layer is a step of heat-welding the laminated source material film with the electrode pattern and the electrode protective layer after bringing the inside of the cover bag into a reduced pressure state.

* * * * *

UNITED STATES PATENT AND TRADEMARK OFFICE
CERTIFICATE OF CORRECTION

| | |
|---|---|
| PATENT NO. | : 6,916,393 B2 |
| APPLICATION NO. | : 09/991066 |
| DATED | : July 12, 2005 |
| INVENTOR(S) | : Tomohiro Ohzuru et al. |

It is certified that error appears in the above-identified patent and that said Letters Patent is hereby corrected as shown below:

<u>In the Claims</u>

Column 68, line 36 before "method of a medium" delete "oroduction" and substitute --production-- in its place.

Signed and Sealed this

Seventh Day of November, 2006

JON W. DUDAS
*Director of the United States Patent and Trademark Office*